United States Patent [19]

Mori et al.

[11] Patent Number: 5,604,618
[45] Date of Patent: Feb. 18, 1997

[54] OPTICAL PARAMETRIC CIRCUIT AND OPTICAL CIRCUIT USING THE SAME

[75] Inventors: Kunihiko Mori; Toshio Morioka; Masatoshi Saruwatari, all of Yokosuka, Japan

[73] Assignee: Nippon Telegraph and Telephone Corporation, Tokyo, Japan

[21] Appl. No.: 544,414

[22] Filed: Oct. 10, 1995

[30] Foreign Application Priority Data

| Oct. 12, 1994 | [JP] | Japan | 6-246523 |
| Oct. 25, 1994 | [JP] | Japan | 6-260443 |
| May 18, 1995 | [JP] | Japan | 7-120155 |
| Aug. 18, 1995 | [JP] | Japan | 7-210868 |

[51] Int. Cl.$^6$ .................................................. H04J 14/02
[52] U.S. Cl. .......................... 359/127; 359/135; 359/326; 385/24
[58] Field of Search ..................................... 359/127, 124, 359/135, 163, 108, 326; 385/24; 356/345

[56] References Cited

U.S. PATENT DOCUMENTS

| 4,815,804 | 3/1989 | Desurvire et al. | 359/127 |
| 5,144,375 | 9/1992 | Gabriel et al. | 356/345 |

FOREIGN PATENT DOCUMENTS

| 4-229836 | 8/1992 | Japan . |
| 5-232540 | 9/1993 | Japan . |

OTHER PUBLICATIONS

K. Uchiyama et al., "100 Gbit/s all–optical demultiplexing using non–linear optical loop mirror with gating–width control," Electronic Letters, Oct. 14, 1993, vol. 29, No. 21, pp. 1870–1871.

"Nonlinear Processing in Lightwave Communications", Andrew M. Weiner, et al., CLEO '95, pp. 367–368.

"Optical parametric loop mirror", K. Mori et al., Optics Letters, vol. 20, No. 12, Jun. 15, 1995, pp. 1424–1426.

"Wavelength–Shift–Free Spectral Inversion Utilizing Optical Parametric Loop Mirror", K. Mori et al.

"Tunable and Selective Wavelength Conversion Using Fiber Four Wave Mixing with Two Pump Lights", Kyo Inoue, IEEE Photonics Technology Letters, vol. 6, No. 12, Dec. 1994, pp. 1451–1453.

(List continued on next page.)

*Primary Examiner*—Wellington Chin
*Assistant Examiner*—Kinfe-Michael Negash
*Attorney, Agent, or Firm*—Finnegan, Henderson, Farabow, Garrett & Dunner, L.L.P.

[57] ABSTRACT

The present invention provides an optical parametric circuit for separating four-wave-mixing wave(s) (FWM wave(s)) from signal wave(s) and/or pump waves without using a wavelength filtering device, and optical circuits using the same. The optical parametric circuit of the present invention is made by connecting two output ports of a 2×2 optical directional coupler to a nonlinear optical medium via dispersive optical media, each of which has a specific length and a specific propagation constant. By inputting signal waves having carrier angular frequencies $\omega_{Sj}$ (j=1, 2, ... N) and pump waves having carrier angular frequencies $\omega_{P1}$, $\omega_{P2}$ into the first input port of the optical directional coupler, the FWM waves, generated in the nonlinear optical medium, having carrier angular frequencies $\omega_{fj}$ (=$\omega_{P1}+\omega_{P2}-\omega_S$) are output from the second input port of the optical directional coupler. By inputting the signal waves and the pump waves from different input ports of the directional coupler, it is possible to separate amplified signal waves and the FWM waves from the pump waves. By adjusting the lengths and the propagation constants of the dispersive optical media, the amplified signal waves are separated from the pump waves and the FWM wave. The optical parametric circuit is used for wavelength conversion of optical signals, parametric amplification of optical signals, optical phase conjugation (spectral inversion) and for all-optical switching and for optical circuits using the same, for example, optical logic circuits, optical time-division multi/demultiplexers and/or optical sampling circuits.

26 Claims, 41 Drawing Sheets

OTHER PUBLICATIONS

"Tunable error–free optical frequency conversion of a 4ps optical short pulse over 25 nm by four–wave mixing in a polarisation–maintaining optical fibre", T. Morioka et al., Electronics Letters, vol. 30, No. 11, May 26, 1994, pp. 884–885.

"All–optical time division multiplexing using four–wave mixing", S. Kawanishi et al., Electronics Letters, vol. 30, No. 20, Sep. 29, 1994, pp. 1697–1698.

"Optical sampling using nondegenerate four–wave mixing in a semiconductor laser amplifier", M. Jinno et al., Electronics Letters, vol. 30, No. 18, Sep. 1, 1994, pp. 1489–1490.

"100 Gbit/s optical waveform measurement with 0.6ps resolution optical sampling using subpicosecond supercontinuum pulses", H. Takara et al., Electronics Letters, vol. 30, No. 14, Jul. 7, 1994 pp. 1152–1153.

"Optical waveform measurement by optical sampling with a mode–locked laser diode", T. Kanada et al., Optics Letters, vol. 11, No. 1, Jan. 1986, pp. 4–6.

"Multichannel frequency conversion experiment using fibre four–wave mixing", K. Inoue et al., Electronics Letters, vol. 29, No. 19, Sep. 16, 1993, pp. 1708–1710.

"Multiple–output, 100 Gbit/s all–optical demultiplexer based on multichannel four–wave mixing pumped by a linearly–chirped square pulse", T. Morioka et al., Electronics Letters, vol. 30, No. 23, Nov. 10, 1994, pp. 1959–1960.

"100 Gbit/s to 6.3 Gbit/s demultiplexing experiment using polarisation–independent nonlinear optical loop mirror", K. Uchiyama et al., Electronics Letters, vol. 30, No. 11, May 26, 1994, pp. 873–874.

Patent Abstracts of Japan, Japanese Patent Application, First Publication, Laid–Open No. Hei 7–43763, Hiroki Ito et al.

"Fiber Loop Reflectors", David B. Mortimore, 1988 IEEE, pp. 1217–1224.

"A Fiber Frequency Shifter with Broad Bandwidth, High Conversion Efficiency, Pump and Pump ASE Cancellation, and Rapid Tunability for WDM Optical Networks", 1994 IEEE, pp. 1341–1343.

"Compensation of Chromatic Dispersion in a Single–Mode Fiber by Optical Phase Conjugation" S. Watanabe et al., IEEE Photonics Technology Letters, vol. 5, No. 1, Jan. 1993, pp. 92–95.

"Fiber Optical Parametric Amplifier Operating Near Zero–Dispersion Wavelength", N. Kagi et al., pp. 193–196.

"Picosecond Optical Sampling Using Four–Wave Mixing in Fibre", P. A. Andrekson, Electronics Letters, vol. 27, No. 16, Aug. 1, 1991, pp. 1440–1441.

"1.5–μm phase–sensitive amplifier for ultrahigh–speed communications", G. Bartolini et al., OFC '94 Technical Digest, pp. 202–203.

"Phase–conjugation techniques in long–haul transmission systems", R. M. Jopson et al., OFC '95 Technical Digest, pp. 97–98.

"20 GB/s Fiber Transmission Experiment over 3000 km by Waveform Pre–Compensation using Fiber Compensator and Optical Phase Conjugator", S. Wanatabe et al., IOOC–95, pp. 31–32.

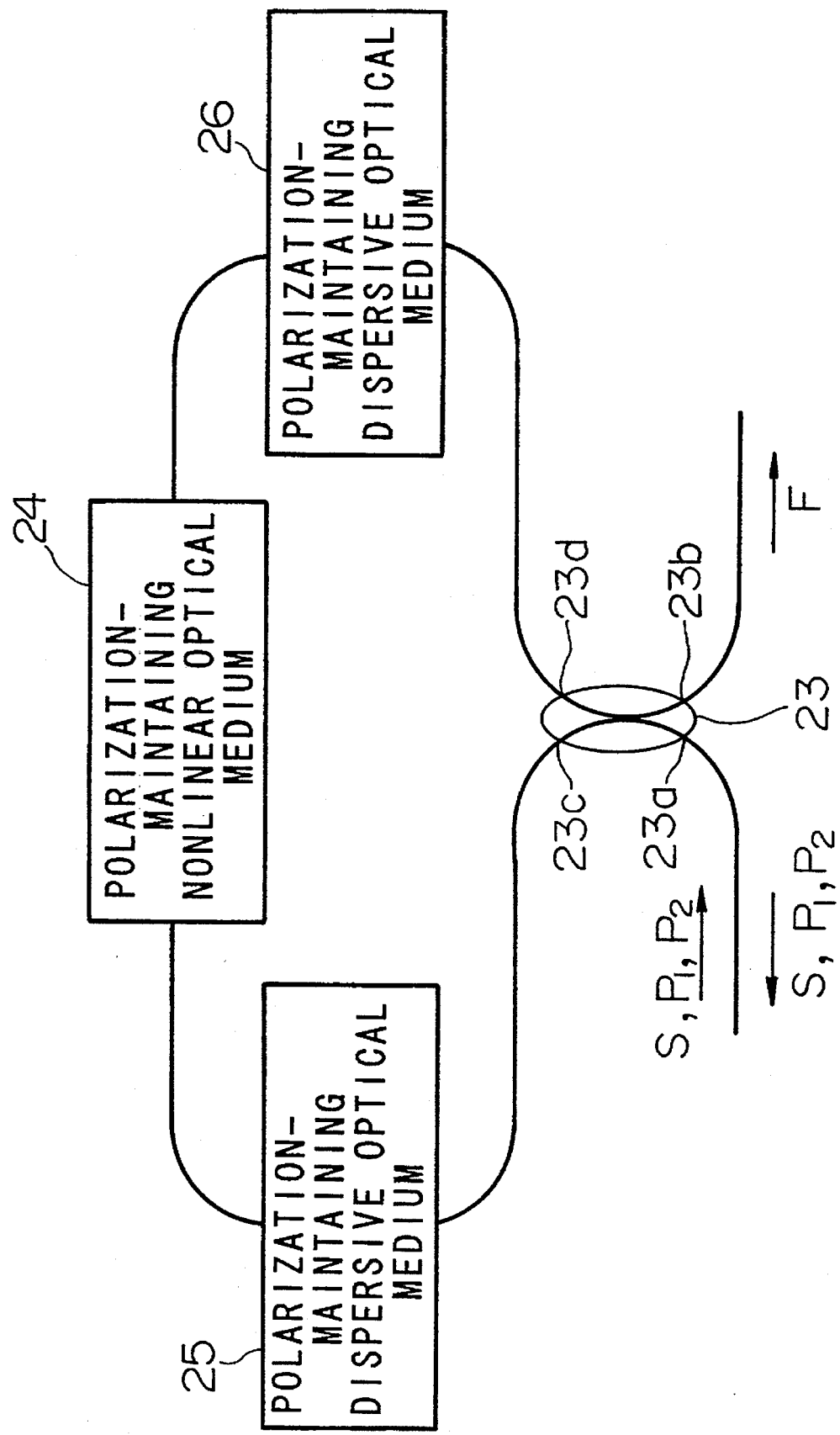

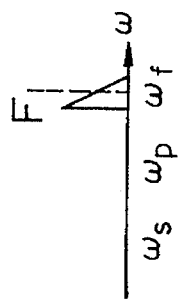
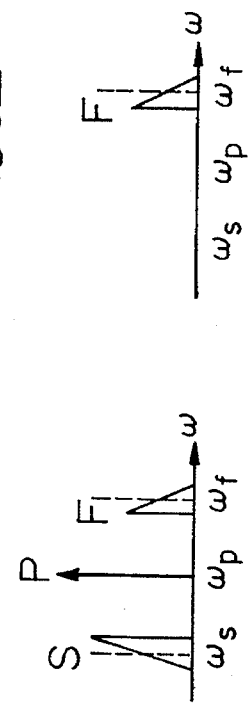
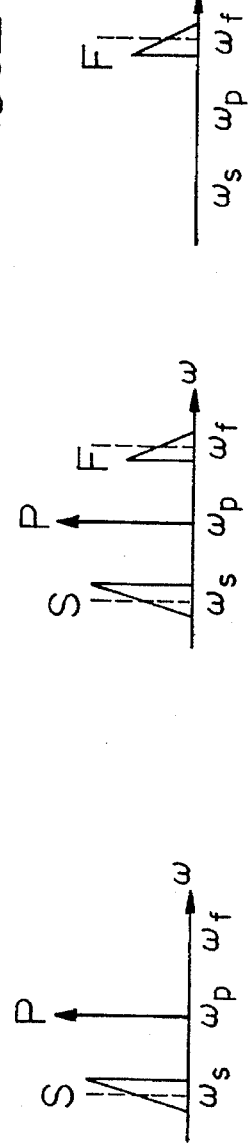
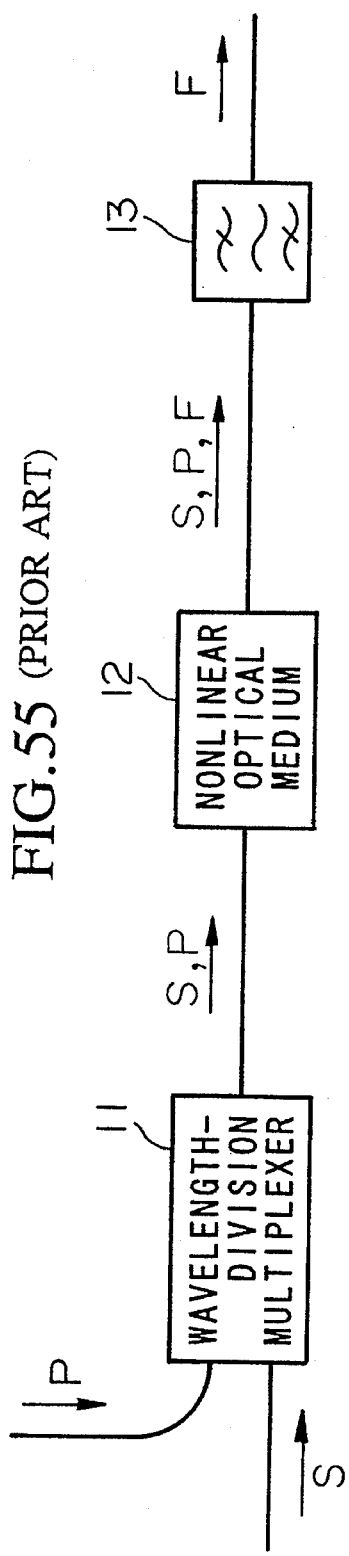
FIG. 55 (PRIOR ART)
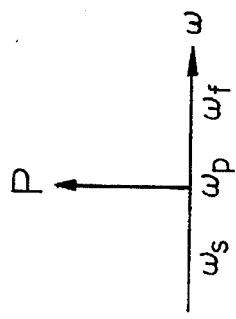
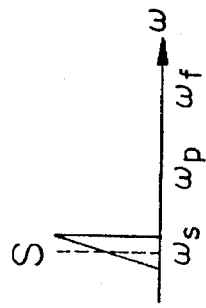
FIG. 56A  FIG. 56B  FIG. 56C  FIG. 56D  FIG. 56E

OPTICAL PARAMETRIC CIRCUIT AND OPTICAL CIRCUIT USING THE SAME

BACKGROUND OF THE INVENTION

1. Field of the Invention

The present invention relates to an optical parametric circuit used for wavelength conversion of optical signals, parametric amplification of optical signals, optical phase conjugation (spectral inversion) and for all-optical switching by utilizing the third-order optical parametric effect induced in a nonlinear optical medium, and to optical circuits using the same, for example, optical logic circuits, optical time-division multi/demultiplexers and/or optical sampling circuits.

2. Description of the Related Art

FIG. 53 shows a configuration of a conventional optical parametric circuit.

This figure illustrates a process of generating the third-order optical parametric effect by coupling a signal wave S (of carrier angular frequency $\omega_s$) shown in FIG. 54A with pump waves $P_1$, $P_2$ (of carrier angular frequencies $\omega_{P1}$, $\omega_{P2}$) shown in FIG. 54B into an optical wavelength-division multiplexer 11 (refer to FIG. 54C) followed by a simultaneous inputting into a nonlinear optical medium 12 and propagating therefrom to induce the third-order optical parametric effect. The signal wave S is thus amplified (which is denoted by S'), and, through a four-wave mixing process, four-wave- mixing (shortened to FWM hereinbelow) wave F having a carrier angular frequency $\omega_f$ is generated (refer to FIG. 54D).

Here, the carrier angular frequencies $\omega_S$, $\omega_{P1}$, $\omega_{P2}$, $\omega_f$ of the signal wave S, pump waves $P_1$, $P_2$ and FWM wave F, are governed by the law of conservation of energy as expressed in the following equation:

$$\omega_S + \omega_f = \omega_{P1} + \omega_{P2}$$

The FWM wave F has a mirror symmetry with the spectrum of signal wave S with respect of the carrier angular frequency $(\omega_{P1}+\omega_{P2})/2$, and functions also as the optical phase conjugation wave for the signal wave S. In other words, this optical parametric circuit can function as a phase conjugation wave generation circuit. FIG. 55 shows a circuit configuration using a degenerate pump wave P (carrier angular frequency $\omega_P$) and FIGS. 56A to 56D show the spectra of the optical waves corresponding to the spectra shown in FIGS. 54A to 54D. In the drawings, the signal wave S and FWM wave F are shown as right-angle triangular mirror images, for illustrative purposes, to indicate the fact that the FWM wave F is the phase conjugate wave of the signal wave S.

Such an optical parametric circuit can also serve as a wavelength conversion circuit to perform simultaneous wavelength conversion of each wavelength of wavelength-division multiplexed signals. For example, upon injection of an N number of signal waves $S_1 \sim S_N$ (carrier angular frequency $\omega_{S1} \sim \omega_{SN}$), FWM waves $\omega F_1 \sim F_N$ are generated (carrier angular frequency $\omega_{f1} \sim \omega_{fN}$ where $\omega_{fj} = \omega_{P1} + \omega_{P2} - \omega_{Sj}$ for j=1~N) thus providing simultaneous wavelength conversion of each wave of the wavelength-division multiplexed signals. FIG. 57 shows a circuit configuration based on a degenerate pump wave P (carrier angular frequency $\omega_P$). FIGS. 58A to 58D show the spectra corresponding to the spectra shown in FIGS. 56A to 56D. In these figures, filled and unfilled triangles are used for showing the correspondence between signal waves $S_1 \sim S_N$ and FWM waves $F_1 \sim F_N$.

An example of application of the parametric circuit as an optical amplification circuit is shown in FIG. 59. Propagation patterns of each wave to the output port of the nonlinear optical medium 12 are the same as those presented in FIGS. 54A~54D. The amplified signal S' is shown in FIG. 54D.

Using the configuration shown in FIGS. 53, 55 and 57, signal wave S ($S_1 \sim S_N$), pump waves ($P_1$, $P_2$ and P) and FWM waves ($F_1 \sim F_N$) are all output colinearly from the nonlinear optical medium 12, therefore, to obtain only the FWM waves F ($F_1 \sim F_N$), it is necessary to employ a wavelength filter 13 which passes only those waves having carrier angular frequencies $\omega_f(\omega_{f1} \sim \omega_{fN})$. The output spectra from the wavelength filter 13 are shown in FIGS. 54E, 56E and 58E. By using the configuration as an optical amplification circuit of FIG. 59, it is necessary to use a wavelength filter 29 which passes only the amplified signal wave S' of carrier angular frequency $\omega_S$. The output spectrum from the wavelength filter 29 is shown in FIG. 60.

When the optical parametric circuit is to be used as an FWM wave generator, it is necessary to pack the carrier angular frequencies $\omega_S$, $\omega_{P1}$ and $\omega_{P2}$ to increase the conversion gain (expressed as FWM wave intensity/signal wave intensity) of signal wave S to FWM wave F, as well as increase the pump wave intensity. Similarly, when the optical parametric circuit is to be used as an optical parametric amplifier, it is necessary to pack the carrier angular frequencies, $\omega_S$, $\omega_{P1}$, $\omega_{P2}$, and increase the pump wave intensity to increase the amplification gain of the signal wave.

Therefore, it is necessary for the wavelength filter 13 to possess a capability to suppress the pump wave intensity, which is higher relative to the FWM wave intensity, but pass the FWM waves having carrier angular frequencies which are closely packed with respect to the pump waves. However, it is difficult to sufficiently suppress the pump wave using only one wavelength filter, and therefore, it is general practice to employ a multi-stage optical filter. Therefore, the FWM wave or the signal wave suffers loss of the power and limitation of the bandwidth, and the circuit arrangement has been complicated. In the case of using the optical parametric circuit as the optical amplification circuit, there have been similar problems.

Also, in the conventional optical parametric circuits, when a phase conjugate signal (i.e. FWM wave F) is generated upon injection of an signal wave S, the carrier angular frequency is shifted from $\omega_S$ to $\omega_f (=\omega_{P1}+\omega_{P2}-\omega_S)$, using the examples of FIGS. 56A and 56E. This presents a problem that when using the optical parametric circuit as a phase conjugation circuit in an optical fiber transmission system, the carrier angular frequency of transmitted optical signals is changed by passing through the phase conjugation circuit.

Furthermore, when the optical parametric circuit is to be used as a simultaneous wavelength conversion circuit for wavelength-division multiplexed signals, if the carrier angular frequencies $\omega_{Sm}$, $\omega_{Sn}$ of the two signal waves $S_m$, $S_n$ and the carrier angular frequencies $\omega_{P1}$, $\omega_{P2}$ of the pump waves are related in such a way to satisfy the equation:

$$\omega_{Sm} + \omega_{Sn} = \omega_{P1} + \omega_{P2}$$

then the carrier angular frequencies of the FWM waves $F_m$ and $F_n$ are set to $\omega_{Sn}$ and $\omega_{Sm}$, meaning that the effect of interchanging the carrier angular frequencies of the signal waves would be obtained. However, in the conventional optical parametric circuits, the carrier angular frequencies of the FWM wave $F_m$ becomes equal to that of the signal wave $S_n$, and similarly, the carrier angular frequencies of the FWM wave $F_n$ becomes equal to that of the signal wave $S_m$. Therefore, it is not possible to separate the FWM waves $F_m$ and $F_n$ from the signal waves $S_n$ and $S_m$ using any wavelength filtering devices.

SUMMARY OF THE INVENTION

It is an object of the present invention to provide an optical parametric circuit to enable separation of four-wave-mixing wave(s) from signal wave(s) and pump waves without using wavelength filtering means, or to enable a separation of a four-wave-mixing wave from either signal wave(s) or pump waves, and to apply this optical circuit to functional devices.

The first object to separate generated four-wave-mixing wave(s) from signal wave(s) and pump waves is achieved in an optical parametric circuit comprising: a nonlinear optical medium for generating waves having carrier angular frequencies $\omega_{fj}(=\omega_{P1}+\omega_{P2}-\omega_{Sj};$ j=1, 2, ... N) from waves having carrier angular frequencies $\omega_{Sj}$, $\omega_{P1}$, and $\omega_{P2}$; an optical directional coupler having a first input port, second input port, first output port and second output port for separating waves having carrier angular frequencies $\omega_{Sj}$, $\omega_{P1}$, $\omega_{P2}$ and $\omega_{fj}$ into respective waves of an equal intensity and a polarization state; a first dispersive optical medium having a length dimension $L_1$ and a propagation constant $K_1(\omega)$ for connecting the first output port of the optical directional coupler with one end of the nonlinear optical medium; a second dispersive optical medium having a length dimension $L_2$ and a propagation constant $K_2(\omega)$ for connecting the second output port of the optical directional coupler with the other end of the nonlinear optical medium; wherein signal waves having carrier angular frequencies $\omega_{S1}, \omega_{S2}, \ldots, \omega_{SN}$ and pump waves having carrier angular frequencies $\omega_{P1}, \omega_{P2}$ are injected into the first input port of the optical directional coupler so as to output four-wave-mixing waves $\omega_{fj}$ generated in the nonlinear optical medium from the second input port of the optical directional coupler, and wherein the carrier angular frequencies $\omega_{Sj}$, $\omega_{P1}$, $\omega_{P2}$ and $\omega_{fj}$ are related by an expression:

$$\{K_2(\omega_{fj})+K_2(\omega_{Sj})-K_2(\omega_{P1})-K_2(\omega_{P2})\}L_2=\{K_1(\omega_{fj})+K_1(\omega_{Sj})-K_1(\omega_{P1})-K_1(\omega_{P2})\}L_1+(2n-1\pm\alpha)\pi$$

where n is an integer and an allowable error $\alpha$ is in a range $0 \leq \alpha < 1/2$.

The optical parametric circuit configuration presented above enables the separation of the generated four-wave-mixing waves (FWM waves) from the signal waves and the pump waves, without using wavelengh-division optical demultiplexing means such as wavelength filters, by using the dispersive optical media which satisfy the specified conditions.

Accordingly, bandwidth limitations imposed by wavelength filters do not apply, and ultrafast processing of optical signals becomes possible and close packing of the carrier angular frequencies of the signal and pump waves enables to improve the generation efficiency of FWM waves.

The optical parametric circuit of the present invention also enables a heretofore unachieved task of separating optical phase conjugation waves, having carrier angular frequencies equal to or near the carrier angular frequencies of the signal waves, from the signal and pump waves.

The parametric circuit of the present invention also enables a heretofore unachieved task of wavelength interchange of wavelength-division multiplexed signal waves.

Even if optical noise components are included in the signal waves and pump waves, they are eliminated together with the signal and pump waves, thus improving the signal to noise ratio of FWM waves (phase conjugate waves and wavelength converted waves) by eliminating superposition of the noise signal components thereon.

Also, the second object to separate FWM wave(s) from either pump waves or signal wave(s) is achieved by using the same configuration as the above optical parametric circuit wherein the pump waves are injected into the first input port of the optical directional coupler, while the signal waves are injected into the second input port.

If the carrier angular frequencies $\omega_{Sj}$, $\omega_{P1}$, $\omega_{P2}$, and $\omega_{fj}$ are related by an expression:

$$\{K_2(\omega_{fj})+K_2(\omega_{Sj})-K_2(\omega_{P1})-K_2(\omega_{P2})\}L_2=\{K_1(\omega_{fj})+K_1(\omega_{Sj})-K_1(\omega_{P1})-K_1(\omega_{P2})\}L_1+(2n\pm\alpha)\pi$$

the FWM waves generated in the nonlinear optical medium are output with the signal waves amplified in the nonlinear optical medium from the second input port, and separated from the pump waves which are output from the first input port.

On the other hand, if the carrier angular frequencies $\omega_{Sj}$, $\omega_{P1}$, $\omega_{P2}$, and $\omega_{fj}$ are related by an expression:

$$\{K_2(\omega_{fj})+K_2(\omega_{Sj})-K_2(\omega_{P1})-K_2(\omega_{P2})\}L_2=\{K_1(\omega_{fj})+K_1(\omega_{Sj})-K_1(\omega_{P1})-K_1(\omega_{P2})\}L_1+(2n-1\pm\alpha)\pi$$

the FWM waves generated in the nonlinear optical medium are output with the pump waves from the first input port, and separated from the signal waves amplified in the nonlinear optical medium which are output from the second input port.

In the above cases, by using appropriate optical dispersive media, it is possible to couple the signal wave(s) and the pump waves and to separate the generated FWM wave(s) from either the pump waves or the signal wave(s) using the optical demultiplexing means such as wavelength filters. Even if optical noise components are contained in the pump waves input, the optical noise components are not output with either the generated FWM waves or the amplified signal waves.

It should be noted that signal waves of carrier angular frequencies $\omega_{Sj}$ (j=1, 2, ... N) include a single frequency signal wave having a singular frequency $\omega_{S1}$ or $\omega_S$, and, of course, in this case, the output FWM wave having a singular frequency $\omega_f (=\omega_{P1}+\omega_{P2}-\omega_S)$ is output. Furthermore, either of the lengths $L_1$ and $L_2$ of the first and second dispersive optical media used in the parametric circuit of the present invention may be zero, i.e. the present invention includes those cases in which only one dispersive optical medium is used.

An FWM circuit using the so-called Sagnac interference device but without using the dispersive optical media is known in "A fiber frequency shifter with broad bandwidth, high conversion efficiency, pump and pump ASE cancellation, and rapid tunability for WDM optical networks", IEEE Photonics Technology Letters, Eric A. Swanson and John D. Moores, vol. 6, pp260–263, (1994). In this FWM circuit, the pump waves and the signal wave are injected into the different input ports of an optical directional coupler, and the generated FWM wave is output with the signal wave. Therefore, when the signal waves and the FWM waves have the same or similar carrier angular frequencies, it is not possible to isolate the FWM waves. This FWM circuit is therefore inapplicable to applications such as spectral inversion circuit with no wavelength shift or wavelength interchanging circuit of WDM signal waves.

As explained above, by using the optical parametric circuit of the present invention, it is possible to perform high efficiency, high S/N ratio, and wide-bandwidth optical processing such as wavelength conversion, phase conjugation generation (spectral inversion), optical signal amplification and all-optical switching, without the influence of high-power pump waves. All-optical switching includes such applications as optical pulse multiplexing circuit, optical pulse demultiplexing circuit, and optical waveform sampling circuit.

BRIEF DESCRIPTION OF THE DRAWINGS

FIG. 11 is a schematic drawing of the configuration of Embodiment 2 of the optical parametric circuit of the present invention.

FIG. 39 shows the spectra of a pump wave and an FWM wave both of which are output from port 20a.

FIGS. 54A–54E show the spectra of each wave in the circuit shown in FIG. 53.

FIG. 55 is a schematic diagram of a conventional optical phase conjugation circuit.

FIGS. 56A–56E show the spectra of each wave in the circuit shown in FIG. 55.

DESCRIPTION OF THE PREFERRED EMBODIMENTS

Preferred embodiments will be explained with reference to the drawings.

Embodiment 1

Figure 1:
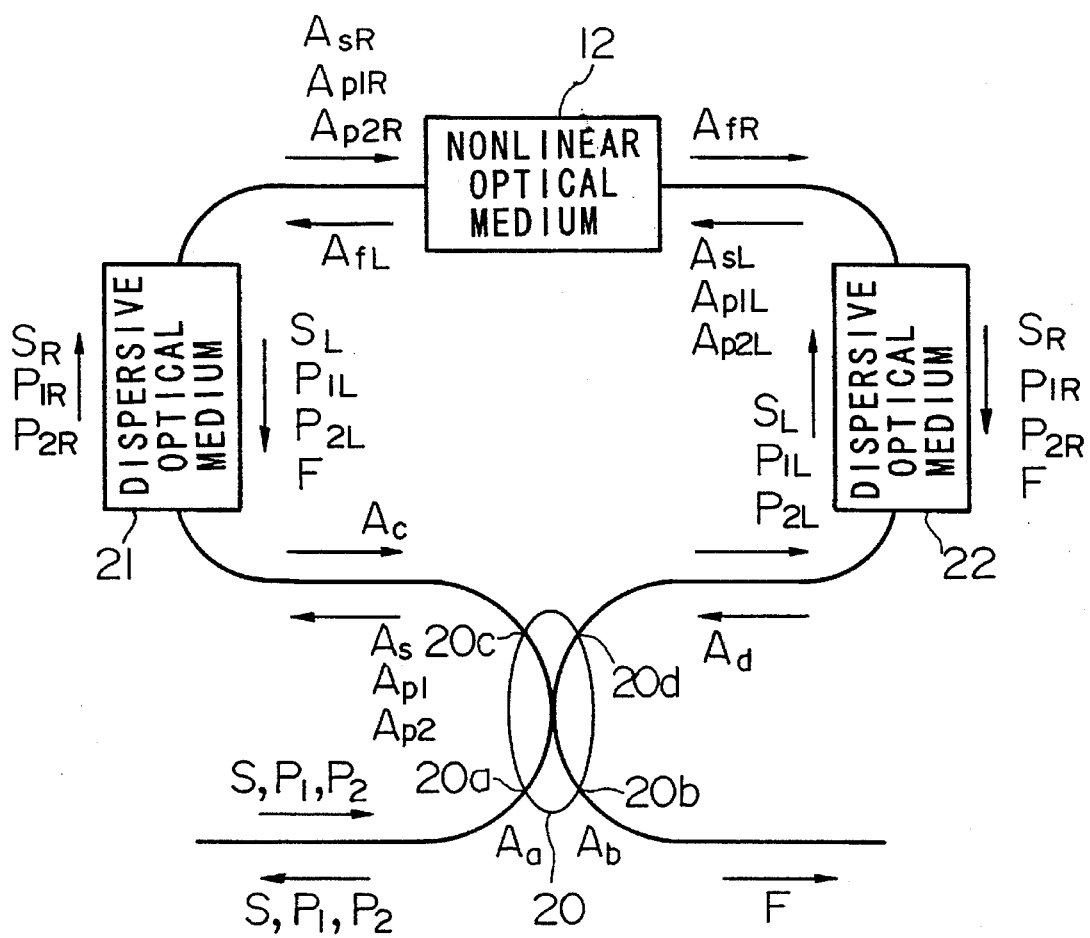
FIG. 1 is a schematic drawing of the configuration of a Embodiment 1 of the optical parametric circuit of the present invention.

FIG. 1 is a schematic diagram of the optical parametric circuit of the present invention being used as an FWM wave generation circuit.

With reference to FIG. 1, a nonlinear optical medium 12 is inserted between two dispersive optical media 21, 22 to which ports 20c, 20d of a 2×2 optical directional coupler 20 are respectively connected. The optical directional coupler 20 has a capability to separate optical waves having carrier frequencies (shortened to carrier frequency hereinbelow) $\omega_S$, $\omega_{P1}$, $\omega_{P2}$, $\omega_f(=\omega_{P1}+\omega_{P2}-\omega_S)$ at equal intensities and equal polarization state. The length of the dispersive optical medium 21 which joins pore 20c with the nonlinear optical medium 12 is denoted by $L_1$ and the propagation constant therein by $K_1(\omega)$, and the length of the dispersive optical medium 22 which joins port 20d and the nonlinear optical medium 12 is denoted by $L_2$ and the propagation constant therein by $K_2(\omega)$. A typical example of the dispersive optical medium would be an optical waveguide.

Figure 2A:
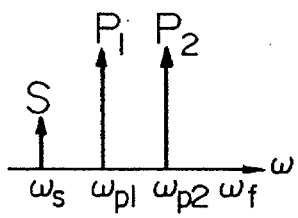
FIGS. 2A–2C present the spectra of each wave in Embodiment 1.

A signal wave S having the carrier frequency $\omega_S$ and the pump waves $P_1$, $P_2$ having the carrier frequencies $\omega_{P1}$, $\omega_{P2}$ (refer to FIG. 2A) are injected into the port 20a of the optical directional coupler 20, and are separated at ports 20c, 20d into waves of equal intensities and polarization states, respectively. However, the phases of the signal wave $S_L$ and the pump waves $P_{1L}$, $P_{2L}$ output from port 20d, which is the cross-port with respect to port 20a, are retarded by 90 degrees from the phases of the signal wave $S_R$ and the pump waves $P_{1R}$, $P_{2R}$ output from port 20c, which is the through-port with respect to port 20a. Therefore, if the complex electrical field amplitude (hereinafter shortened to complex amplitude) of the signal wave $S_R$ at port 20c is denoted by $A_S$, and the complex amplitudes of the pump waves $P_{1R}$, $P_{2R}$ at port 20c are denoted by $A_{P1}$, $A_{P2}$, then the complex amplitude of the signal wave $S_L$ at port 20d is given by: $A_S \cdot \exp(-i\pi/2)$, and the complex amplitudes of the pump waves $P_{1L}$, $P_{2L}$ are given by $A_{P1} \cdot \exp(-i\pi/2)$, $A_{P2} \cdot \exp(-i\pi/2)$, respectively.

Reviewing the above, the signal wave $S_R$ and the pump waves $P_{1R}$, $P_{2R}$ separated to port 20c of the optical directional coupler 20 propagates in the direction of the dispersive optical medium 21→nonlinear optical medium 12→dispersive optical medium 22→port 20d, i.e. in the clockwise direction. Here, the complex amplitudes $A_{SR}$, $A_{P1R}$, and $A_{P2R}$ of the clockwise signal $S_R$ and the pump waves $P_{1R}$, $P_{2R}$ which are input from port 20c via dispersive optical medium 21 into nonlinear optical medium 12 are expressed as follows.

$$A_{SR} = A_S \cdot \exp(-iK_1(\omega_S)L_1) \tag{1}$$

$$A_{P1R} = A_{P1} \cdot \exp(-iK_1(\omega_{P1})L_1) \tag{2}$$

$$A_{P2R} = A_{P2} \cdot \exp(-iK_1(\omega_{P2})L_1) \tag{3}$$

In the meanwhile, the signal wave $S_L$ and the pump waves $P_{1L}$, $P_{2L}$ separated to port 20d of the optical directional coupler 20 propagate in the direction of the dispersive optical medium 22→nonlinear optical medium 12→dispersive optical medium 21→port 20c, i.e. in the counter-clockwise direction. Here, the complex amplitudes $A_{SL}$, $A_{P1L}$ and $A_{P2L}$ of the counter-clockwise signal $S_L$ and the pump waves $P_{1L}$, $P_{2L}$ which are input from port 20d via dispersive optical medium 22 into nonlinear optical medium 12 are expressed as follows.

$$A_{SL} = A_S \cdot \exp(-iK_2(\omega_S)L_2 - i\pi/2) \tag{4}$$

$$A_{P1L} = A_{P1} \cdot \exp(-iK_2(\omega_{P1})L_2 - i\pi/2) \tag{5}$$

$$A_{P2L} = A_{P2} \cdot \exp(-iK_2(\omega_{P2})L_2 - i\pi/2) \tag{6}$$

Figure 2B:
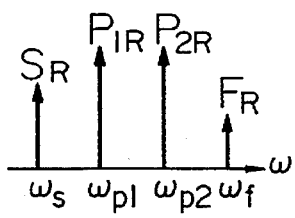

Within the nonlinear optical medium 12, due to the third-order optical parametric effect induced by the propagation of the clockwise signal wave $S_R$ and the pump waves $P_{1R}$ and $P_{2R}$, a clockwise FWM wave $F_R$ having the carrier frequency $\omega_f(=\omega_{P1}+\omega_{P2}-\omega_S)$ is generated (refer to FIG. 2B). Similarly, due to the third-order parametric effect induced by the propagation of the counter-clockwise signal wave $S_L$ and the pump waves $P_{1L}$ and $P_{2L}$, a counter-clockwise FWM wave $F_L$ having the carrier frequency $\omega_f$ is generated. The clockwise and counter-clockwise components again enter the optical directional coupler 20 and produce interference.

In this case, although the signal waves $S_R$, $S_L$ and the pump waves $P_{1R}$, $P_{2R}$, $P_{1L}$ and $P_{2L}$ undergo phase shift due to chromatic dispersion while propagating in the nonlinear optical medium 12 and the dispersive optical media 21, 22 and due to nonlinear effects (self-phase modulation, cross-phase modulation) in the nonlinear optical medium 12, there is no phase shift difference between the counter-clockwise and clockwise waves themselves. Therefore, this optical circuit functions essentially as a so-called optical loop mirror (refer to D. B. Mortimore, "Fiber loop reflectors", IEEE Journal of Lightwave Technology, vol. 6, pp.1217–1224, 1988) to the signal wave S and the pump waves $P_1$, $P_2$, and in principle, 100% of the signal wave S and the pump waves $P_1$, $P_2$ is output to port 20a.

Here, the complex amplitude $A_{fR}$ of a clockwise FWM wave $F_R$ generated by the clockwise signal wave $S_R$ and the clockwise pump waves $P_{1R}$, $P_{2R}$ (expressed by the expressions (1), (2) and (3)) is given by the following expression.

$$A_{fR} = C \cdot A_{SR}^* \cdot A_{P1R} \cdot A_{P2R} \quad (7)$$
$$= C \cdot A_S^* \cdot A_{P1} \cdot A_{P2} \cdot \exp[i(K_1(\omega_S) - K_1(\omega_{P1}) - K_1(\omega_{P2}))L_1]$$

Also, the complex amplitude $A_{fL}$ of a counter-clockwise FWM wave $F_L$ generated by the counter-clockwise signal wave $S_L$ and the counter-clockwise pump waves $P_{1L}$, $P_{2L}$ (expressed by the expressions (4), (5) and (6)) is given by the following expression.

$$A_{fL} = C \cdot A_{SL}^* \cdot A_{P1L} \cdot A_{P2L} \quad (8)$$
$$= C \cdot A_S^* \cdot A_{P1} \cdot A_{P2} \cdot \exp[i(K_2(\omega_S) - K_2(\omega_{P1}) - K_2(\omega_{P2}))L_2 - i\pi/2]$$

where $A_S^*$ is the complex conjugate of $A_S$ and C is the square root of the conversion efficiency given by an expression: (intensity of FWM wave/(intensity of signal wave S×intensity of pump wave $P_1$×intensity of pump wave $P_2$)).

The complex amplitudes $A_d$, $A_c$ of the clockwise and counter-clockwise FWM waves $F_R$, $F_L$, as each wave arrives at the ports 20d, 20c through the respective dispersive optical medium 22, 21, are given by the following expressions.

$$A_d = A_{fR} \cdot \exp(-iK_2(\omega_f)L_2) \quad (9)$$
$$= C \cdot A_S^* \cdot A_{P1} \cdot A_{P2} \cdot \exp[-i(K_1(\omega_f)L_1 + K_2(\omega_f)L_2)] \cdot \exp(i\Delta K_1 L_1)$$

$$A_c = A_{fL} \cdot \exp(-iK_1(\omega_f)L_1) \quad (10)$$
$$= C \cdot A_S^* \cdot A_{P1} \cdot A_{P2} \cdot \exp[-i(K_1(\omega_f)L_1 + K_2(\omega_f)L_2)] \cdot \exp(i\Delta K_2 L_2 - i\pi/2)$$

where $$\Delta K_1 = K_1(\omega_S) + K_1(\omega_f) - K_1(\omega_{P1}) - K_1(\omega_{P2}) \quad (11)$$

and $$\Delta K_2 = K_2(\omega_S) + K_2(\omega_f) - K_2(\omega_{P1}) - K_2(\omega_{P2}) \quad (12).$$

In the optical directional coupler 20, the clockwise and counter-clockwise FWM waves $F_R$, $F_L$ interfere, and the complex amplitudes $A_a$, $A_b$ of the FWM waves output from ports 20a, 20b are given by the following expressions.

$$A_a \propto A_c + A_d \cdot \exp(-i\pi/2) \quad (13)$$
$$\propto \exp(i\Delta K_2 L_2) + \exp(i\Delta K_1 L_1)$$

$$A_b \propto A_c \cdot \exp(-i\pi/2) + A_d \quad (14)$$
$$\propto -\exp(i\Delta K_2 L_2) + \exp(i\Delta K_1 L_1)$$

Figure 2C:
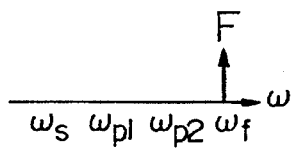

It follows that when the dispersive optical media 21, 22 fulfil the condition that:

$$\Delta K_2 L_2 = \Delta K_1 L_1 + (2n-1)\pi \quad (15)$$

where n is an integer, then, in principle, 100% of FWM wave F can be output to port 20b, as illustrated in FIG. 2C.

The above results mean that it becomes possible to separate the FWM wave F generated in the nonlinear optical medium 12 from the signal wave S and the pump waves $P_1$, $P_2$ without the use of such wavelength-division demultiplexing means as wavelength filters.

Even when some optical noise is contained in the signal wave and the pump waves $P_1$, $P_2$, the optical noise is output together with the signal wave S and the pump waves $P_1$, $P_2$ from port 20a. There is no danger of the noise components becoming mixed in the FWM wave F.

It may be noted that taking into account certain allowable error $\alpha$ ($0 \leq \alpha < \frac{1}{2}$) in expression (15), the following expression is obtained:

$$\Delta K_2 L_2 = \Delta K_1 L_1 + (2n-1\pm\alpha)\pi \quad (16)$$

In this case, depending on the magnitude of the allowable error $\alpha$, the output intensity level of FWM wave F output to port 20b is lowered; however, the signal wave S and the pump waves $P_1$, $P_2$ are never output to port 20b. Therefore, no problems can occur in practice.

When using a degenerate pump wave, the substitutions are made in the above expressions such that $\omega_{P1} = \omega_{P2}$, and $A_{P1} = A_{P2}$. Also, when only one dispersive optical medium is being used, either $L_1$ or $L_2$ in the above expressions is set equal to zero.

Variation 1 of Embodiment 1

Figure 3A:
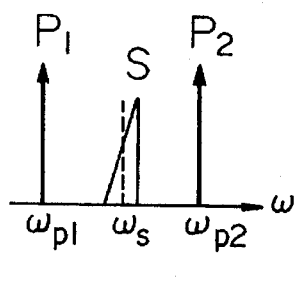
FIGS. 3A–3C present the spectra of each wave in Variation 1 of Embodiment 1.
Figure 3B:
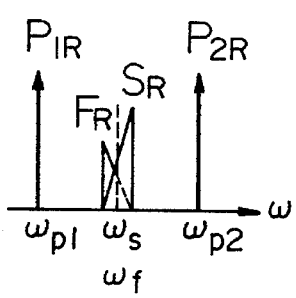
Figure 3C:
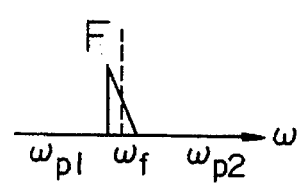

The first variation of the Embodiment 1 of the FWM wave generation circuit has the same circuit configuration as that shown in FIG. 1, in which $\omega_S$ and $\omega_f$ become symmetrical with respect to $(\omega_{P1} + \omega_{P2})/2$, and the generated FWM wave F becomes a phase conjugation wave of an input signal wave S. As shown in FIG. 3A, the carrier frequencies of the signal wave S and the pump waves $P_1$, $P_2$ are related such that $\omega_{P1} < \omega_S < \omega_{P2}$ and $\omega_S = (\omega_{P1} + \omega_{P2})/2$, then as shown in FIG. 3B, the carrier frequencies of the clockwise wave $S_R$ and the FWM wave (phase conjugation wave) $F_R$ become equal. The same result is produced with respect to the counter-clockwise signal wave $S_L$. In this case (Variation 1 of Embodiment 1) also, the separation of the signal wave S and the FWM wave (phase conjugation wave) F is possible according to the principle presented above (refer to FIG. 3C).

Variation 2 of Embodiment 1

Similarly, an example of using the degenerate wave in the parametric circuit of FIG. 1 will be explained, i.e., the carrier frequencies $\omega_{P1}$ and $\omega_{P2}$ of the pump waves are such that $\omega_{P1} = \omega_{P2} = \omega_P$.

Figure 4:
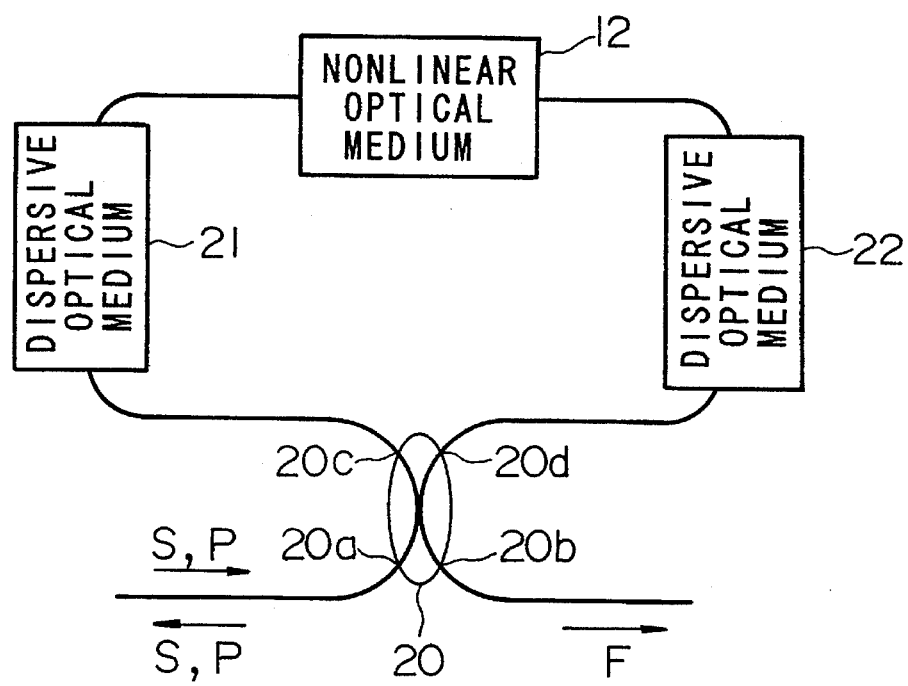
FIG. 4 is a configuration of the optical parametric circuit in Variation 2 of Embodiment 1.
Figure 5A:
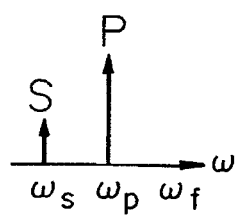
FIGS. 5A and 5B present the spectra of each wave in Variation 2 of Embodiment 1.
Figure 5B:
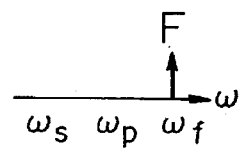

As shown in FIG. 4, when a signal wave S of carrier frequency $\omega_S$ and the pump wave of carrier frequency $\omega_P$ are injected into port 20a of the optical directional coupler 20, an FWM wave F of carrier frequency $\omega_f$ ($=2\omega_P - \omega_S$) is generated in the nonlinear optical medium 12 (refer to FIG. 5B). The FWM wave F is output from port 20b of the optical directional coupler 20, while the signal wave S and the pump wave P are output from port 20a of the optical directional coupler 20.

Variation 3 of Embodiment 1

Similarly in the optical parametric circuit of FIG. 1, a case of injecting signal waves $S_1, S_2, \ldots S_N$ (carrier frequencies $\omega_{S1}, \omega_{S2}, \ldots \omega_{SN}$) multiplexed in the wavelength region and the pump waves $P_1$, $P_2$ of carrier frequencies $\omega_{P1}$, $\omega_{P2}$ into port 20a of the optical directional coupler 20 will be explained. However, the intensity of each signal wave is chosen so as to be able to ignore the mutual nonlinear interaction of the signal waves.

Figure 6:
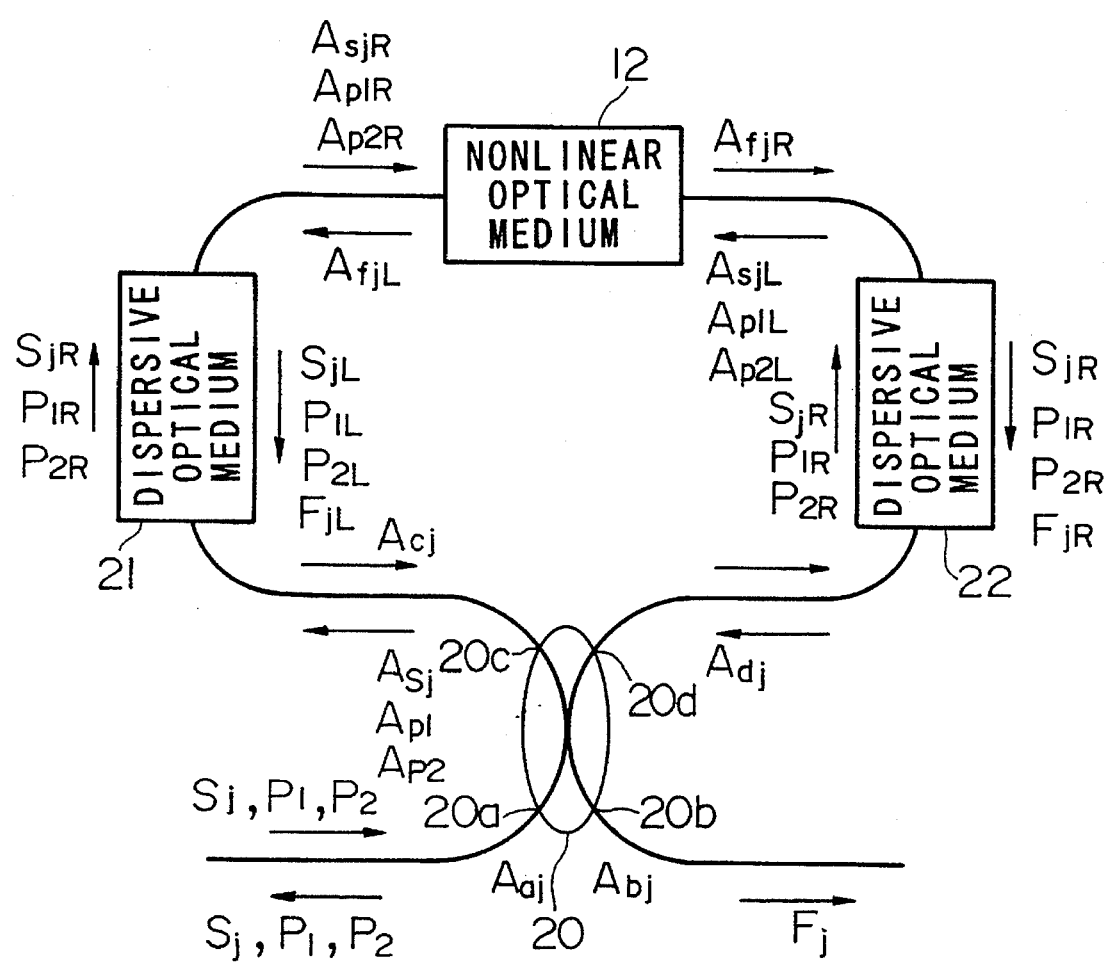
FIG. 6 is a configuration of the optical parametric circuit in Variation 3 of Embodiment 1.
Figure 7A:
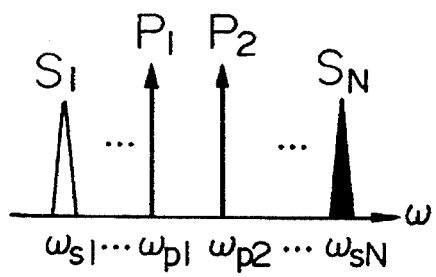
FIGS. 7A–7C present the spectra of each wave in Variation 3 of Embodiment 1.

As shown in FIG. 6, the wavelength-division multiplexed signal waves (WDM signal waves) $S_1, S_2, \ldots S_N$ and the pump waves $P_1$, $P_2$ (refer to FIG. 7A) are separated to port 20c of the optical directional coupler 20, and propagate successively through the dispersive optical medium 21→nonlinear optical medium 12→dispersive optical medium 22→port 20d in the clockwise direction. Here, the complex amplitude $A_{SjR}$ of the clockwise jth signal wave $S_{jR}$ of the clockwise WDM signal waves $S_{1R}, \ldots S_{NR}$ input from port 20c into the nonlinear optical medium 12 through the dispersive optical medium 21 is given by the following expression.

$$A_{SjR}=A_{Sj}\cdot\exp(-iK_1(\omega_{Sj})L_1) \quad (1')$$

In the meanwhile, the jth signal wave $S_j$ of the WDM signal waves $S_1, \ldots S_N$ and the pump waves $P_1, P_2$ separated to port 20d of the optical directional coupler 20 propagate through the dispersive optical medium 22→nonlinear optical medium dispersive optical medium 21→port 20c, in the counter-clockwise direction. Here, the complex amplitude $A_{SjL}$ of the counter-clockwise jth signal wave $S_{jL}$ input from port 20d into the nonlinear optical medium 12 through the dispersive optical medium 22 is expressed as follows.

$$A_{SjL}=A_{Sj}\cdot\exp(-iK_2(\omega_{Sj})L_2-i\pi/2) \quad (4')$$

Figure 7B:
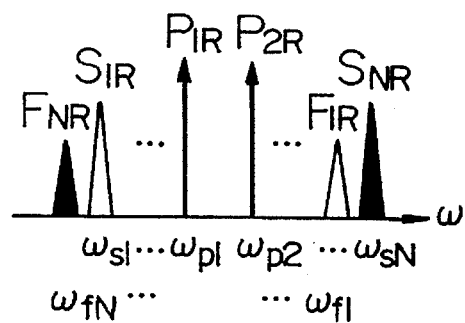

The third-order parametric effect induced by the propagation of the clockwise jth signal wave $S_{jR}$ and the pump waves $P_{1R}, P_{2R}$ in the nonlinear optical medium 12, generates the jth FWM wave $F_{jR}$ of carrier frequency $\omega_{fj}$ ($=\omega_{P1}+\omega_{P2}-\omega_{Sj}$) (refer to FIG. 7B). Similarly, the third-order parametric effect induced by the propagation of the counter-clockwise jth signal wave $S_{jL}$ and the pump waves $P_{1L}, P_{2L}$ generates the jth FWM wave $F_{jL}$ of the carrier frequency $\omega_{fj}$. These clockwise and counter-clockwise propagating components again enter the optical directional coupler 20 to produce interference and, in principle, 100% of the jth signal wave $S_j$ and the pump waves $P_1, P_2$ is output to port 20a.

Here, the complex amplitude $A_{fjR}$ of the clockwise jth FWM wave $F_{jR}$ generated by the clockwise WDM signal wave $S_{jR}$ and the pump waves $P_{1R}, P_{2R}$ is expressed as follows.

$$A_{fjR}=C\cdot A_{Sj}^*\cdot A_{P1}\cdot A_{P2}\cdot\exp[i(K_1(\omega_{Sj})-K_1(\omega_{P1})-K_1(\omega_{P2}))L_1] \quad (7')$$

Similarly, the complex amplitude $Af_{jL}$ of the counter-clockwise jth FWM wave $F_{jL}$ generated by the counter-clockwise jth signal wave $S_{jL}$ and the pump waves $P_{1L}, P_{2L}$ is expressed as follows.

$$A_{fjL}=C\cdot A_{Sj}^*\cdot A_{P1}\cdot A_{P2}\cdot\exp[i(K_2(\omega_{Sj})-K_2(\omega_{P1})-K_2(\omega_{P2}))L_2-i\pi/2] \quad (8')$$

The complex amplitudes $A_{dj}, A_{cj}$ of the clockwise and counter-clockwise jth FWM waves $F_{jR}, F_{jL}$ upon arrival at ports 20d, 20c through the dispersive optical media 22, 21 are given by the following expressions.

$$A_{dj}=C\cdot A_{Sj}^*\cdot A_{P1}\cdot A_{P2}\cdot\exp[-i(K_1(\omega_{fj})L_1+K_2(\omega_{fj})L_2)]\cdot\exp(i\Delta K_{1j}L_1) \quad (9')$$

$$A_{cj}=C\cdot A_{Sj}^*\cdot A_{P1}\cdot A_{P2}\cdot\exp[-i(K_1(\omega_{fj})L_1+K_2(\omega_{fj})L_2)]\cdot\exp(i\Delta K_{2j}L_2-i\pi/2) \quad (10')$$

where $$\Delta K_{1j}=K_1(\omega_{Sj})+K_1(\omega_{fj})-K_1(\omega_{P1})-K_1(\omega_{P2}) \quad (11')$$

and $$\Delta K_{2j}=K_2(\omega_{Sj})+K_2(\omega_{fj})-K_2(\omega_{P1})-K_2(\omega_{P2}) \quad (12')$$

In the optical directional coupler 20, the clockwise and counter-clockwise jth waves $F_{jR}, F_{jL}$ interfere, and the complex amplitudes $A_{aj}, A_{bj}$ of the jth FWM wave $F_j$ output to ports 20a, 20b are given by the following expressions.

$$A_{aj}\propto\exp(i\Delta K_{2j}L_2)+\exp(i\Delta K_{1j}L_1) \quad (13')$$

$$A_{bj}\propto-\exp(i\Delta K_{2j}L_2)+\exp(i\Delta K_{1j}L_1) \quad (14')$$

Figure 7C:
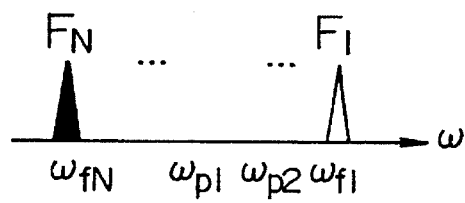

It follows that when the dispersive optical media 21, 22 fulfil the condition that:

$$\Delta K_{2j}L_2=\Delta K_{1j}L_1+(2n-1)\pi \quad (15')$$

where n is an integer, then, in principle, 100% of the jth FWM wave $F_j$ can be output to port 20b (refer to FIG. 7C), thus completely separating the jth signal wave $S_j$, and the pump waves $P_1, P_2$ therefrom.

By configuring the optical parametric circuit as demonstrated above which uses the dispersive optical media 21, 22 satisfying the expression (15') for each j=1,2, ... N, it becomes possible to completely separate the FWM waves $F_1, \ldots FN$ obtained by simultaneous wavelength conversion of each wavelength of the WDM signal waves $S_1, \ldots S_N$, from the WDM signal waves $S_1, \ldots S_N$ and the pump waves $P_1, P_2$ without the use of such wavelength separation means such as wavelength filters.

Also, if the carrier frequencies $\omega_{Sm}, \omega_{Sn}$ of the two signal waves $S_m, S_n$ and the carrier frequencies $\omega_{P1}, \omega_{P2}$ of the pump waves $P_1, P_2$ are related in such a way to satisfy the equation:

$$\omega_{Sm}+\omega_{Sn}=\omega_{P1}+\omega_{P2}$$

then the carrier frequencies of the FWM waves $F_m, F_n$ are set to $\omega_{Sn}$ and $\omega_{Sm}$, and wavelength interchange of the signal waves will be obtained.

It may be noted that taking into account certain allowable error $\alpha$ ($0\leq\alpha<\frac{1}{2}$) in expression (15'), the following expression is obtained:

$$\Delta K_{2j}L_2=\Delta K_{1j}L_1+(2n-1\pm\alpha)\pi \quad (16')$$

In this case, depending on the magnitude of the allowable error $\alpha$, the output intensity level of the jth FWM wave $F_j$ output to port 20b is lowered; however, the WDM signal waves $S_1, \ldots S_N$, and the pump waves $P_1, P_2$ are never output to port 20b.

When using degenerate pump waves, the substitutions are made in the above expressions such that $\omega_{P1}=\omega_{P2}$, and $A_{P1}=A_{P2}$. Also, when only one dispersive optical medium is being used, either $L_1$ or $L_2$ in the above expressions is set equal to zero.

Variation 4 of Embodiment 1

The fourth variation of the Embodiment 1 of the FWM wave generation circuit has the same circuit configuration as that shown in FIG. 6, in which the carrier frequencies $\omega_{S1}, \omega_{S2}, \ldots \omega_{SN}, \omega_{P1}, \omega_{P2}$ of the WDM signal waves $S_1, S_2, \ldots S_N$ and the pump waves $P_1, P_2$ satisfy the following expression:

$$\omega_{P1}<\omega_{Sj}<\omega_{P2}$$

for j=1,2, ... N.

Figure 8A:
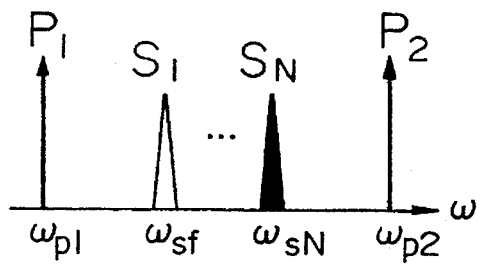
FIGS. 8A and 8B present spectra of each wave in a Variation 4 of Embodiment 1 to facilitate separation of four-wave-mixing wave.
Figure 8B:
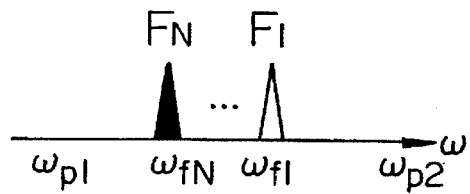

It should be noted that, in addition to the FWM wave $F_j$ of a carrier frequency $\omega_{P1}+\omega_{P2}-\omega_{Sj}$ generated in the nonlinear optical medium 12, unwanted FWM waves of carrier frequencies $2\omega_{P1}-\omega_{Sj}, 2\omega_{P2}-\omega_{Sj}$ are produced by the degenerate pump waves $P_1, P_2$, at a spacing $|\omega_{P1}-\omega_{P2}|$. If the carrier frequencies of the WDM signal wave $S_1, S_2, \ldots S_N$ and the pump waves $P_1, P_2$ satisfy the expression $\omega_{P1}<\omega_{Sj}<\omega_{P2}$ (j=1,2, ... N), as shown in FIG. 8A, the FWM wave $F_j$ of carrier frequency $\omega_{P1}+\omega_{P2}-\omega_{Sj}$ excited by the non-degenerate pump waves is generated between the frequencies $\omega_{P1}, \omega_{P2}$, as shown in FIG. 8B. The unwanted FWM waves excited by the degenerate pump waves of carrier frequencies $2\omega_{P1}-\omega_{Sj}, 2\omega_{P2}-\omega_{Sj}$ are generated in a range outside the frequencies $\omega_{P1}, \omega_{P2}$. Thus, the wanted FWM waves can be readily separated from the unwanted FWM waves.

Variation 5 of Embodiment 1

Figure 9:
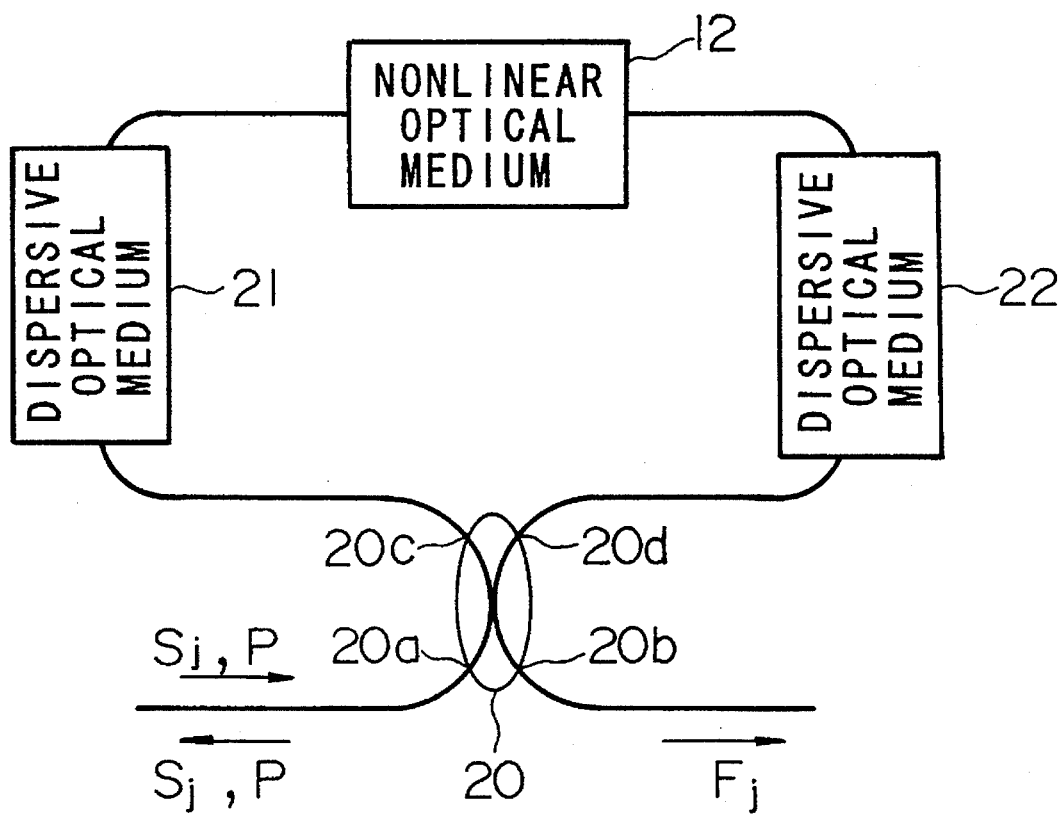
FIG. 9 is a configuration of the optical parametric circuit in Variation 5 of Embodiment 1.

A fifth variation is based similarly on the parametric circuit of FIG. 1, in which a simultaneous wavelength conversion of WDM signal waves is performed by utilizing the degenerate pump wave. Referring to FIG. 9, the pump wave P is the degenerate pump wave of carrier frequency $\omega_P = \omega_{P1} = \omega_{P2}$ which is injected into port 20a of the optical directional coupler 20.

Figure 10A:
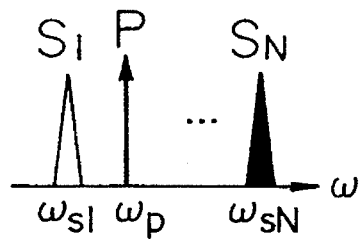
FIGS. 10A and 10B present the spectra of each wave in Variation 5 of Embodiment 1.
Figure 10B:
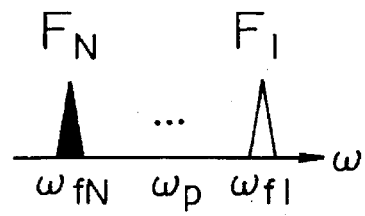

As shown in FIG. 9, when the WDM signal waves $S_1$, $S_2$, ... $S_N$ of carrier frequencies $\omega_{Sj}$ (j=1, 2, ... N) and the pump wave P of carrier frequency $\omega_P$ (refer to FIG. 10A) are injected into port 20a, FWM waves F1, $F_2$, ... $F_N$ of carrier frequencies $\omega_{fj}$ ($=2\omega_P - \omega_{Sj}$) are produced in the nonlinear optical medium 12. The FWM waves F1, $F_2$, ... $F_N$ are output from port 20b of the directional optical coupler 20 (refer to FIG. 10B), and the WDM signal waves $S_1$, $S_2$, ... $S_N$ and the pump wave P are output from port 20a.

Here, if the carrier frequencies $\omega_{Sm}$, $\omega_{Sn}$ of the two signal waves $S_m$, $S_n$ and the carrier frequencies $\omega_P$ of the pump wave P are related in such a way to satisfy the equation:

$$\omega_{Sm} + \omega_{Sn} = 2\omega_P$$

then the carrier frequencies of the FWM waves $F_m$, $F_n$ are set to $\omega_{Sn}$ and $\omega_{Sm}$, and wavelength interchange of the signal waves $S_m$, $S_n$ will be performed.

Embodiment 2

FIG. 11 shows a circuit configuration of Embodiment 2 of the optical parametric circuit of the present invention.

The feature of Embodiment 2 is that the circuit components of FIG. 1 are made as a polarization-maintaining type, that is, the optical directional coupler 23, nonlinear optical medium 24 and the dispersive optical media 25, 26 are all polarization-maintaining devices. This configuration is also applicable to the phase conjugation generation circuit presented in Variation 1 of the first embodiment, and the simultaneous wavelength conversion circuit of the WDM signal waves presented in Variation 2 of the first embodiment.

It should be noted that in the circuit of non-polarization-maintaining type, changes in the polarization states of the signal wave(s) and the pump waves injected will cause the leakage of the signal wave(s) and the pump waves into the FWM wave(s) output from the circuit. Therefore, by making each component to be polarization-maintaining, it is possible to suppress polarization crosstalk within the circuit and improve the isolation of the signal wave(s) and the pump waves with respect to the FWM wave(s). Such polarization-maintaining devices can be a birefringent material such as polarization-maintaining optical fiber, and inputting signal wave(s) and pump waves polarized along the optic axis of the material will enable to preserve the polarization states of the optical waves in the optical circuit. In addition to such polarization-maintaining devices, it is effective in suppressing the polarization crosstalk to insert single-polarization elements such as polarizers, in input/output section or loop section of the circuit.

Variation 1 of Embodiment 2

Figure 12:
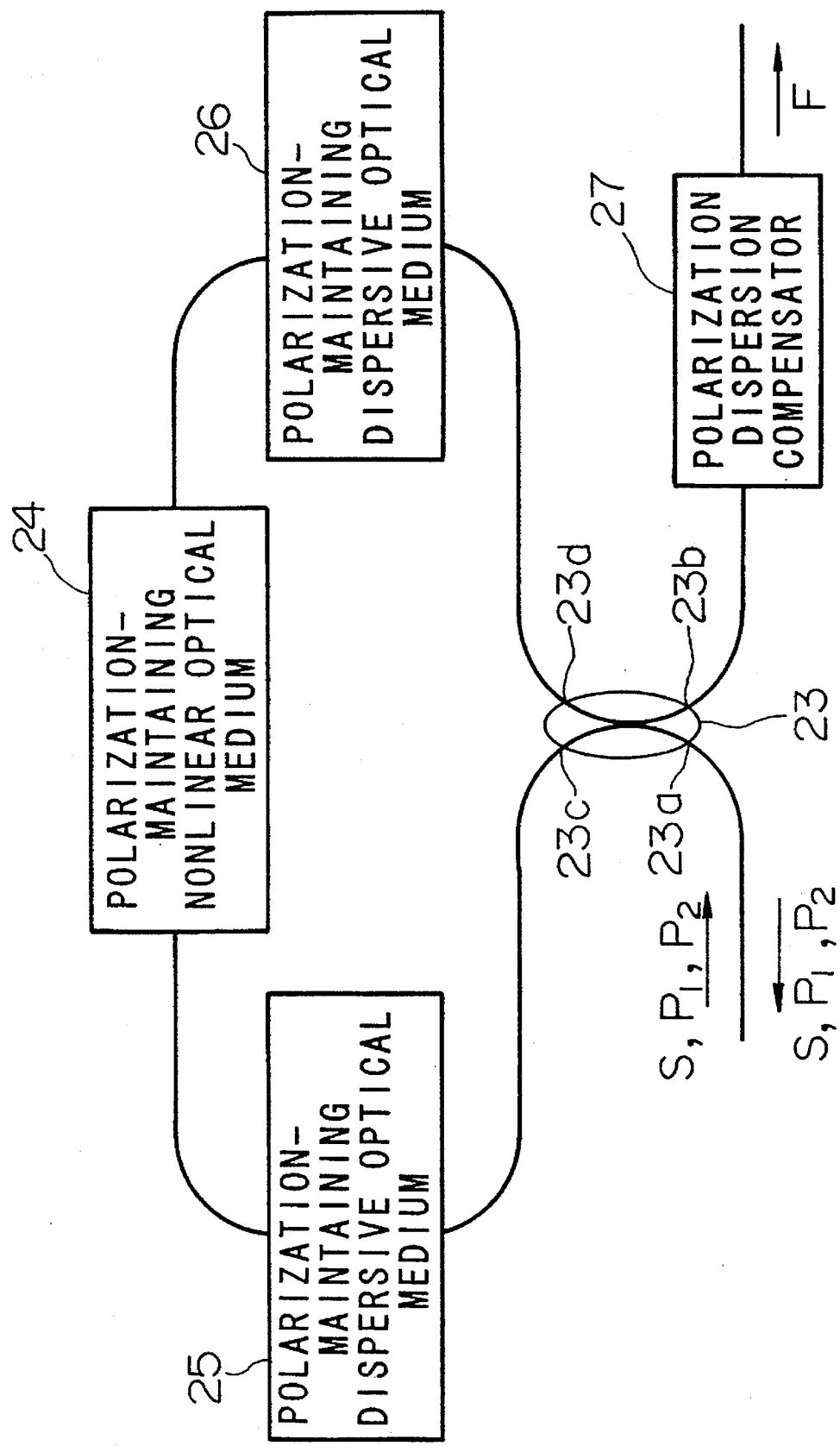
FIG. 12 is a configuration of the optical parametric circuit in Variation 1 of Embodiment 2.

FIG. 12 is an optical parametric circuit having a polarization dispersion compensator 27, such as a birefringent waveguide, added to the circuit shown in FIG. 11. It is also possible to apply the same circuit configuration to the phase conjugation generation circuit presented in Variation 1 of Embodiment 1 and the simultaneous wavelength conversion circuit for WDM signal waves presented in Variation 3 of Embodiment 1.

Changes in the polarization state of the signal wave causes distortions in the waveform of the output FWM wave(s) due to the birefringence (polarization dispersion) in the circuit components in the circuit of polarization-maintaining type. Also, when the conversion gains (expressed as a ratio of intensity of FWM wave to that of signal wave) in the two optic axes (polarization axes) of the polarization-maintaining nonlinear optical medium are not the same, changes in polarization states in the input signal wave(s) will cause variations in the intensity of the output FWM wave(s). Therefore, a polarization dispersion compensator 27, such as a birefringent waveguide as shown in FIG. 12, is used to compensate the total polarization dispersion in the circuit as shown in FIG. 11. By so doing, it is possible to prevent waveform degradation of the FWM wave caused by the changes in the polarization state of the signal wave.

The polarization compensator 27 is, as shown in this figure, disposed at the FWM wave output section (port 23b of the optical directional coupler 23), but it may also be disposed in the input path of the signal wave and at the injection section (port 23a of the coupler 23) of the signal wave or within the loop (between ports 23c and 23d of the coupler 23). Also, a method as disclosed in a U.S. Pat. No. 5,357,359 ("All-optical polarization independent optical time division multiplexer and demultiplexer with birefringence compensation") may also be used, i.e., the two components of each electrical field of the signal wave(s), pump waves and FWM wave(s) polarized along two optic axes of the circuit shown in FIG. 11 are interchanged from one optic axis to another optic axis at points in the optical parametric circuit which compensate the total polarization dispersion within the circuit.

To equalize the conversion gain of the signal wave with respect to the two polarization axes of the polarization-maintaining nonlinear optical medium, when a polarization-maintaining nonlinear optical medium such as polarization-maintaining optical fiber having the same conversion gains with respect to the two polarization axes is used, the pump waves are to be injected into each polarization axis at a 1:1 intensity ratio. When using a device which exhibits two different conversion gains with respect to the two polarization axes, such as semiconductor optical amplifiers, it is necessary to adjust the intensity ratio of the pump waves so as to obtain the same conversion gain in each of the polarization axes.

By so doing, it is possible to make the operation of the optical parametric circuit polarization-insensitive.

Embodiment 3

Figure 13:
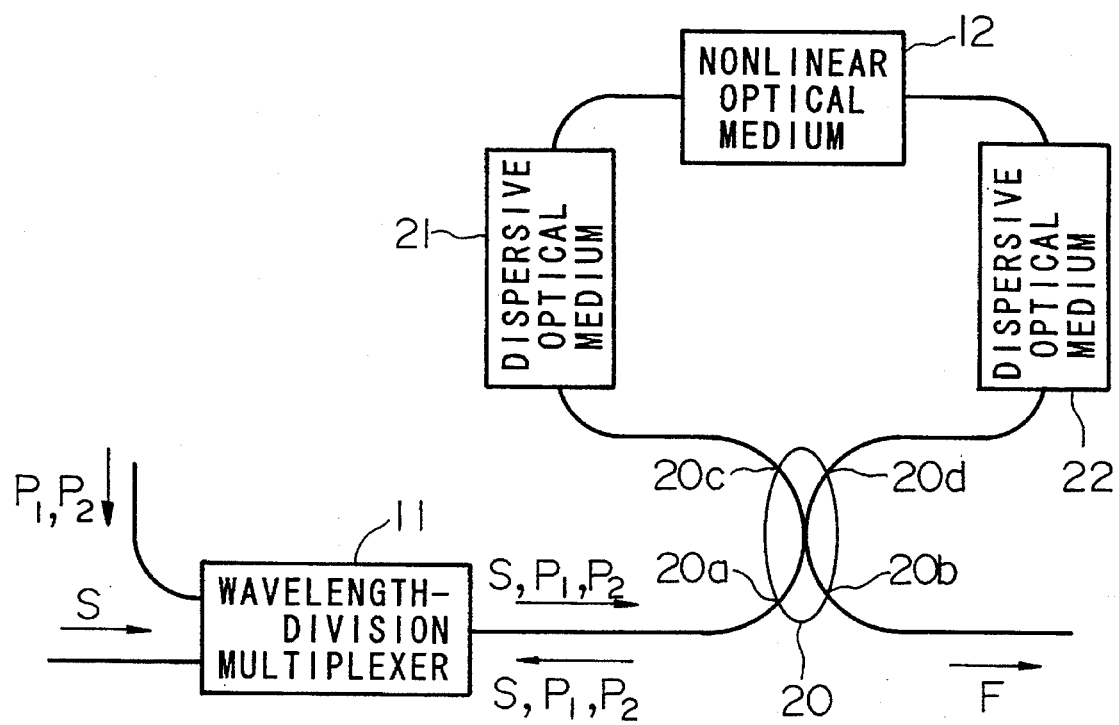
FIG. 13 is a schematic drawing of the configuration of Embodiment 3 of the optical parametric circuit of the present invention.

FIG. 13 shows a circuit configuration of Embodiment 3 of the optical parametric circuit of the present invention used as an FWM wave generation circuit provided with an optical multiplexer for coupling the signal wave with the pump wave.

Figure 14A:
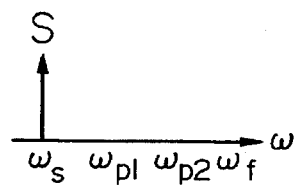
FIGS. 14A and 14B present the spectra of each wave in Embodiment 3.
Figure 14B:
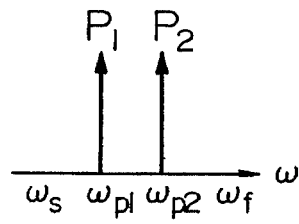

The feature of this embodiment is that a wavelength-division multiplexer 11 has been provided, in front of port 20a of the optical directional coupler 20, to the circuit configuration shown in FIG. 1, for coupling the signal wave S (shown in FIG. 14A) with the pump waves $P_1$, $P_2$ (shown in FIG. 14B). The carrier frequency $\omega_f$ of the output FWM wave F can be tuned by selecting the carrier frequencies $\omega_{P1}$, $\omega_{P2}$ of the pump waves $P_1$, $P_2$. The circuit configuration of Embodiment 3 is applicable to both the phase conjugation generation circuit presented in Variation 1 of Embodiment 1 as well as to the simultaneous wavelength conversion circuit for WDM signal waves presented in Variation 3 of Embodiment 1.

Embodiment 4

Figure 15:
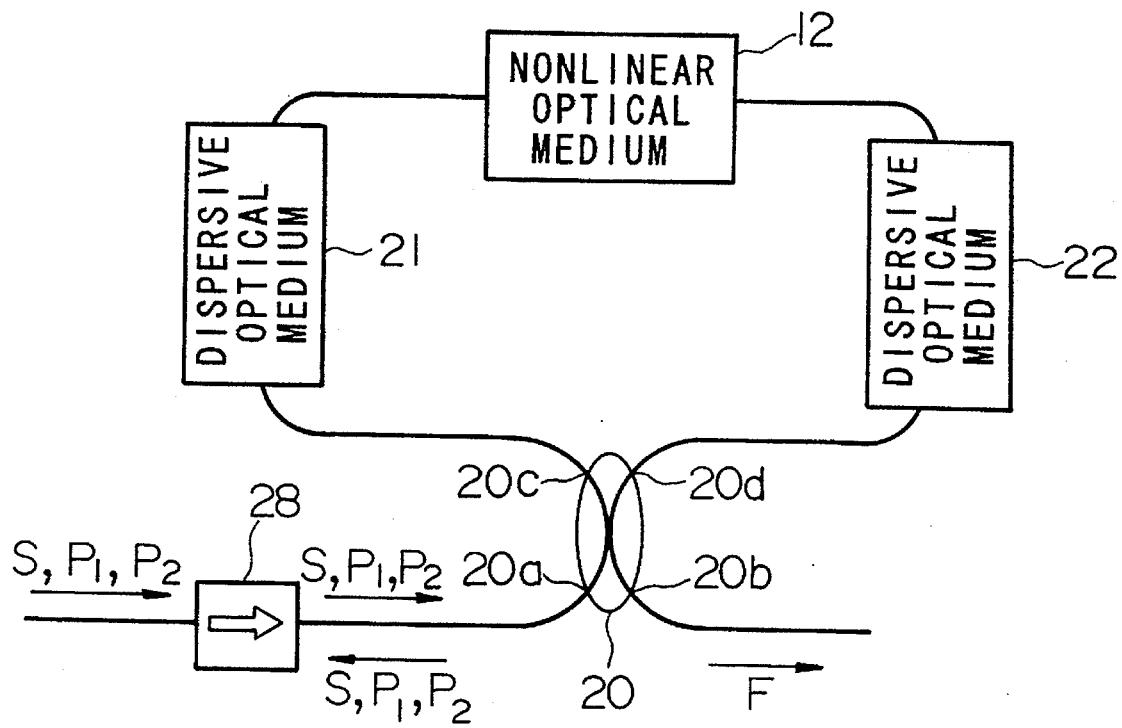
FIG. 15 is a schematic drawing of the configuration of Embodiment 4 of the optical parametric circuit of the present invention.

FIG. 15 shows a circuit configuration of Embodiment 4 of the optical parametric circuit of the present invention used as an FWM wave generation circuit for blocking the return signal wave and the pump waves.

The feature of this embodiment is that a blocking device has been provided to the circuit of FIG. 1 at port 20a of the optical directional coupler 20 for blocking the signal waves S and the pump waves $P_1$, $P_2$ which are output from port 20a of the optical directional coupler 20. The circuit configuration of Embodiment 4 is also applicable to both the phase conjugation generation circuit presented in Variation 1 of Embodiment 1 as well as to the simultaneous wavelength conversion circuit for WDM signal waves presented in Variation 3 of Embodiment 1.

The signal wave S and the pump waves $P_1$, $P_2$ return to input port 20a, thus very high intensity pump waves $P_1$, $P_2$ could exert undesirable influence on the generators for signal wave and pump waves. Therefore, the blocking device 28 is disposed in front of port 20a of the optical directional coupler 20 to block the returning signal wave S and the pump waves $P_1$, $P_2$ which are output from port 20a. The blocking device 28 could be an optical isolator or an optical circulator.

Embodiment 5

Figure 16:
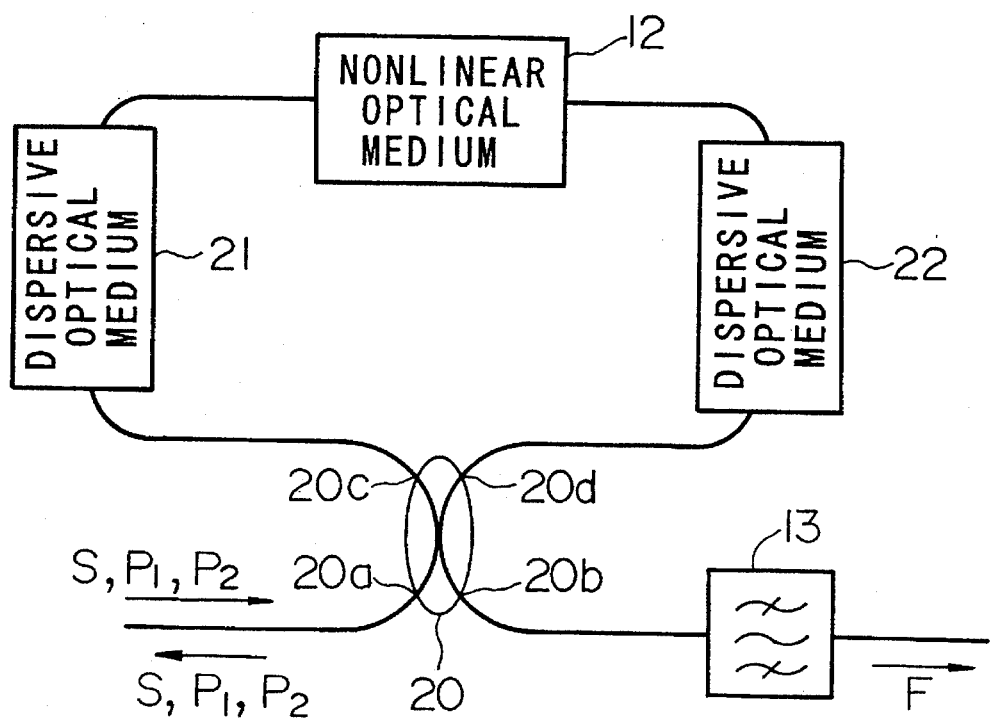
FIG. 16 is a schematic drawing of the configuration of Embodiment 5 of the optical parametric circuit of the present invention.

FIG. 16 shows a circuit configuration of a fifth embodiment of the optical parametric circuit of the present invention provided with a device for suppressing unwanted wave components leaking into the output FWM wave.

The feature of this embodiment is that a filtering device has been provided to the circuit of FIG. 1 after port 20b of the optical directional coupler 20 for suppressing the unwanted signal waves leaking into the FWM wave F output from port 20b of the optical directional coupler 20. The circuit configuration of Embodiment 5 is also applicable to both the phase conjugation generation circuit presented in Variation 1 of Embodiment 1 as well as to the simultaneous wavelength conversion circuit for WDM signal waves presented in Variation 3 of Embodiment 1.

The reasons for causing leaking of signal waves(s) and pump waves into output FWM wave(s) are, for example, asymmetry in the splitting ratio (other than 50:50) of the optical directional coupler 20 and polarization crosstalk between signal wave S and pump waves $P_1$, $P_2$ which may occur in the optical directional coupler 20, nonlinear optical medium 12 and dispersive optical media 21, 22. Other possibilities include the unwanted FWM waves of carrier frequencies $2\omega_{P1}-\omega_S$, $2\omega-\omega_S$ generated simultaneously when generating FWM waves of carrier frequencies $\omega_f(= \omega_{P1}+\omega_{P2}-\omega_S)$ from the signal waves and pump waves of carrier frequencies $\omega_S$, $\omega_{P1}$, $\omega_{P2}$, respectively.

To suppress the output of unwanted waves from port 20b, the circuit shown in FIG. 16 provides a wavelength filter 13 which passes only the wavelengths having carrier frequencies $\omega_f$ at port 20b of the optical directional coupler 20 for generating FWM wave F.

Embodiment 6

Embodiment 6 of the optical parametric circuit is an application to an optical phase conjugation circuit using angular-modulated pump waves or to a simultaneous wavelength conversion of WDM signal waves using angular-modulated pump waves.

The feature of this embodiment is to perform phase modulation or frequency modulation of two pump waves $P_1$, $P_2$ in the circuits shown in Variation 1 of Embodiment 1 and Variation 4 of Embodiment 1.

When cw pump waves with narrow spectral widths are used, nonlinear back-scattering waves, which are caused by stimulated Brillouin scattering or induced diffraction grating generated in the nonlinear optical medium 12 and the dispersive optical media 21, 22, are output from port 20b of the directional optical coupler 20. According to this embodiment, by performing angular modulation to widen the spectral bandwidth of the pump waves, the threshold intensity of the pump waves for causing back-scattering is increased, thereby permitting the use of higher intensity pump waves.

Figure 17A:
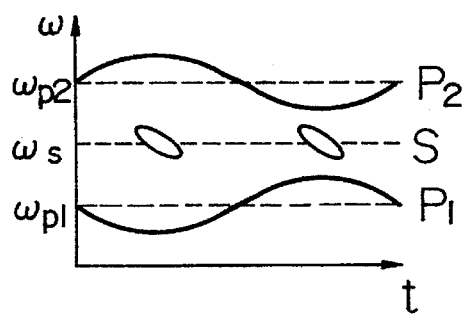
FIGS. 17A and 17B illustrate the time-resolved spectra of each wave in Embodiment 6 of the present invention.
Figure 17B:
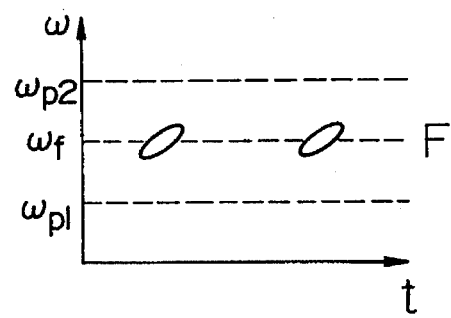
Figure 18A:
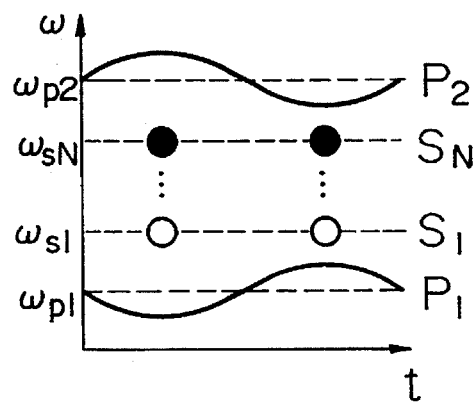
FIGS. 18A and 18B illustrate the time-resolved spectra of each wave in Embodiment 6 of the present invention.
Figure 18B:
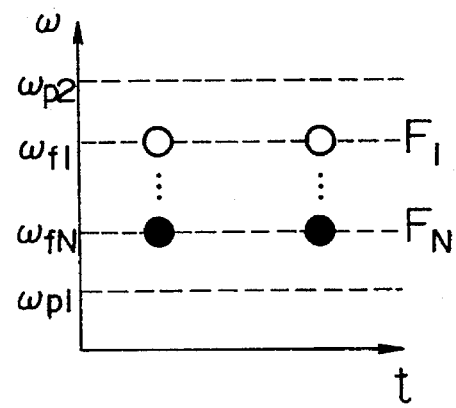

Especially, as shown in FIGS. 17A and 18A, when angular modulations which are mutually conjugate are applied to the two pump waves, the instantaneous carrier frequency $(\omega_{P1}+\omega_{P2})/2$ is held constant, thereby preventing variations in the carrier frequencies of the generated FWM wave F (or $F_j$). This is demonstrated in FIGS. 17B and 18B. In FIGS. 18A and 18B, filled and unfilled circles are used for showing the correspondence between the WDM signal waves and the FWM waves.

In general, if the amount of angular modulation of the signal wave is denoted by $\phi_S(t)$ (or $\phi_{Sj}(t)$) and the angular modulations of the pump waves by $\phi_{P1}(t)$ and $\phi_{P2}(t)$, and when they are related as in the following expression:

$$\phi_{P1}(t)+\phi_{P2}(t)-\phi_S(t)=0 (\text{or } \phi_{P1}(t)+\phi_{P2}(t)-\phi_{Sj}(t)=0)$$

it is possible to prevent variations in the carrier frequencies of the FWM waves generated.

Embodiment 7

Embodiment 7 of the optical parametric circuit is an application to a phase conjugation generation circuit or a simultaneous wavelength conversion of WDM signal waves using intensity-modulated pump waves.

The feature of the circuit of this embodiment is the addition of intensity modulation to provide intensity modulations synchronized to the signal wave S (or WDM signal waves $S_1, \ldots S_N$) to the two pump waves $P_1$, $P_2$ in the circuits of Variation 1 of Embodiment 1 and Variation 4 of Embodiment 1.

Figure 19:
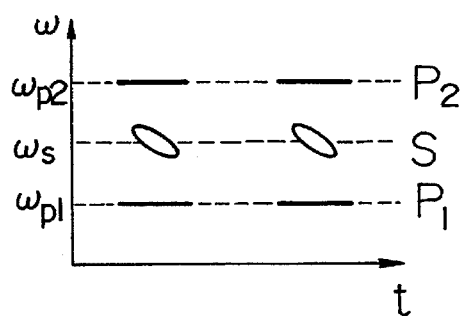
FIG. 19 illustrates the time-resolved spectra of each wave in Embodiment 7 of the present invention.
Figure 20:
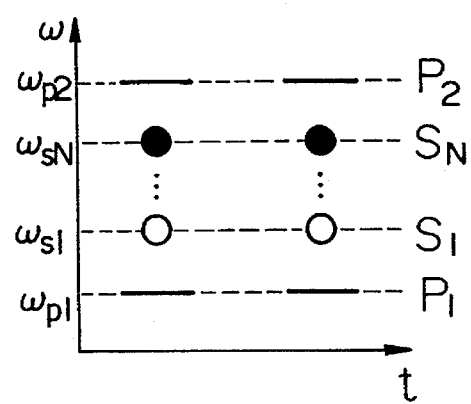
FIG. 20 illustrates the time-resolved spectra of each wave in Embodiment 7 of the present invention.

According to the circuit of this embodiment, it is also possible to prevent the generation of back-scattering waves as in the circuit presented in Embodiment 6. FIG. 19 corresponds to FIG. 17A, and FIG. 20 corresponds to FIG. 18A, respectively, for Embodiments 6 and 7. In this embodiment, it is possible to raise the peak intensity of the pump waves while keeping the average intensity of the pump waves constant.

It is also permissible to use combined modulation of the intensity modulation presented in this embodiment and the angular modulation presented in Embodiment 6.

Figure 21:
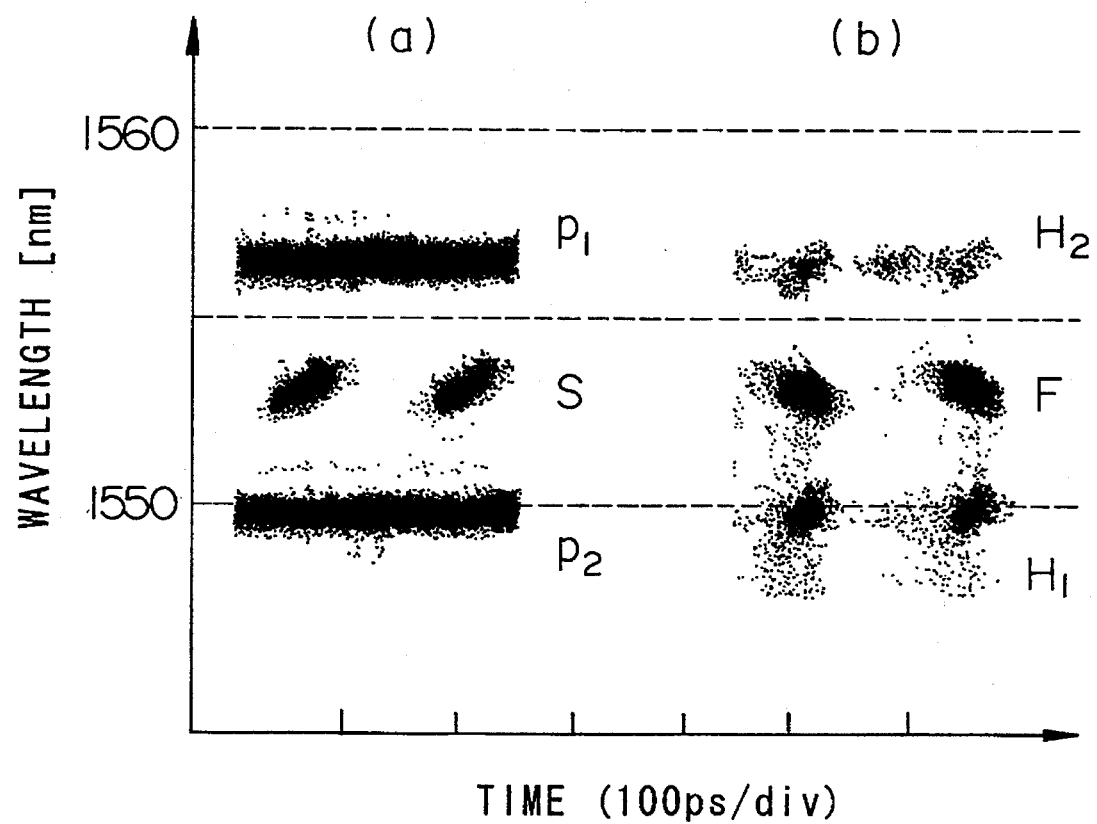
FIG. 21 illustrates the time-resolved spectra of each wave, which was obtained by a practical operation example of the optical phase conjugation circuit of the present invention.

The actual example of the operation of the phase conjugation generation circuit of the present invention will be explained with reference to FIG. 21. In the circuit of this example, polarization-maintaining optical fibers are used to serve as the nonlinear optical medium 24 and the dispersive optical medium 25 (both of which components are polarization-maintaining types). Also, phase modulation to the two pump waves $P_1$, $P_2$ is performed. Time-resolved spectra for the signal wave S and the pump waves $P_1$, $P_2$ injected into port 23a of the optical directional coupler 23 are shown in observed image (a). In observed image (b) are shown time-resolved spectra of the phase conjugation wave (FWM wave) F output from port 23b of the optical directional coupler 23. It is demonstrated that it is possible to generate phase conjugation wave F having the same wavelength as that of the signal wave S.

Together with the image of the phase conjugation wave F presented in the observed image (b), an image $H_1$ is seen at the same wavelength as the pump wave $P_2$. The image $H_1$ is generated from a wavelength conversion of pump wave $P_1$ caused by signal wave S acting as the degenerate pump wave, and appears at port 23b of the directional optical coupler 23. Similarly, an image $H_2$ is seen at the same wavelength as the pump wave $P_1$. The image $H_2$ is generated from a wavelength conversion of pump wave $P_2$ caused by signal wave S acting as the degenerate pump wave, and appears at port 23b of the directional optical coupler 23. The images $H_1$ and $H_2$ both have different wavelengths from that of the phase conjugation wave F, and therefore, they can readily be eliminated using wavelength filters.

Embodiment 8

Figure 22:
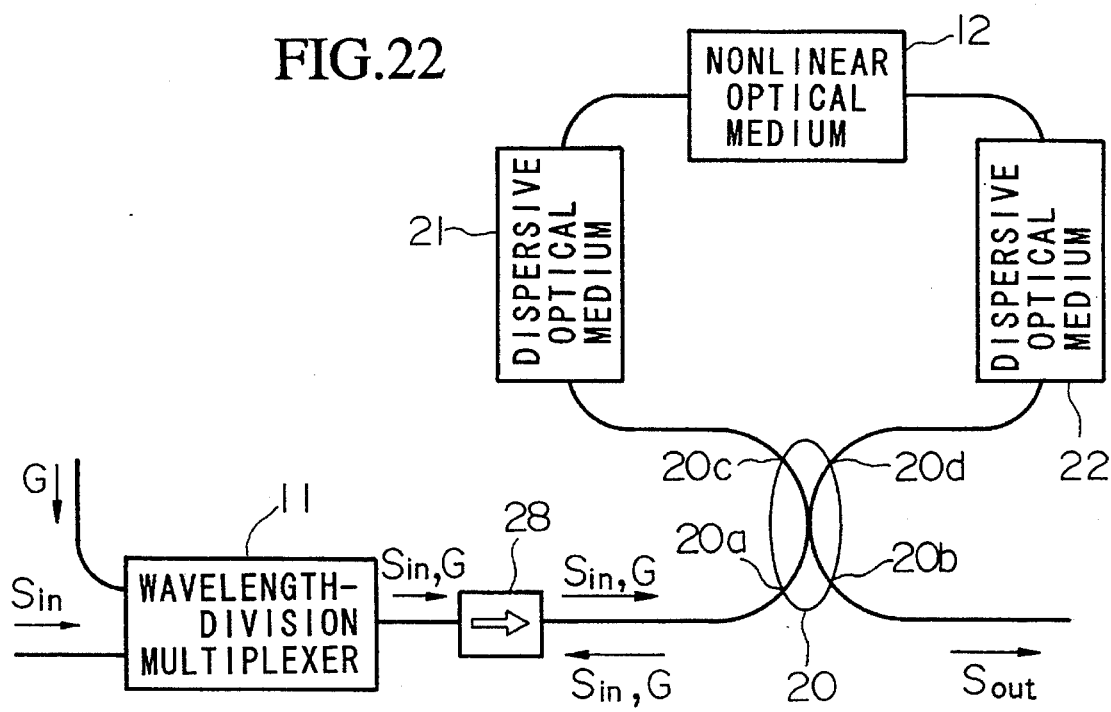
FIG. 22 is a schematic drawing of the configuration of Embodiment 8 of the optical parametric circuit of the present invention.

FIG. 22 shows a circuit configuration of Embodiment 8 which is an application of the parametric circuit to a dual-input optical gate circuit (optical AND-circuit).

The feature of the circuit of this embodiment is that the dual-input single-output optical gate circuit (optical AND-circuit) is realized by coupling of an optical input signal $S_{in}$ with an optical gate signal G with the use of a wavelength-division multiplexer 11, which is input, through an optical isolator 28 into port 20a of the optical directional coupler 20.

Figure 23A:
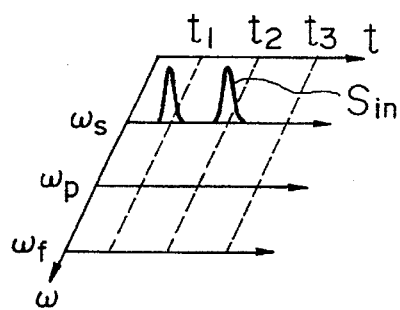
FIGS. 23A–23D show optical waveforms corresponding to each carrier frequency in Embodiment 8.
Figure 23B:
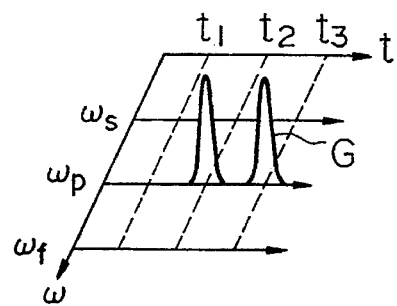
Figure 23C:
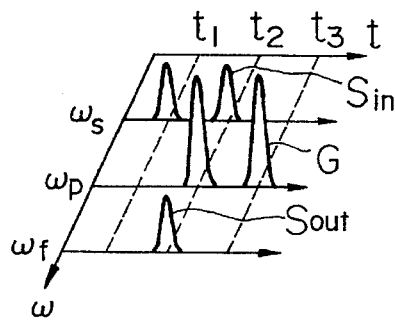
Figure 23D:
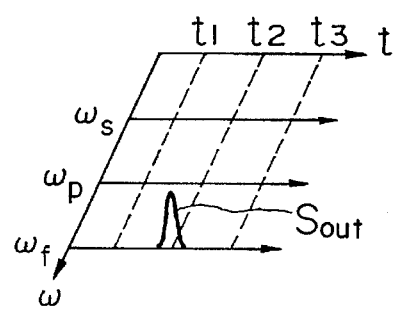

In this embodiment, the optical input signal $S_{in}$ (refer to FIG. 23A) is a pulsed signal wave S of carrier frequency the optical gate signal G (refer to FIG. 23B) is a pulsed pump wave P of carrier frequency up and the optical output signal $S_{out}$ is the FWM wave F of carrier frequency $\omega_f(=2\omega_P-\omega_S)$. When the optical input signal $S_{in}$ and the optical gate signal G are input into the nonlinear optical medium 12 so as to overlap each other, an optical output signal $S_{out}$ is generated in a timeslot $t_2$ (refer to FIG. 23C), and the optical output signal $S_{out}$ is output from port 20b (refer to FIG. 23D). However, it is noted that a wavelength conversion ($\omega_S \to \omega_f$) takes place in the optical gate circuit of this embodiment.

Variation 1 of Embodiment 8

Figure 24:
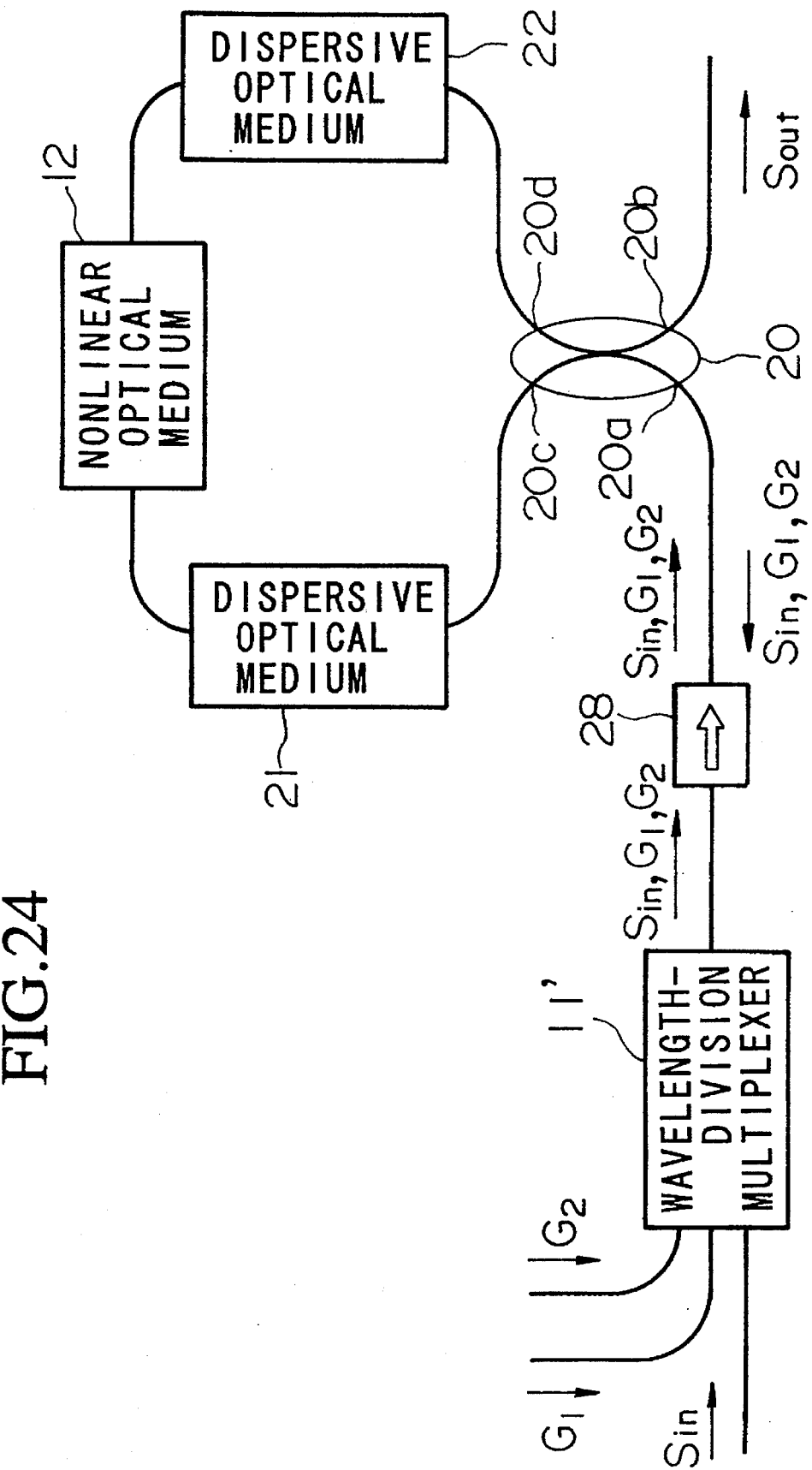
FIG. 24 presents a schematic drawing of the configuration of Variation 1 of Embodiment 8 of the optical parametric circuit of the present invention.

FIG. 24 shows a first variation of Embodiment 8, which is an application of the parametric circuit to a triple-input optical gate circuit (optical AND-circuit).

The feature of the circuit of this variation is to present a triple-input one-output optical gate circuit (optical AND-gate) which does not result in wavelength conversion while using the same optical gate circuit shown in FIG. 22.

Figure 25A:
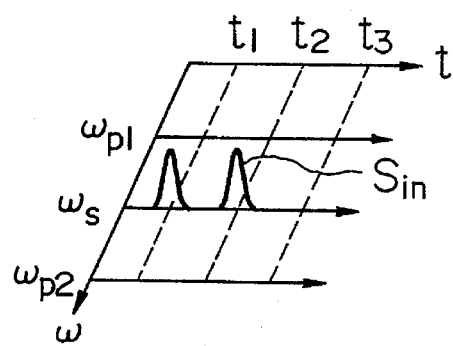
FIGS. 25A–25D show optical waveforms corresponding to each carrier frequency in Variation 1 of Embodiment 8.
Figure 25B:
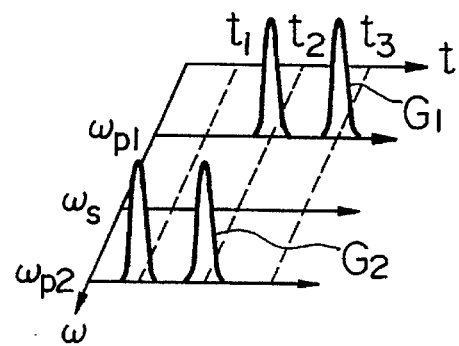

In this embodiment, the optical input signal $S_{in}$ (refer to FIG. 25A) of carrier frequency $\omega_S$ is related to the carrier frequencies $\omega_{P1}$, $\omega_{P2}$ of optical gate signals $G_1$, $G_2$ which are modulated as shown in FIG. 25B by the following expression.

$$2\omega_S = \omega_{P1} + \omega_{P2}$$

Figure 25C:
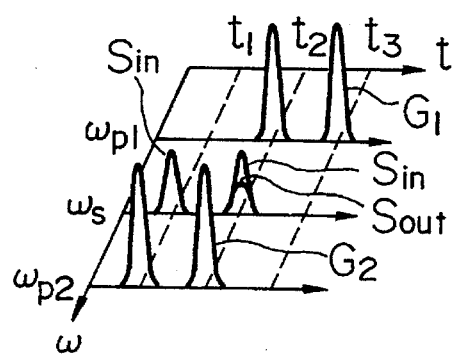
Figure 25D:
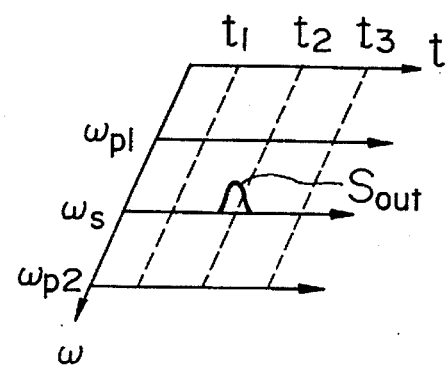

When the optical input signal $S_{in}$ and the optical gate signals $G_1$, $G_2$ are input into the nonlinear optical medium 12 so as to overlap each other, the carrier frequency of the generated FWM wave F becomes $\omega_S$, that is, the carrier frequencies of the optical input signal $S_{in}$ and the optical output signal $S_{out}$ become the same (refer to FIG. 25C). The optical input signal $S_{in}$ input into port 20a of the optical directional coupler 20 together with optical gate signals $G_1$, $G_2$ is output again from port 20a. On the other hand, the optical output signal $S_{out}$ of carrier frequency $\omega_S$ is output from port 20b of the optical directional coupler 20 (refer to FIG. 25D).

Embodiment 9

Figure 26:
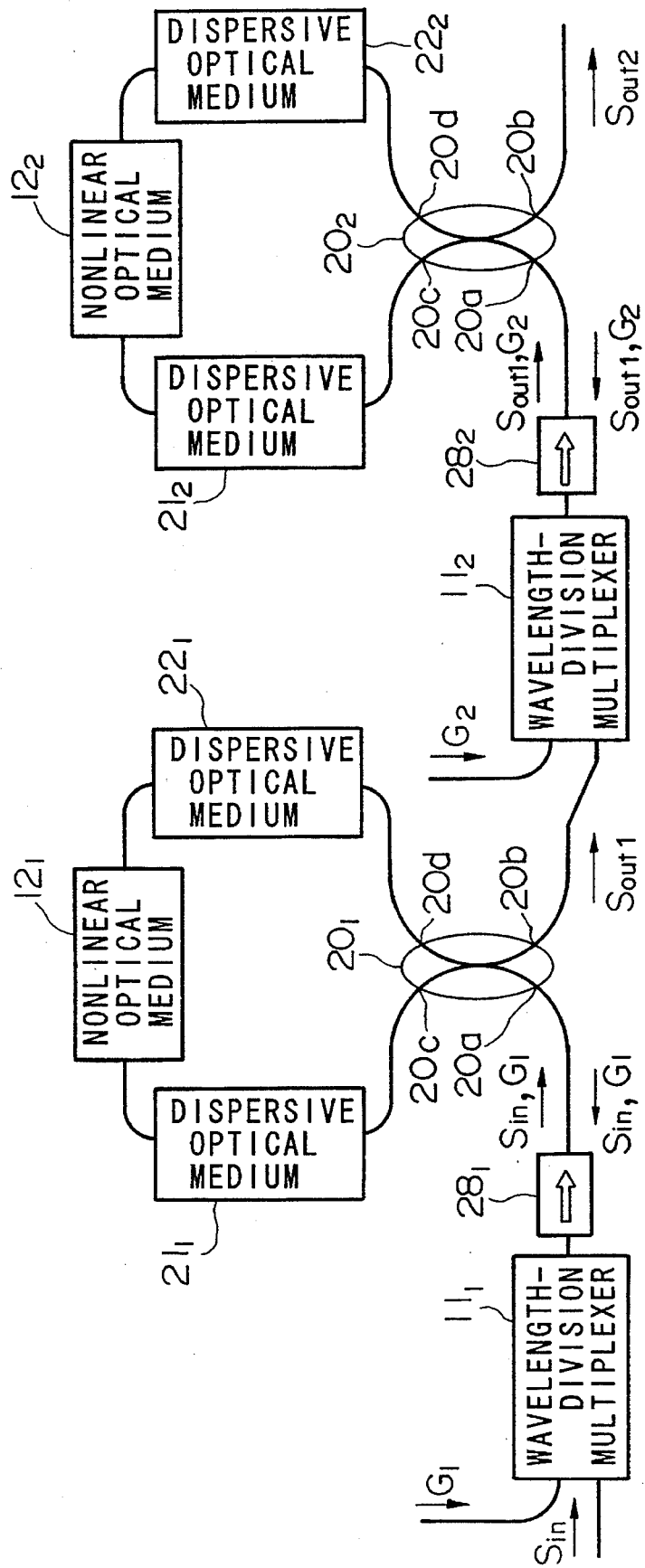
FIG. 26 is a schematic drawing of the configuration of Embodiment 9 of the optical parametric circuit of the present invention.

FIG. 26 shows the circuit configuration of Embodiment 9 which is an application of the parametric circuit to an optical time-division demultiplexer.

The feature of this embodiment is that, by connecting optical gate circuits shown in FIG. 22 in a multi-stage configuration, an optical time-division demultiplexer is realized for separating a time-division multiplexed (TDM) optical signal.

Figure 27A:
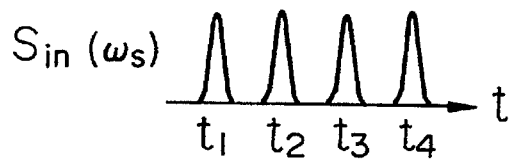
FIGS. 27A–27E show optical waveforms corresponding to each carrier frequency in Embodiment 9.
Figure 27B:
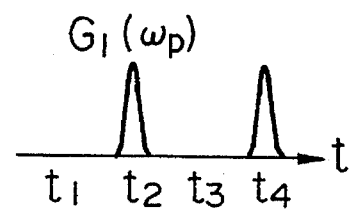
Figure 27C:
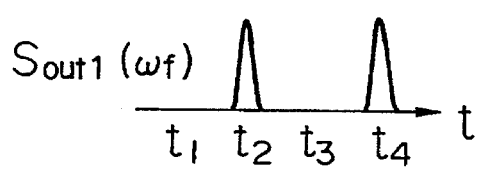

In this embodiment, the first-stage optical gate circuit demultiplexes two channels; wherein a TDM optical input signal $S_{in}$ which is a pulsed signal wave of carrier frequency $\omega_S$ and which contains four channels in the timeslots ($t_1$, $t_2$, $t_3$, $t_4$) (refer to FIG. 27A) and an optical gate signal $G_1$ which is a pulsed pump wave of carrier frequency $\omega_P$ and which is active in the timeslots ($t_2$, $t_4$) (refer to FIG. 27B) are input, and an optical output signal $S_{out1}$ which is a generated FWM wave of carrier frequency $\omega_f(=2\omega_P-\omega_S)$ in the respective timeslots ($t_2$, $t_4$) is output (refer to FIG. 27C).

Figure 27D:
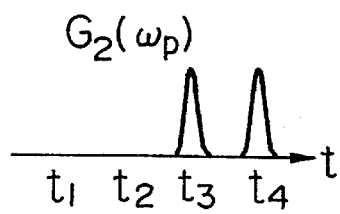
Figure 27E:
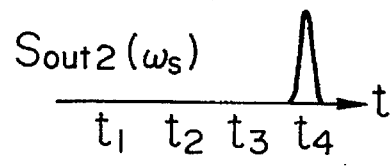

In the second-stage optical gate circuit, an optical input signal which is the optical output signal $S_{out1}$ of the first-stage optical gate circuit and an optical gate signal $G_2$ which is a pulsed pump wave of carrier frequency $\omega_P$ and which is active in the timeslots ($t_3$, $t_4$) (refer to FIG. 27D) are input, and an optical pulse signal $S_{out2}$ which is a generated FWM wave of carrier frequency $\omega_S(=2\omega_P-\omega_f)$ in the timeslot ($t_4$) is output (refer to FIG. 27E). The procedure is able to demultiplex the TDM optical input signal $S_{in}$ to extract one channel in the timeslot in which both optical gate signals $G_1$, $G_2$ are active.

It should be noted that in the first-stage optical gate circuit, the TDM optical input signal $S_{in}$ of carrier frequency $\omega_S$ generates an optical output signal (FWM wave) $S_{out1}$ of carrier frequency $\omega_f$. Similarly, in the second-stage optical gate circuit, the optical input signal (the optical input signal $S_{out1}$) of carrier frequency $\omega_f$ generates an optical output signal (FWM wave) $S_{out2}$ of carrier frequency $\omega_S$. Accordingly, this circuit of Embodiment 9 functions in the same way as the triple-input optical gate circuit of Variation 1 of Embodiment 8 in which the carrier frequencies remain in an optical input signal and an optical output signal as a whole, while the circuit of Embodiment 9 has the advantage of requiring only one carrier frequency $\omega_P$ for the optical gate signals $G_1$ and $G_2$.

It is also permissible to apply the multi-stage configuration to the triple-input optical gate circuit of Variation 1 of Embodiment 8 (refer to FIG. 24).

Embodiment 10

Figure 28:
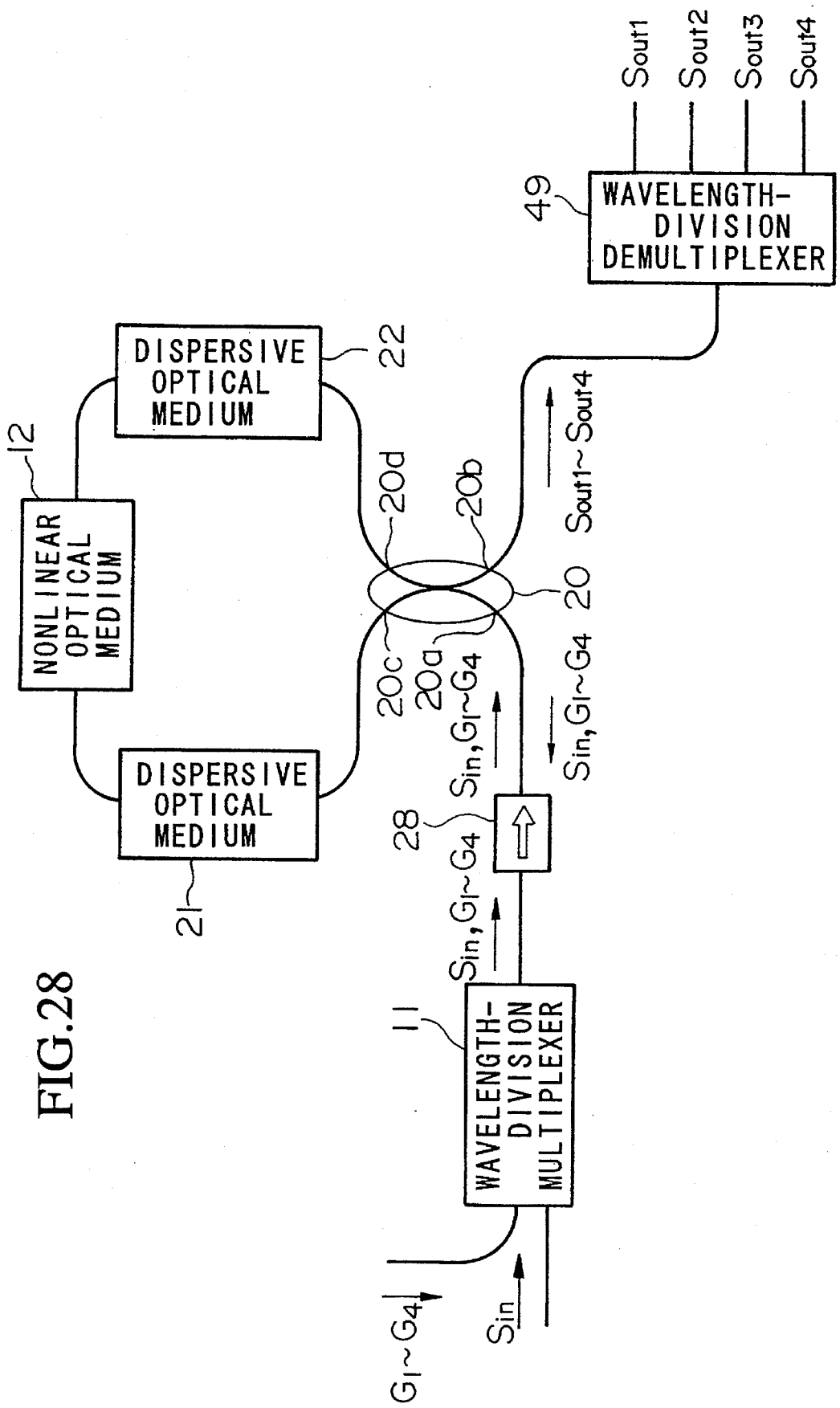
FIG. 28 is a schematic drawing of the configuration of Embodiment 10 of the optical parametric circuit of the present invention.

FIG. 28 shows the circuit configuration of Embodiment 10 which is an application of the parametric circuit to another type of optical time-division demultiplexer.

The feature of this embodiment is that, by combining the gate circuit of FIG. 22 with a 1-input, 4-output wavelength-division demultiplexer 49, it is possible to present an optical time-division demultiplexer for simultaneous separation of four channels of time-division multiplexed optical pulse signals.

Figure 29A:
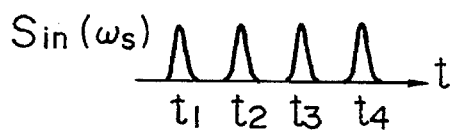
FIGS. 29A–29D show optical waveforms corresponding to carrier frequency in Embodiment 10.
Figure 29B:
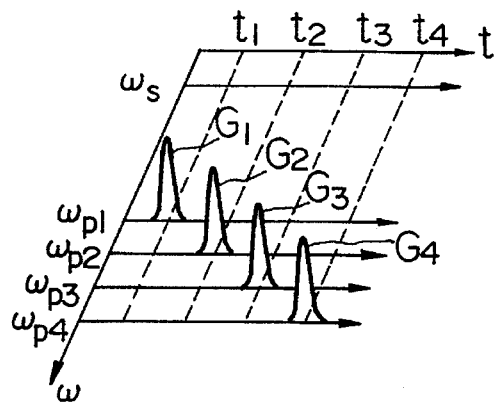
Figure 29C:
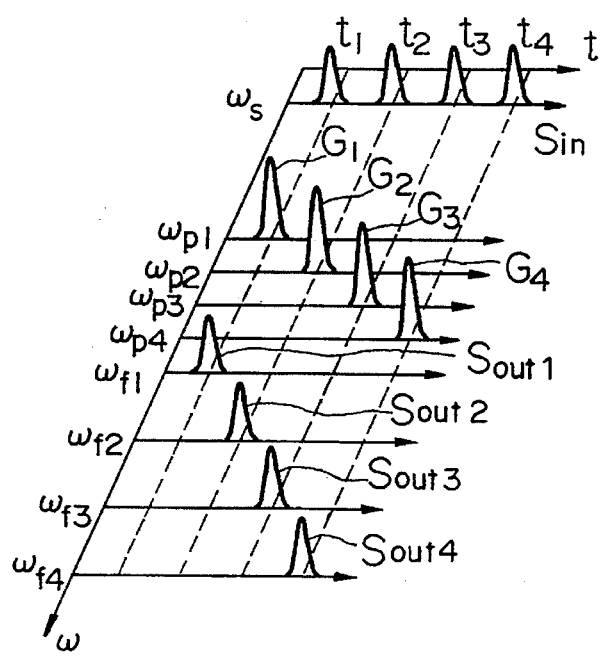
Figure 29D:
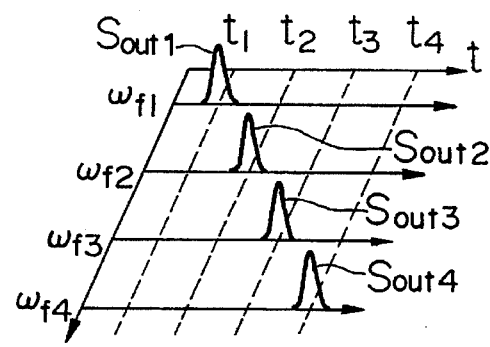

In the circuit of FIG. 28, a TDM optical input signal $S_{in}$ of carrier frequency $\omega_S$ which contains four channels in the timeslots ($t_1$, $t_2$, $t_3$, $t_4$) (refer to FIG. 29A) is input together with optical gate signals $G_1$, $G_2$, $G_3$, $G_4$ which are respectively active in the timeslots ($t_1$, $t_2$, $t_3$, $t_4$) at different carrier frequencies $\omega_{P1}$, $\omega_{P2}$, $\omega_{P3}$, $\omega_{P4}$ (refer to FIG. 29B), and optical output signals $S_{out1}$, $S_{out2}$, $S_{out3}$, $S_{out4}$ of different carrier frequencies $\omega_{f1}$, $\omega_{f2}$, $\omega_{f3}$, $\omega_{f4}$ are output (refer to FIG. 29C) which are generated in degenerate four-wave mixing process between the TDM optical input signal $S_{in}$ and each of the optical gate signals $G_1$, $G_2$, $G_3$, $G_4$, where $\omega_{fk}=2\omega-\omega_S$ (k=1, ... 4). The respective optical output signals $S_{out1}$, $S_{out2}$, $S_{out3}$, $S_{out4}$ are separated in the wavelength-division demultiplexer 29 into individual channels of carrier frequencies $\omega_{f1}$, $\omega_{f2}$, $\omega_{f3}$, $\omega_{f4}$, thereby achieving a simultaneous separation of four channels (refer to FIG. 29D).

In this case, for k=1, 2, 3, 4, it is assumed that the relationship of the frequencies is given by the following expression.

$$\{K_2(\omega_S)+K_2(\omega_{fk})-2K_2(\omega_{Pk})\}L_2=\{K_1(\omega_S)+K_1(\omega_{fk})-2K_1(\omega_{Pk})\}L_1+(2n-1\pm\alpha)\pi$$

In the optical time-division demultiplexers shown above, it is also permissible to use non-degenerate pump waves optical gate signals.

Embodiment 11

Figure 30A:
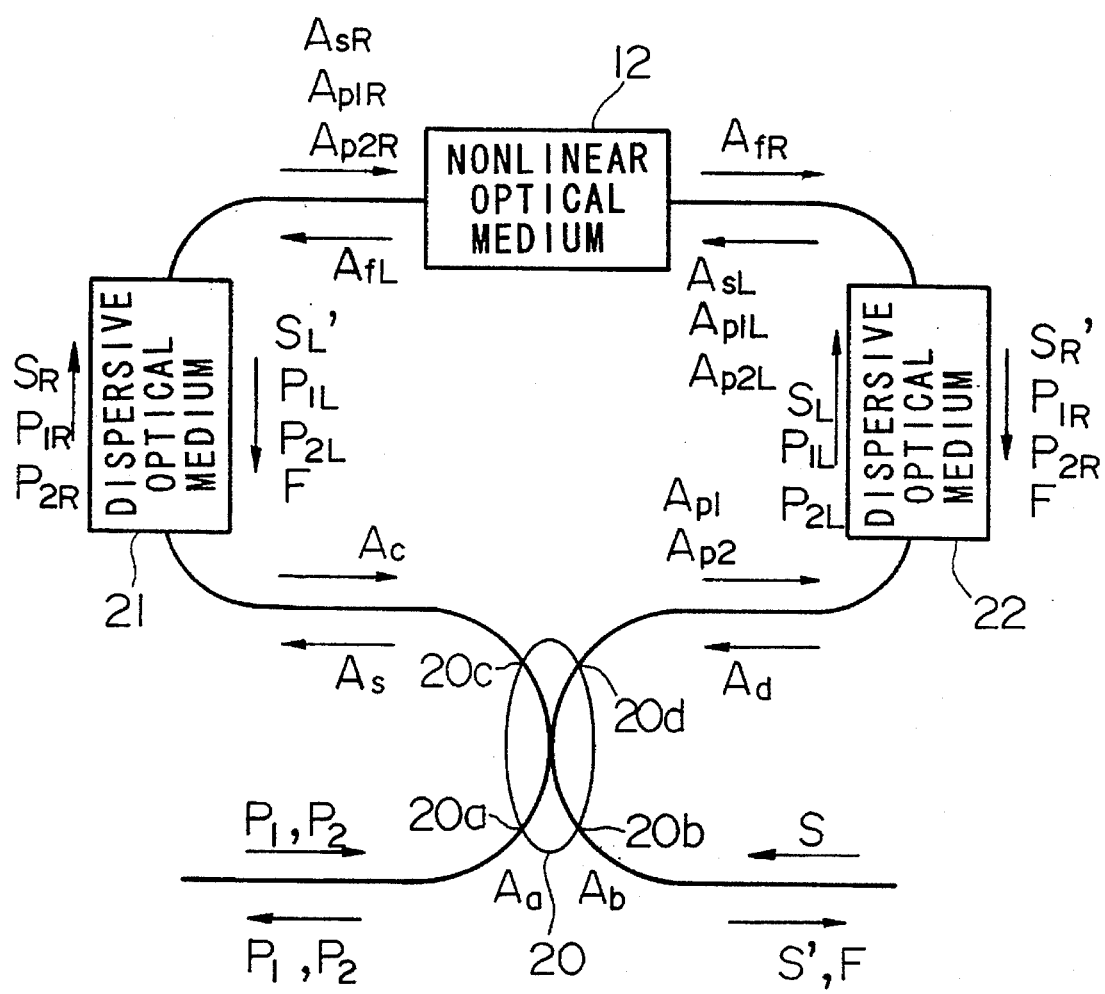
FIGS. 30A and 30B are schematic drawings of the configurations of Embodiment 11 of the optical parametric circuit of the present invention.

FIG. 30A is a schematic diagram of the optical parametric circuit of Embodiment 11 of the present invention, showing the flow of optical waves.

In this embodiment, a signal wave S (refer to FIG. 31A) of carrier frequency $\omega_S$ is injected into port 20b of the optical directional coupler 20, and is divided into ports 20c, 20d at equal intensities and polarization states, respectively. The phase of the signal wave $S_R$ output from port 20c, which is a cross port of port 20b, is retarded by 90 degrees with respect to that of the signal wave $S_L$ output from port 20d which is the through port of port 20b. Therefore, designating the complex amplitude of the output signal wave $S_L$ at port 20d by $A_S$, the complex amplitude of the signal wave $S_R$ at port 20c is given by $A_S \cdot \exp(-i\pi/2)$.

The pump waves $P_1$, $P_2$ (refer to FIG. 31B) of carrier frequencies $\omega_{P1}$, $\omega_{P2}$ are injected into port 20a of the optical directional coupler 20, and are divided into ports 20c, 20d at equal intensities and polarizations. However, the phases of the pump waves $P_{1L}$, $P_{2L}$ output from the cross port 20d are retarded by 90 degrees from the phases of the pump waves $P_{1R}$, $P_{2R}$ output from the through port 20c, respectively. Therefore, designating the complex amplitudes of the pump waves $P_{1R}$, $P_{2R}$ at port 20c by $A_{P1}$, $A_{P2}$ the complex amplitudes of the pump waves $P_{1L}$, $P_{2L}$ at port 20d is given by $A_{P1} \cdot \exp(-i\pi/2)$ and $A_{P2} \cdot \exp(-\pi/2)$, respectively.

Accordingly, the signal wave $S_R$ and the pump waves $P_{1R}$, $P_{2R}$ (refer to FIG. 31C) output to port 20c of tile directional coupler 20 propagate in the direction of the dispersive optical medium 21→nonlinear optical medium 12→dispersive optical medium 22→port 20d, i.e. in the clockwise direction. Here, the complex amplitudes $A_{SR}$, $A_{P1R}$, and $A_{P2R}$ of the clockwise signal $S_R$ and the clockwise pump waves $P_{1R}$, $P_{2R}$ which are input from port 20c via dispersive optical medium 21 into nonlinear optical medium 12 are expressed as follows.

$$A_{SR}=A_S \cdot \exp(-iK_1(\omega_S)L_1-i\pi/2) \quad (17)$$

$$A_{P1R}=A_{P1} \cdot \exp(-iK_1(\omega_{P1})L_1) \quad (18)$$

$$A_{P2R}=A_2 \cdot \exp(-iK_1(\omega_{P2})L_1) \quad (19)$$

In the meanwhile, the signal wave $S_L$ and the pump waves $P_{1L}$, $P_{2L}$ output to port 20d of the directional coupler 20 propagate in the direction of the dispersive optical medium 22→nonlinear optical medium 12→dispersive optical medium 21→port 20c, i.e. in the counter-clockwise direction. Here, the complex amplitudes $A_{SL}$, $A_{P1L}$ and $A_{P2L}$ of the counter-clockwise signal $S_L$ and the counter-clockwise pump waves $P_{1L}$, $P_{2L}$ which are input from port 20d via dispersive optical medium 22 into nonlinear optical medium 12 are expressed as follows.

$$A_{SL}=A_S \cdot \exp(-iK_2(\omega_S)L_2) \quad (20)$$

$$A_{P1L}=A_{P1} \cdot \exp(-iK_2(\omega_{P1})L_2-i\pi/2) \quad (21)$$

$$A_{P2L}=A_{P2} \cdot \exp(-iK_2(\omega_{P2})L_2-i\pi/2) \quad (22)$$

Figure 31A:
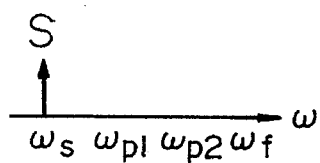
FIGS. 31A–31G present the spectra of each wave in Embodiment 11.
Figure 31B:
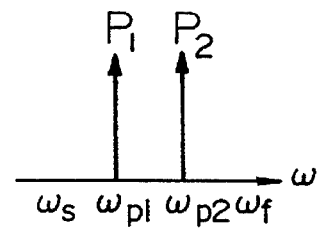
Figure 31C:
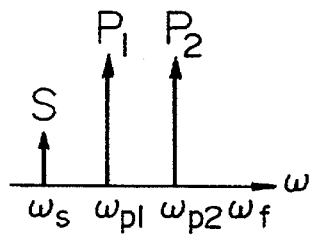
Figure 31D:
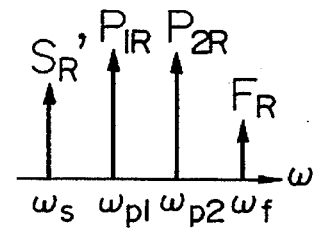

Within the nonlinear optical medium 12, due to the third-order optical parametric effect induced by the propagation of the clockwise signal wave $S_R$ and the clockwise pump waves $P_{1L}$ and $P_{2L}$, the signal wave $S_R$ is amplified and a clockwise FWM wave $F_R$ having the carrier frequency $\omega_f (=\omega_{P1}+\omega_{P2}-\omega_S)$ is generated (refer to FIG. 31D). Similarly, due to the third-order parametric effect induced by the propagation of the counter-clockwise signal wave $S_L$ and the counter-clockwise pump waves $P_{1L}$ and $P_{2L}$, the signal wave $S_L$ is amplified and a counter-clockwise FWM wave $F_L$ having the carrier frequency $\omega_f$ is generated. The clockwise and counter-clockwise wave components again enter the directional optical coupler 20 and produce interference.

The circuit of this embodiment also functions as an optical loop mirror with respect to the signal waves S and the pump waves $P_1$, $P_2$; therefore, in principle, 100% of the amplified signal wave S' is output to port 20b and the pump waves $P_1$ and $P_2$ to port 20a, to enable the result of a complete separation of the amplified signal waves S', and the pump waves $P_1$ and $P_2$.

Here, the complex amplitude $A_{fR}$ of a clockwise FWM wave $F_R$ generated by the clockwise signal wave $S_R$ and the clockwise pump waves $P_{1R}$, $P_{2R}$ (expressed by the expressions (17), (18) and (19)) is given by the following expression.

$$\begin{aligned} A_{fR} &= C \cdot A_{SR}^* \cdot A_{P1R} \cdot A_{P2R} \quad (23) \\ &= C \cdot A_S^* \cdot A_{P1} \cdot A_{P2} \cdot \exp[i(K_1(\omega_S) - \\ & K_1(\omega_{P1}) - K_1(\omega_{P2}))L_1 + i\pi/2] \end{aligned}$$

Also, the complex amplitude $A_{fL}$ of a counter-clockwise FWM wave $F_L$ generated by the counter-clockwise signal wave $S_L$ and the counter-clockwise pump waves $P_{1L}$, $P_{2L}$ (expressed by the expressions (20), (21) and (22)) is given by the following expression.

$$\begin{aligned} A_{fL} &= C \cdot A_{SL}^* \cdot A_{P1L} \cdot A_{P2L} \quad (24) \\ &= C \cdot A_S^* \cdot A_{P1} \cdot A_{P2} \cdot \exp[i(K_2(\omega_S) - \\ & K_2(\omega_{P1}) - K_2(\omega_{P2}))L_2 - i\pi] \end{aligned}$$

where C is the square root of the conversion efficiency previously explained above.

The complex amplitudes $A_d$, $A_c$ of the clockwise and counter-clockwise FWM waves $F_R$, $F_L$, as each wave arrives at the ports 20d, 20c through the respective dispersive optical medium 22, 21, are given by the following expressions.

$$\begin{aligned} A_d &= A_{fR} \cdot \exp(-iK_2(\omega_f)L_2) \quad (25) \\ &= C \cdot A_S^* \cdot A_{P1} \cdot A_{P2} \cdot \exp[-i(K_1(\omega_f)L_1 + \\ & K_2(\omega_f)L_2)] \cdot \exp(i\Delta K_1 L_1 + i\pi/2) \end{aligned}$$

$$\begin{aligned} A_c &= A_{fL} \cdot \exp(-iK_1(\omega_f)L_1) \quad (26) \\ &= C \cdot A_S^* \cdot A_{P1} \cdot A_{P2} \cdot \exp[-i(K_1(\omega_f)L_1 + \\ & K_2(\omega_f)L_2)] \cdot \exp(i\Delta K_2 L_2 - i\pi) \end{aligned}$$

where $\Delta K_1$, $\Delta K_2$ are the same as the expressions given in (11) and (12).

In the optical directional coupler 20, the clockwise and counter-clockwise FWM waves $F_R$, $F_L$ interfere, and the complex amplitudes $A_a$, $A_b$ of the FWM waves output to the ports 20a, 20b are given by the following expressions.

$$\begin{aligned} A_a &\propto A_c + A_d \cdot \exp(-i\pi/2) \quad (27) \\ &\propto \exp(i\Delta K_2 L_2) + \exp(i\Delta K_1 L_1) \end{aligned}$$

$$\begin{aligned} A_b &\propto A_c \cdot \exp(-i\pi/2) + A_d \quad (28) \\ &\propto \exp(i\Delta K_2 L_2) + \exp(i\Delta K_1 L_1) \end{aligned}$$

Figure 31E:
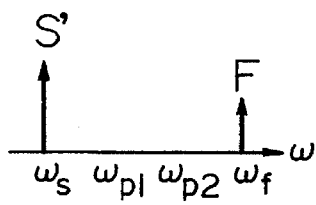

It follows that when the dispersive optical media 21, 22 fulfil the condition that:

$$\Delta K_2 L_2 = \Delta K_1 L_1 + 2n\pi \quad (29)$$

where n is an integer, then, in principle, 100% of FWM wave F can be output to port 20b with the amplified signal wave S' (refer to FIG. 31E), thus completely isolating the pump waves $P_1$, $P_2$ (which are output to port 20a) therefrom.

Figure 30B:
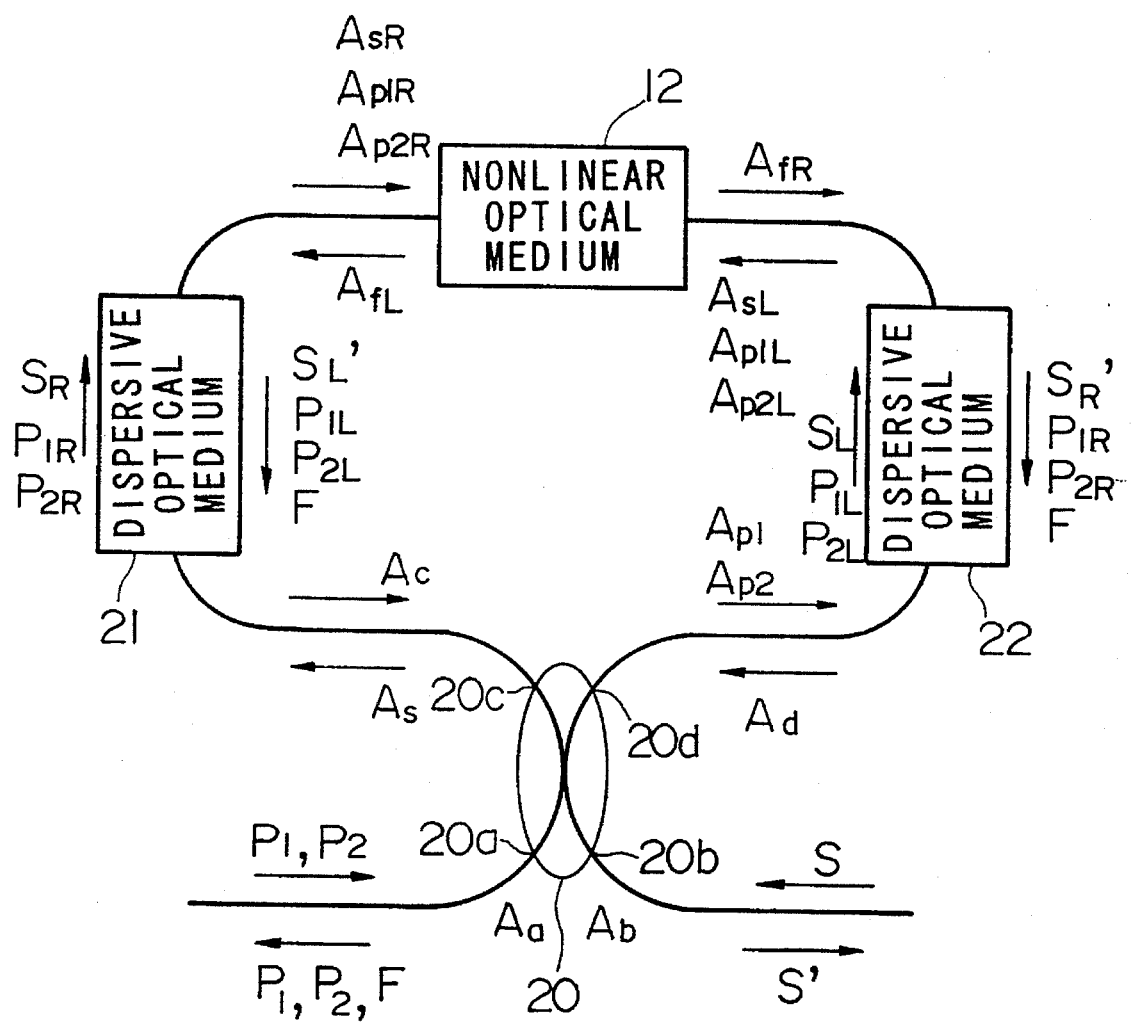
Figure 31F:
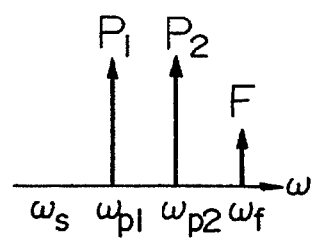
Figure 31G:
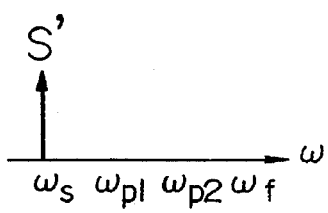

Meanwhile, FIG. 30B shows the state of propagation of the waves when the dispersive optical media 21, 22 satisfy the following condition.

$$\Delta K_2 L_2 = \Delta K_1 L_1 + (2n-1)\pi \quad (30)$$

where n is an integer. In this case, 100% of the FWM wave F is output to port 20a together with pump waves $P_1$, $P_2$ (refer to FIG. 31F) in principle, and the amplified signal wave S' is output to port 20b (refer to FIG. 31G). This means that the amplified signal wave S' is completely separated from the FWM wave F and the pump waves $P_1$, $P_2$.

By configuring the optical parametric circuit as demonstrated above, when selecting the dispersive optical media 21, 22 to satisfy the expression (29), it becomes possible to separate the FWM wave F generated and the amplified signal wave S' from the pump waves $P_1$, $P_2$ without the use of such wavelength-division demultiplexing means as wavelength filters. On the other hand, when selecting the dispersive optical media 21, 22 to satisfy the expression (30), it becomes possible to separate the amplified signal wave S' from the FWM wave F and the pump waves $P_1$, $P_2$. This aspect of the circuit operation will be explained later in another embodiment.

It may be noted that taking into account certain allowable error $\alpha$ ($0 \leq \alpha < \frac{1}{2}$) in expression (29), the following expression is obtained.

$$\Delta K_2 L_2 = \Delta K_1 L_1 + (2n-1\pm\alpha)\pi \quad (31)$$

In this case, depending on the magnitude of the allowable error $\alpha$, the output intensity level of FWM wave F output to port 20b is lowered; however, the pump waves $P_1$, $P_2$ are never output to port 20b. Therefore, no problems can occur in practice.

Even when some optical noise is contained in the pump waves $P_1$, $P_2$, the optical noise is output together with the pump waves $P_1$, $P_2$ from port 20a, the optical noise becomes never mixed in the amplified signal wave S' and the FWM wave F.

Variation 1 of Embodiment 11

Figure 32:
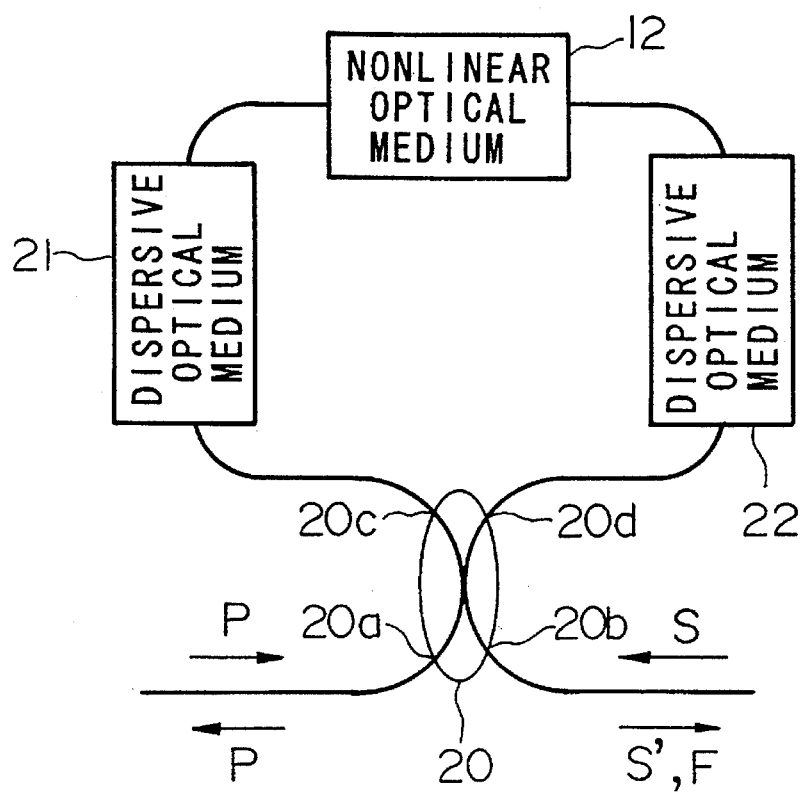
FIG. 32 presents a schematic drawing of the configuration of Variation 1 of Embodiment 11 of the optical parametric circuit of the present invention.

FIG. 32 presents a first variation of Embodiment 11 in which a degenerate pump wave (carrier frequency $\omega_P = \omega_{P1} = \omega_{P2}$) is used in the circuit of Embodiment 11.

Figure 33A:
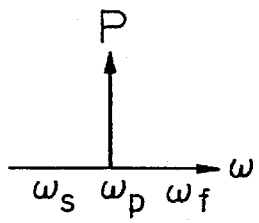
FIGS. 33A–33C present the spectra of each wave in Variation 1 of Embodiment 11.
Figure 33B:
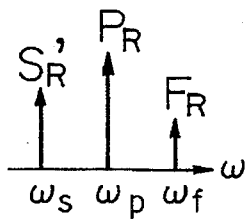
Figure 33C:
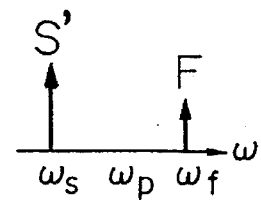

In this embodiment, when a signal wave S shown in FIG. 31A is injected from port 20b of the optical directional coupler 20, and the pump wave P (refer to FIG. 33A) of carrier frequency $\omega_P$ is injected from port 20a, an FWM wave $F_R$ of carrier frequency $\omega_f$ ($=2\omega_P - \omega_S$) is generated. FIG. 33B shows the generated FWM wave $F_R$, the amplified signal wave $S_R'$, and the pump wave $P_R$ which are output from the nonlinear optical medium 12 in the clockwise direction. The same effect occurs in the counter-clockwise direction. The FWM wave F and the amplified signal wave S' are output from port 20b, and the pump wave P from port 20a of the optical directional coupler 20.

The following embodiments are all explained in the case that the pump wave P is degenerate.

As in the first embodiment, in place of a signal wave S, WDM signal waves $S_1, S_2, \ldots S_N$ of carrier frequencies $\omega_{S1}, \omega_{S2}, \ldots \omega_{SN}$ can be used to separate the WDM FWM wave $F_j$ and the signal wave from the pump waves. As in the case presented in Embodiment 2 and shown in FIG. 11, polarization-maintaining type configuration can be used to suppress polarization crosstalk within the circuit to improve the isolation of the pump waves with respect to the amplified signal wave S' and the FWM wave F. Further, by providing polarization compensating means as in the case of Variation 1 of Embodiment 2, polarization-insensitivity can be achieved. In the cases of the embodiments to follow, it is also possible to suppress polarization crosstalk by using polarization-maintaining type components.

Embodiment 12

Figure 34:
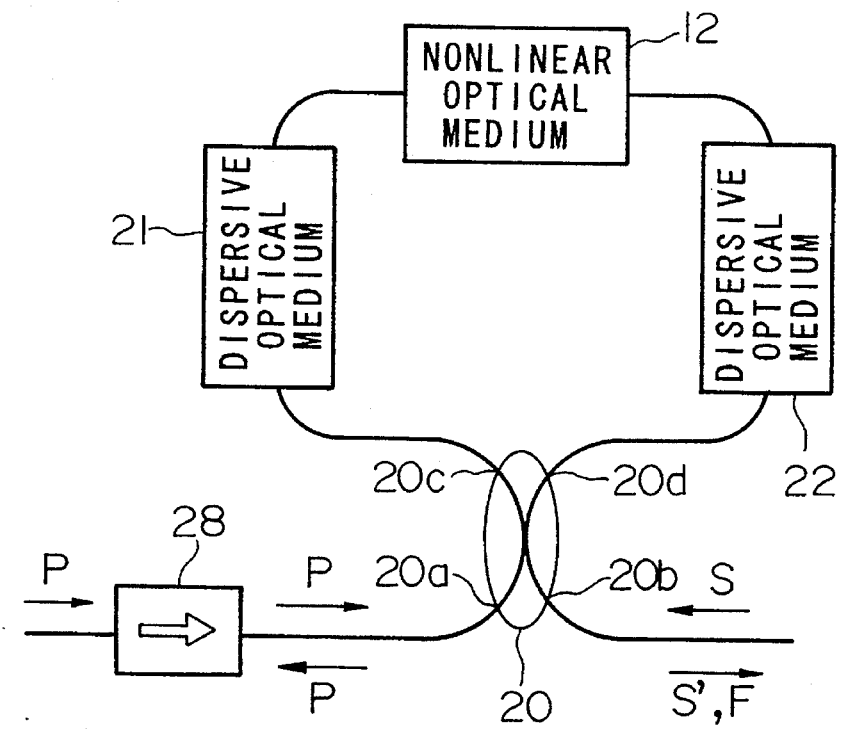
FIG. 34 is a schematic drawing of the configuration of Embodiment 12 of the optical parametric circuit of the present invention.

FIG. 34 shows a configuration of the optical parametric circuit of Embodiment 12.

The feature of this embodiment is to block the return pump wave P output from port 20a of the optical directional coupler 20 in the basic configuration presented in Embodiment 11.

In the parametric circuit of this embodiment, the pump wave P returns to the input port 20a. Therefore, very high intensity pump wave P could exert undesirable influence on the generator for the pump wave. An optical isolator 28 is disposed in front of port 20a of the optical directional coupler 20 for injection of the pump wave P to block the pump wave P output from port 20a. An optical isolator 28 may be replaced with an optical circulator.

Embodiment 13

Figure 35:
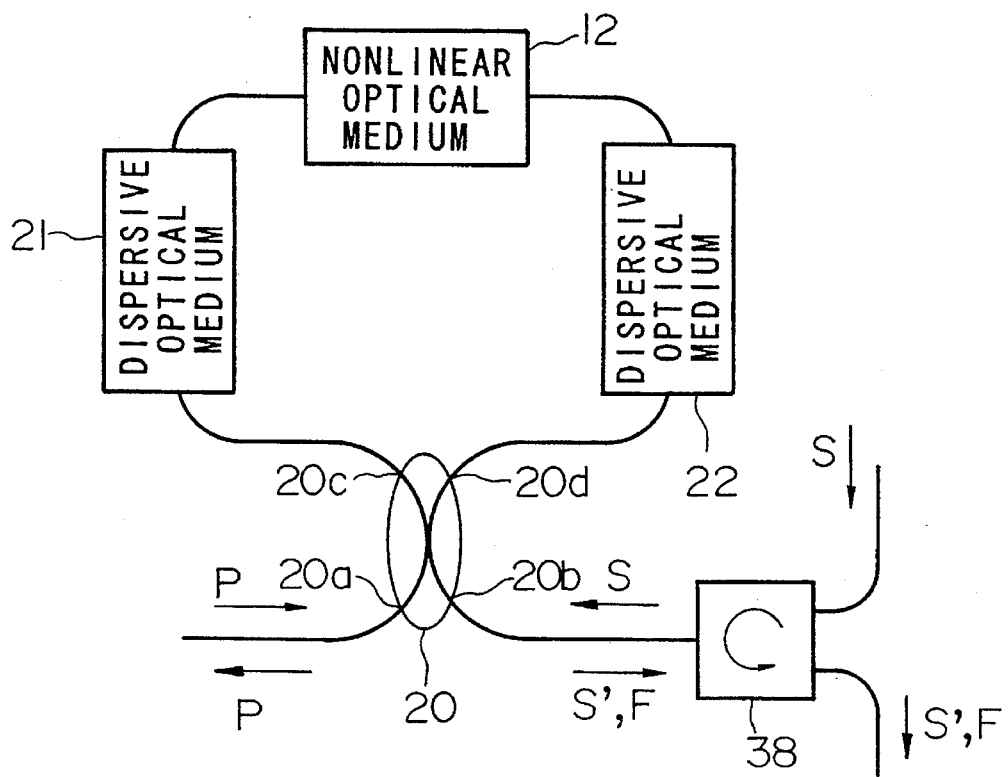
FIG. 35 is a schematic drawing of the configuration of Embodiment 13 of the optical parametric circuit of the present invention.

FIG. 35 shows a configuration of the optical parametric circuit of Embodiment 13.

The feature of this embodiment is to separate the signal wave S input into port 20b of the optical directional coupler 20 from the amplified signal wave S' and FWM wave F output from port 20b of the optical directional coupler 20 in the basic configuration presented in Embodiment 11.

In this optical parametric circuit, because an input signal wave S and an output signal wave S' and FWM wave F all pass through the same port 20b of the optical directional coupler 20, a means for separating them is necessary. This is achieved by disposing an optical circulator 38 on port 20b of the optical directional coupler 20 to separate the amplified signal wave S' and the FWM wave F from the input signal wave S.

Embodiment 14

Embodiment 14 is presented in two versions: 14A and 14B.

Embodiment 14A

Figure 36:
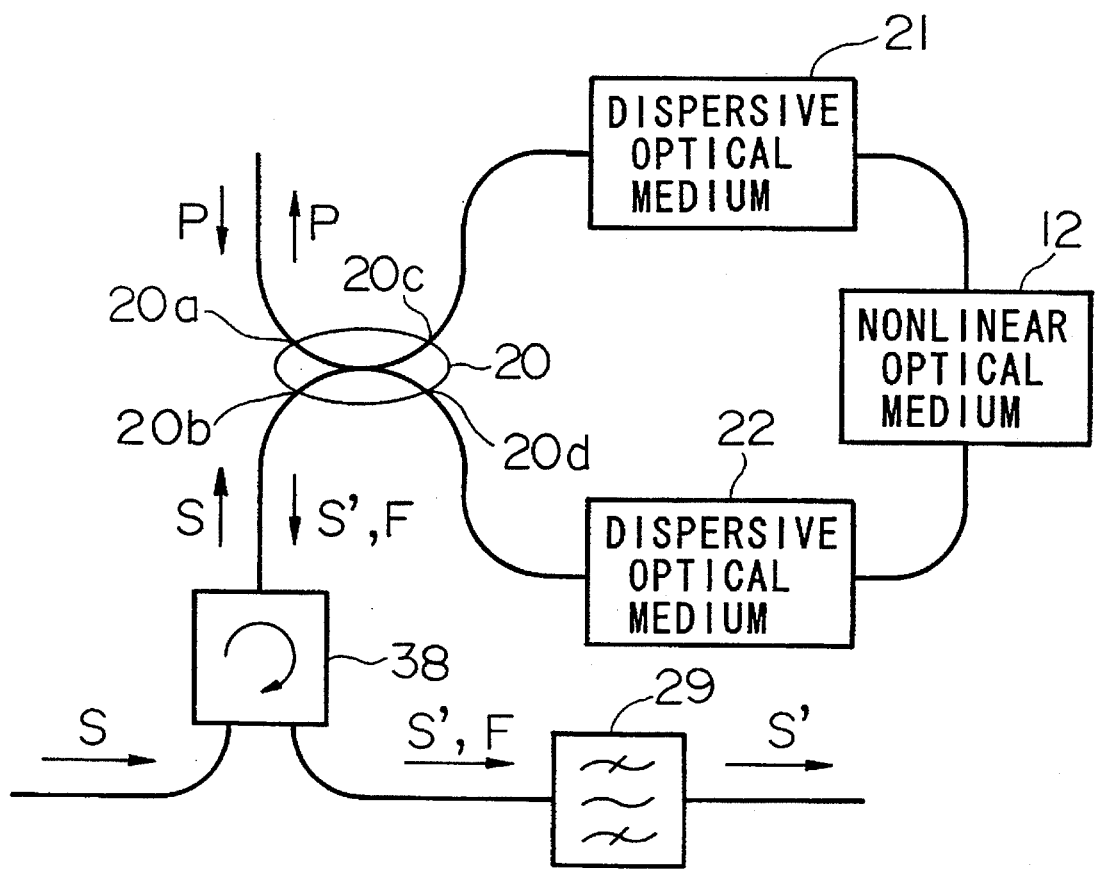
FIG. 36 is a schematic drawing of the configuration of Embodiment 14A of the optical parametric circuit of the present invention.

FIG. 36 shows a configuration of the optical parametric circuit of Embodiment 14A as an optical amplifier.

Figure 37:
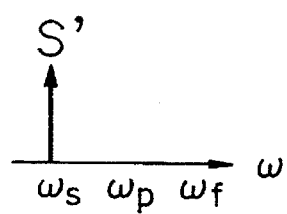
FIG. 37 shows the spectrum of an amplified output signal.

In this embodiment, in addition to the configuration of Embodiment 13, a wavelength filter 29 is used, which blocks FWM wave F and passes only the amplified signal wave S' (of carrier frequency $\omega_S$). The pump wave P (of carrier frequency $\omega_P$) may be either a cw (continuous wave) wave or an intensity-modulated wave synchronized with the signal wave S. When a signal wave S is injected into port 20b of the optical directional coupler 20 through the optical circulator 38, an amplified signal wave S' (refer to FIG. 37) is output from port 20b through the optical circulator 38 and the wavelength filter 29.

Embodiment 14B

Figure 38:
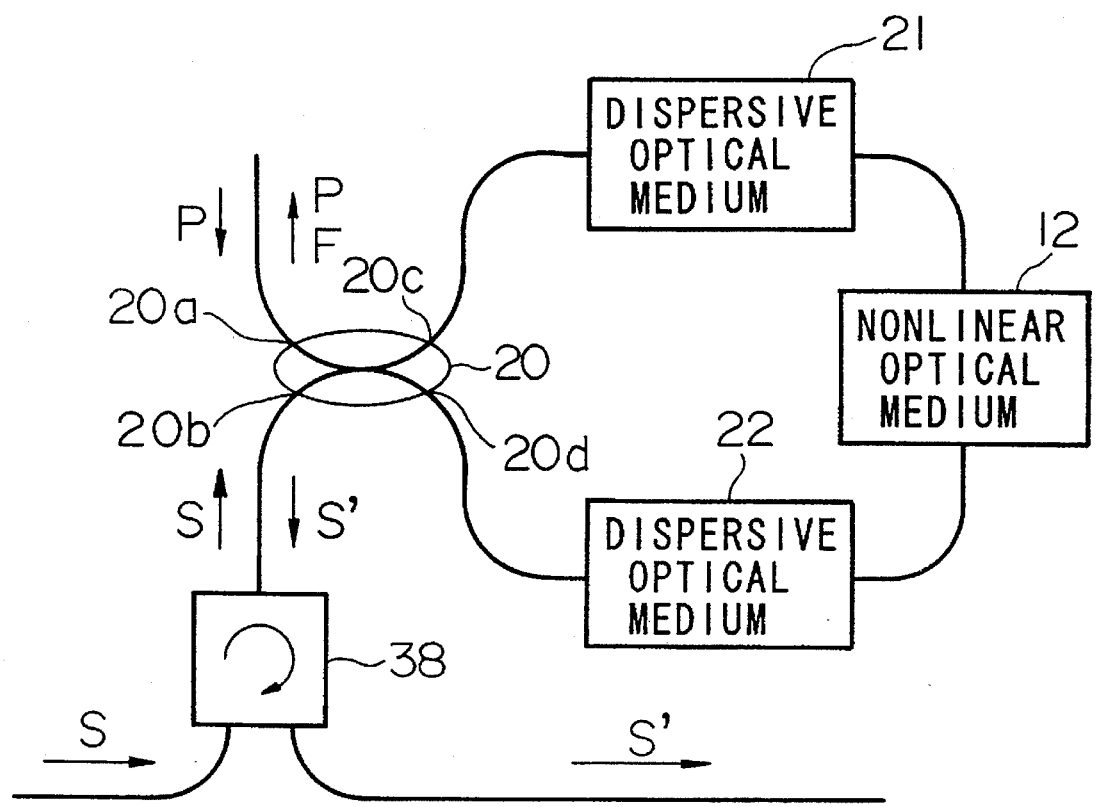
FIG. 38 is a schematic drawing of the configuration of Embodiment 14B of the optical parametric circuit of the present invention.

FIG. 38 shows another configuration of the optical parametric circuit as an optical amplifier in Embodiment 14B.

Figure 39:
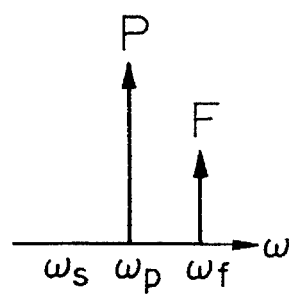

The feature of this embodiment is the selection of propagation constants $K_1(\omega)$ and $K_2(\omega)$ and the lengths $L_1$ and $L_2$ of the respective dispersive optical media 21, 22 (expressed in Equation (30)) so that only an amplified signal wave S' is output from port 20b of the optical directional coupler 20, and separated from an FWM wave F and the pump wave P which are output from port 20a (refer to FIG. 39). Therefore, the wavelength filter 29 used in FIG. 36 to pass the amplified signal wave S' and suppress FWM wave F is unnecessary in principle.

In this embodiment, an optical circulator 38 is used to separate the amplified signal wave S' output from port 20b of the optical directional coupler 20 from the signal wave S input into port 20b of the optical directional coupler 20.

Embodiment 15

Figure 40A:
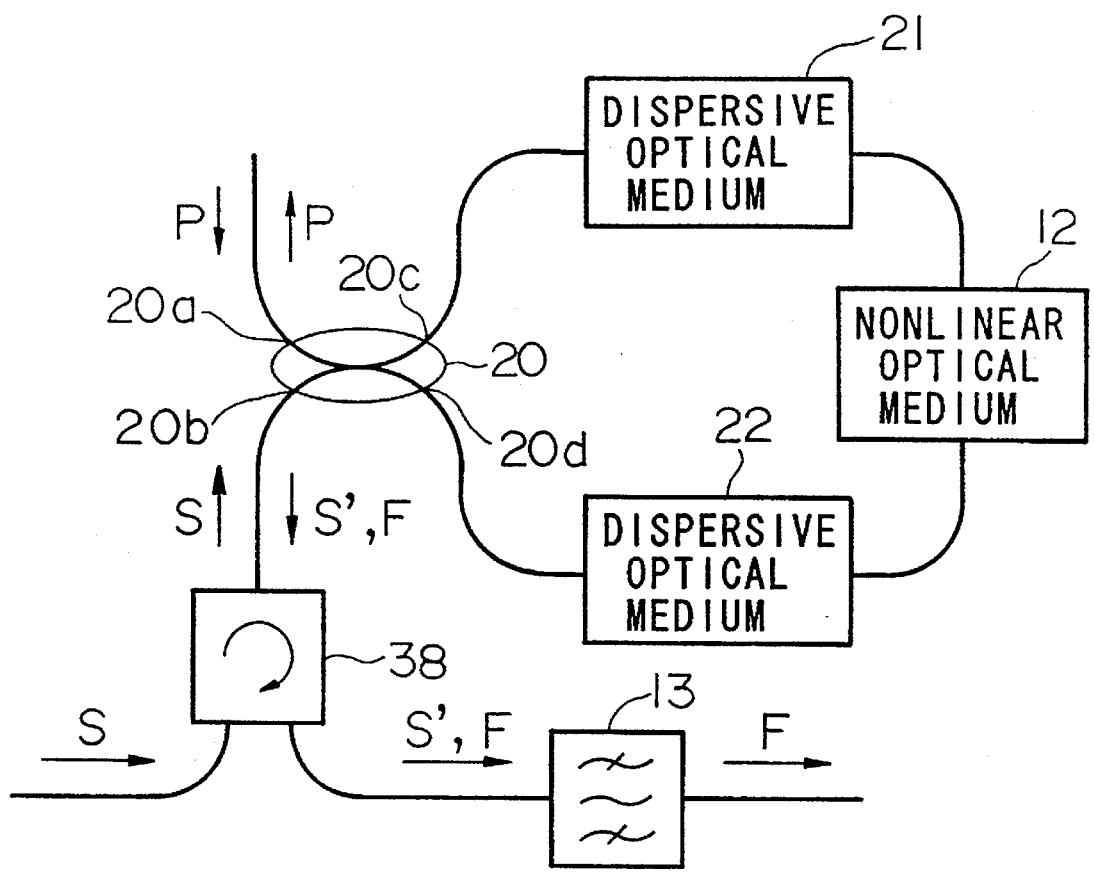
FIGS. 40A and 40B are schematic drawings of the configuration of Embodiment 15 of the optical parametric circuit of the present invention.

FIG. 40A shows a circuit configuration of the optical parametric circuit applied to an FWM wave generation circuit in Embodiment 15.

Figure 41:
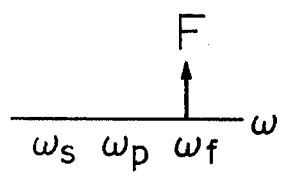
FIG. 41 shows the spectrum of an FWM wave output through a wavelength filter 13.

In this embodiment, a wavelength filter 13 which passes only FWM waves F has been added to the circuit which was presented in Embodiment 13 and shown in FIG. 35. When a signal wave S (carrier frequency $\omega_S$) is input via the optical circulator 38 into port 20b of the optical directional coupler 20, an FWM wave F is output from port 20b through the optical circulator 38 and the wavelength filter 13 (refer to FIG. 41). The carrier frequency $\omega_f(=2\omega_P-\omega_S)$ of the FWM wave F can be tuned by selecting the carrier frequency up of the pump wave P.

Figure 40B:
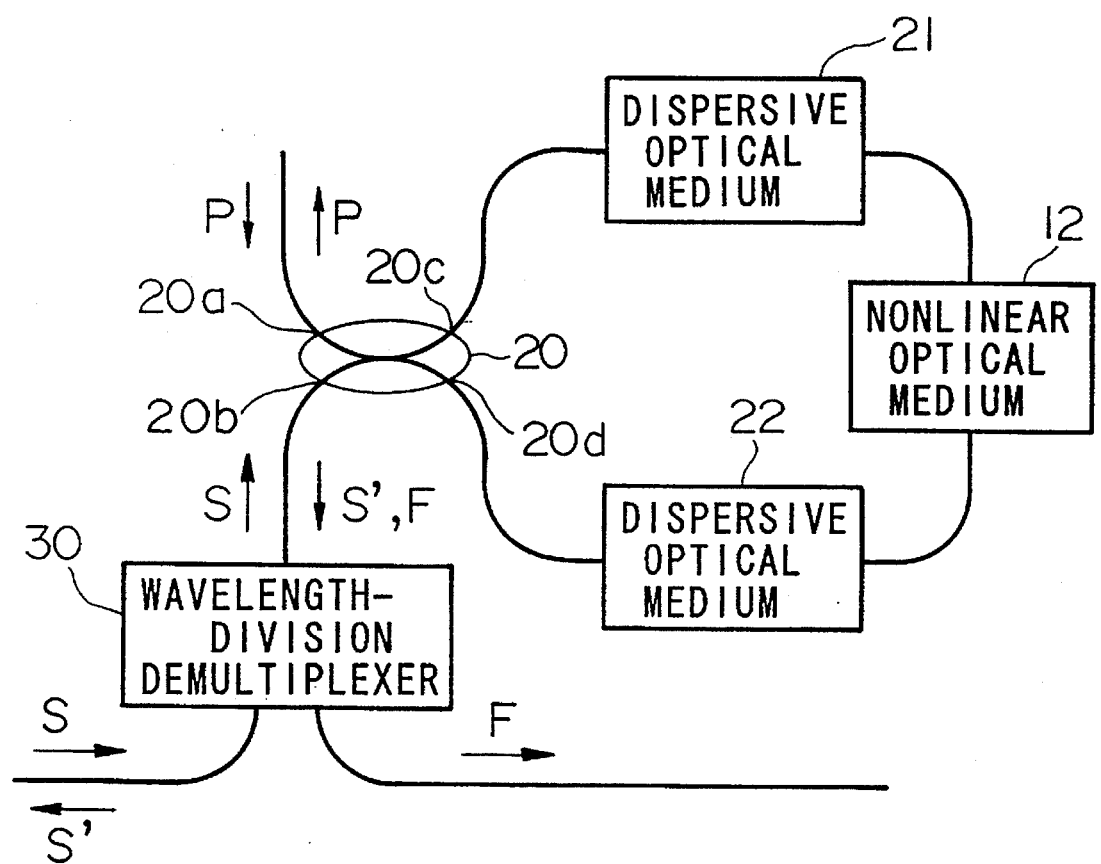

As shown in FIG. 40B, it is permissible to replace the optical circulator 38 and the wavelength filter 13 with a wavelength-division demultiplexer 30 which separates the FWM wave of carrier frequency $\omega_f$ from the signal waves S, S' of carrier frequency $\omega_S$.

In Embodiments 14 and 15, even if the pump wave P leaks into port 20b, the wavelength filters 29, 13 are able to filter the leaked pump wave P, therefore, the isolation of pump wave P with respect to the FWM wave F is further enhanced. It is also permissible to dispose an additional wavelength filter which suppresses the pump wave P. If the circuit is to be a polarization-maintaining type, a polarizer is also effective in suppressing the leak of pump waves caused by polarization crosstalk to further enhance the performance.

Embodiment 16

Figure 42:
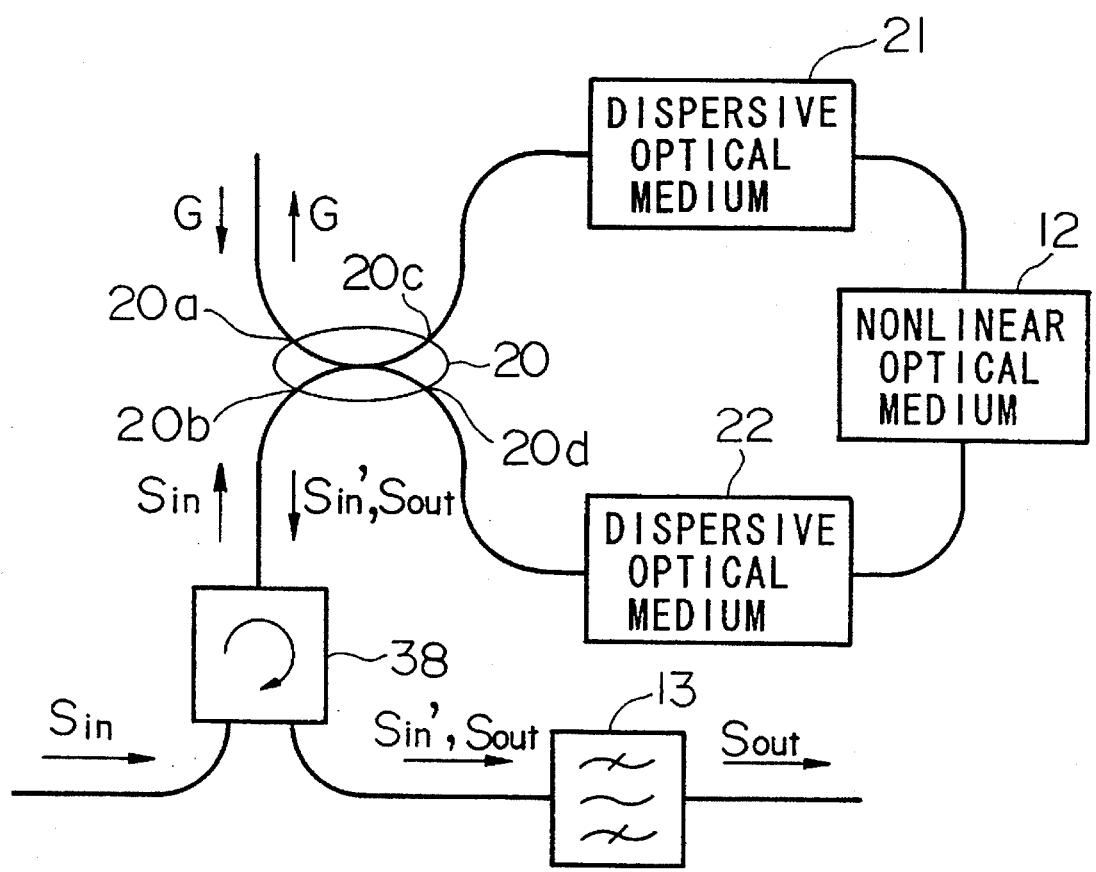
FIG. 42 is a schematic drawing of the configuration of an optical parametric circuit in Embodiment 16 of the present invention.

Embodiment 16 is an application of the circuit presented in Embodiment 15 to a 2-input 1-output optical gate circuit (optical AND-circuit). FIG. 42 shows the flow of optical signals in the circuit.

Figure 43A:
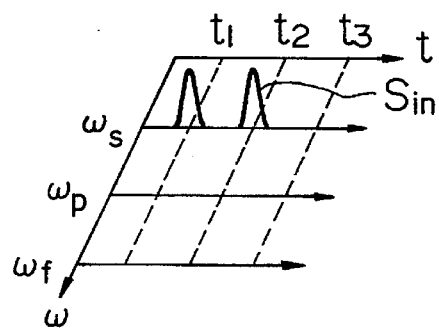
FIGS. 43A–43E show the optical waveforms corresponding to each carrier frequency in Embodiment 16.
Figure 43B:
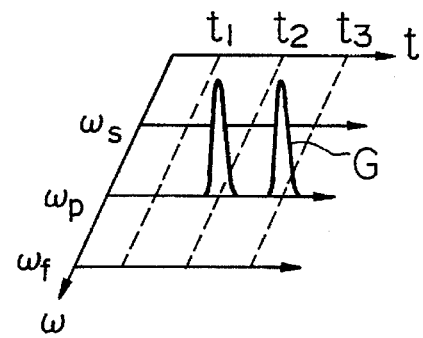
Figure 43C:
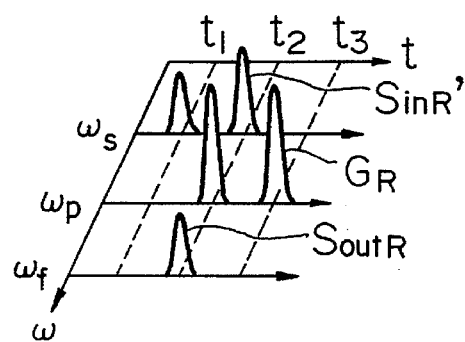
Figure 43D:
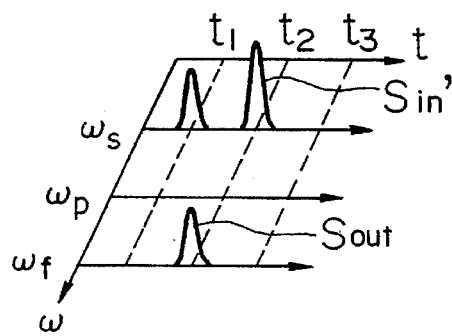
Figure 43E:
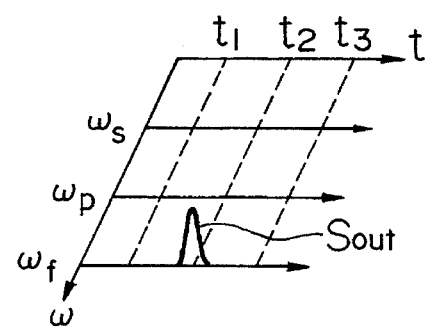

In this embodiment, an optical input signal $S_{in}$ is input into port 20b of the optical directional coupler via the optical circulator 38 and an optical gate signal G is input into port 20a, where the optical input signal $S_{in}$ is a pulsed signal wave of carrier frequency $\omega_S$ (refer to FIG. 43A) and the optical gate signal G is a pulsed pump wave of carrier frequency $\omega_P$ (refer to FIG. 43B). Then, an optical output signal $S_{out}$ which is an FWM wave of carrier frequency $\omega_f(=2\omega_P-\omega_S)$ is produced and the optical input signal $S_{in}'$ is amplified in the timeslots ($t_2$) in which the optical input signal $S_{in}$ and the optical gate signal G overlap each other in the nonlinear optical medium 12. FIG. 43C shows these optical signals in the clockwise direction. The optical output signal $S_{out}$ and the amplified optical input signal $S_{in}'$ are separated from the optical gate signal G and output from port 20b of the optical directional coupler 20 (refer to FIG. 43D). The signals $S_{out}$ and $S_{in}'$ then pass through the optical circulator 38 and are further filtered with a wavelength filter 13 so as to block the amplified optical input signal $S_{in}'$ and to output only the optical output signal $S_{out}$ (refer to FIG. 43E). Therefore, this circuit has the same function as the circuit explained in Embodiment 8 and shown in FIG. 22.

Variation 1 of Embodiment 16

Figure 44:
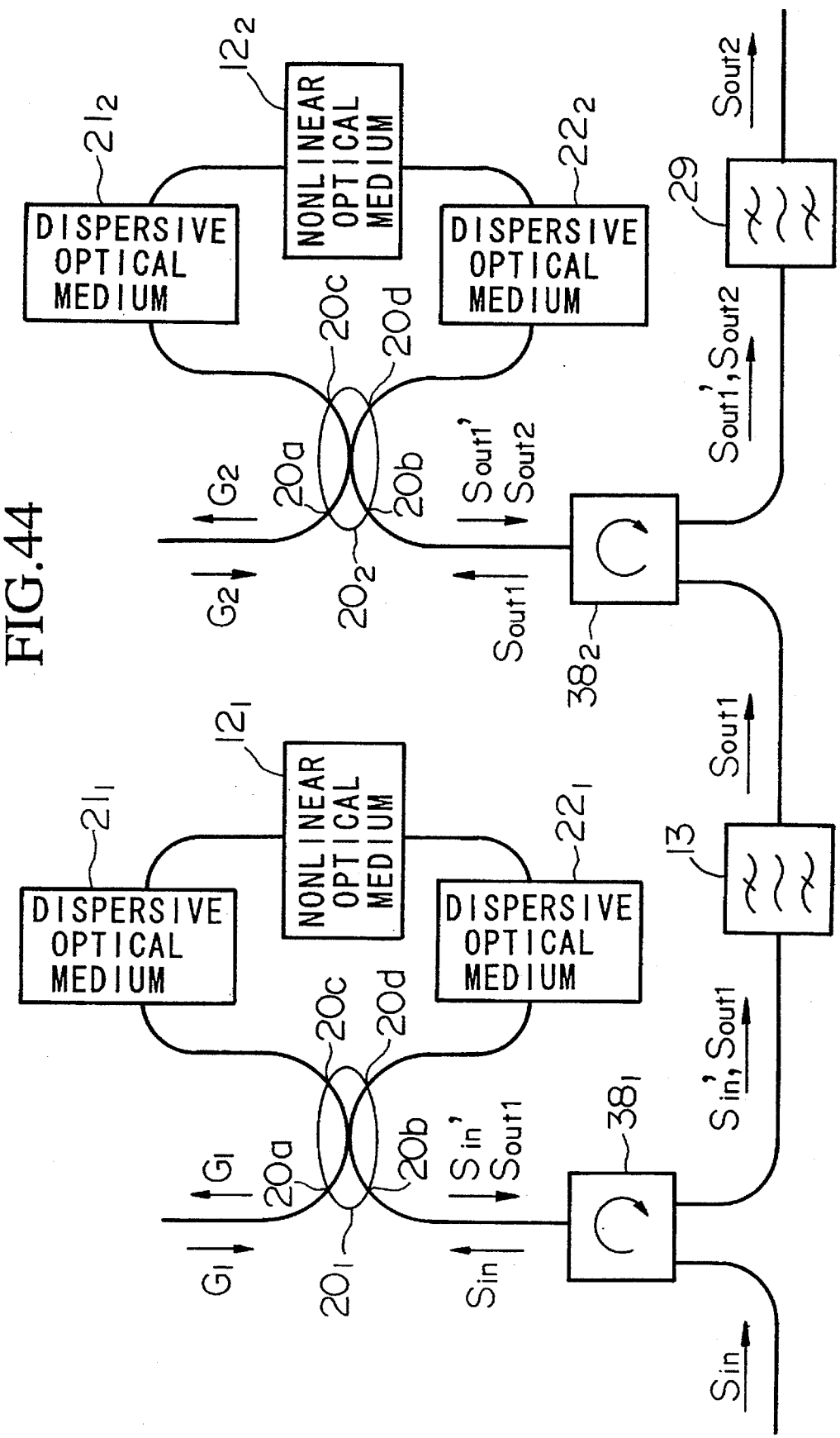
FIG. 44 is a schematic drawing of the optical parametric circuit in Variation 1 of Embodiment 16 of the present invention.

FIG. 44 shows a circuit configuration of a Variation 1 of Embodiment 16. This is an application of the optical parametric circuit to an optical time-division demultiplexer for separating a TDM signal, by connecting optical gate circuits shown in FIG. 42 in a multi-stage configuration.

Figure 45A:
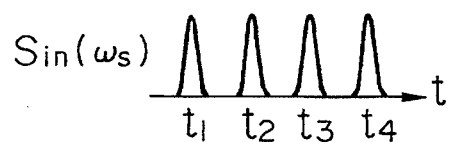
FIGS. 45A–45F show the optical waveforms corresponding to each carrier frequency in Variation 1 of Embodiment 16.
Figure 45B:
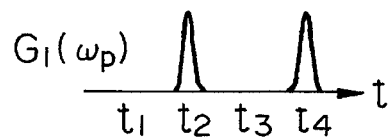
Figure 45C:
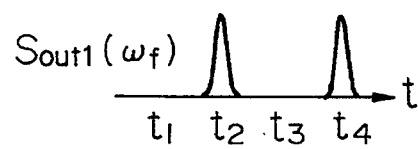
Figure 45D:
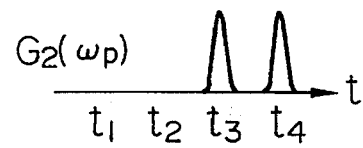
Figure 45E:
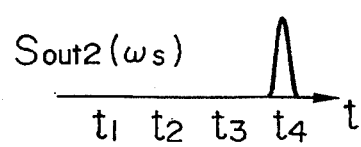
Figure 45F:
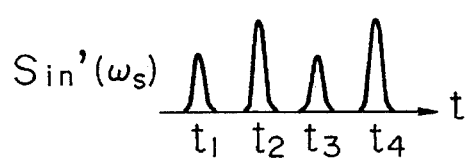

In this variation, in the first-stage optical gate circuit, a TDM optical input signal $S_{in}$ which is a pulsed signal wave of carrier frequency $\omega_S$ and which contains four channels in the timeslots ($t_1$, $t_2$, $t_3$, $t_4$) (refer to FIG. 45A) and an optical gate signal $G_1$ which is a pulsed pump wave of carrier frequency $\omega_P$ and which is active in the timeslots ($t_2$, $t_4$) (refer to FIG. 45B) are input, and an optical output signal $S_{out1}$ which is a generated FWM wave of carrier frequency $\omega_f(=2\omega_P-\omega_S)$ in the respective timeslots ($t_2$, $t_4$) (refer to FIG. 45C) is output via a wavelength filter 13 which passes only the carrier frequency $\omega_f$ to block the amplified optical input signal $S_{in}'$ (refer to FIG. 45F).

In the second-stage optical gate circuit, a optical input signal which is the optical output signal $S_{out1}$ from the first-stage optical gate circuit and an optical gate signal $G_2$ which is a pulsed pump wave of carrier frequency $\omega_P$ and which is active in the timeslots ($t_3$, $t_4$) (refer to FIG. 45D) are input, and an optical output signal $S_{out2}$ which is a generated FWM wave of carrier frequency $\omega_S(=2\omega_P-\omega_f)$ in the timeslot ($t_4$) is output via a wavelength filter 29 which passes only the carrier frequency $\omega_S$ to block the amplified optical input signal $S_{out1}'$ (refer to FIG. 45E).

The procedure enables to demultiplex the TDM optical input signal $S_{in}$ to extract one channel in the timeslot in which both optical gate signals $G_1$ and $G_2$ are active, and presents the same function as the circuit of Embodiment 9.

Variation 2 of Embodiment 16

Figure 46:
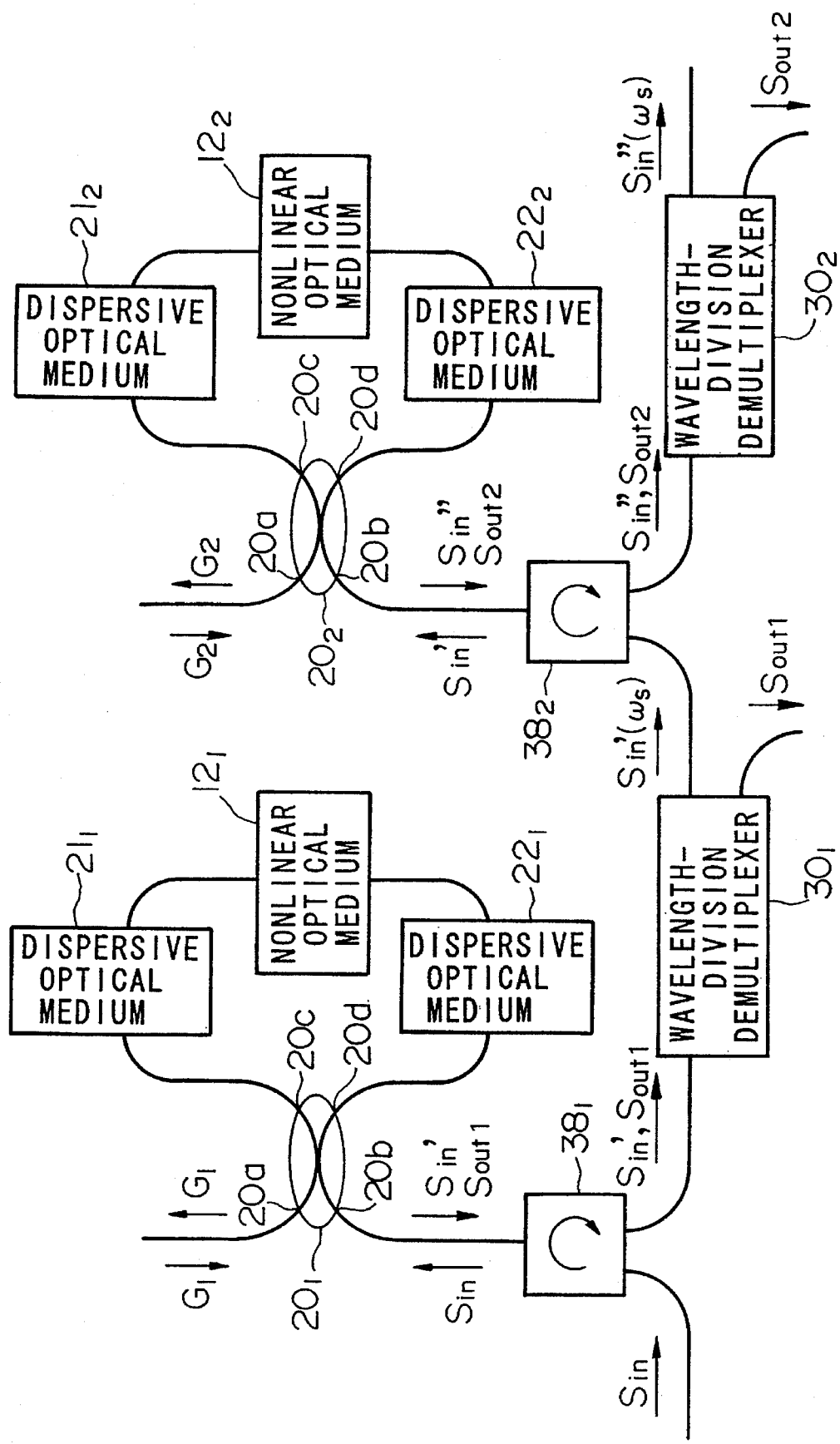
FIG. 46 is a schematic drawing of the optical parametric circuit in Variation 2 of Embodiment 16 of the present invention.

FIG. 46 shows a circuit configuration of a Variation 2 of Embodiment 16. The feature of this configuration is that the wavelength filters 13, 29 in the optical time-division demultiplexer presented in FIG. 44 are replaced with wavelength-division demultiplexers $30_1$, $30_2$.

In this variation, in the first-stage optical gate circuit, a TDM optical input signal $S_{in}$ of carrier frequency $\omega_S$ which contains four channels in the timeslots ($t_1$, $t_2$, $t_3$, $t_4$) (same as is shown in FIG. 45A) and an optical gate signal $G_1$ of carrier frequency $\omega_P$ which is active in the timeslots ($t_2$, $t_4$) (same as is shown in FIG. 45B) are input, and an optical output signal $S_{out1}$ which is a generated FWM wave of carrier frequency $\omega_f(=2\omega_P-\omega_S)$ in the corresponding timeslots ($t_2$, $t_4$) (same as is shown in FIG. 45C) is output together with the optical input signal $S_{in}'$ amplified in the corresponding timeslots ($t_2$, $t_4$) (same as is shown in FIG. 45F) from an optical circulator $38_1$ to a wavelength-division demultiplexer $30_1$ which separates the optical output signal $S_{out1}$ of carrier frequency $\omega_f$ from the amplified optical input signal $S_{in}'$ of carrier frequency $\omega_S$. The first-stage optical gate circuit, therefore, achieves the isolation of the two timeslots ($t_2$, $t_4$) of the TDM optical input signal $S_{in}$.

Figure 47A:
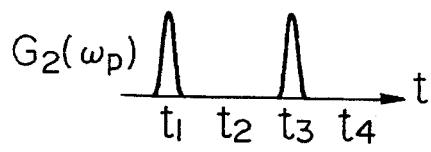
FIGS. 47A and 47B show the optical waveforms corresponding to each carrier frequency in Variation 2 of Embodiment 16.
Figure 47B:
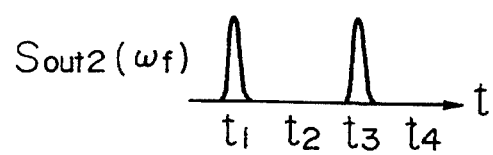

In the second-stage optical gate circuit, an optical input signal which is the amplified optical output signal $S_{in}'$, output from the first-stage optical gate circuit and an optical gate signal $G_2$ of carrier frequency $\omega_P$ which is active in the timeslots ($t_1$, $t_3$) (refer to FIG. 47A) are input, and an optical output signal $S_{out2}$ which is a generated FWM wave of carrier frequency $\omega_f(=2\omega_P-\omega_S)$ in the timeslots ($t_1$, $t_3$) (refer to FIG. 47B) is output with the optical input signal $S_{in}"$ amplified in the corresponding timeslots ($t_1$, $t_3$) from an optical circulator $38_2$ to a wavelength-division demultiplexer $30_2$ which separates the optical output signal $S_{out2}$ of carrier frequency $\omega_f$ from the amplified optical input signal $S_{in}"$ of carrier frequency $\omega_S$. The second-stage optical gate circuit, therefore, achieves the isolation of the two timeslots ($t_1$, $t_3$) of the TDM optical input signal $S_{in}$.

The procedure enables to demultiplex the TDM optical input signal $S_{in}$ to extract channels in the timeslots in which respective optical gate signals $G_1$ and $G_2$ are active. The amplified optical input signal $S_{in}"$ output from the second-stage circuit can also be used to demultiplex the TDM optical input signal $S_{in}$ to extract any channels in additional stages of this optical gate circuit with the wavelength-division demultiplexer 30.

Embodiment 17

Figure 48:
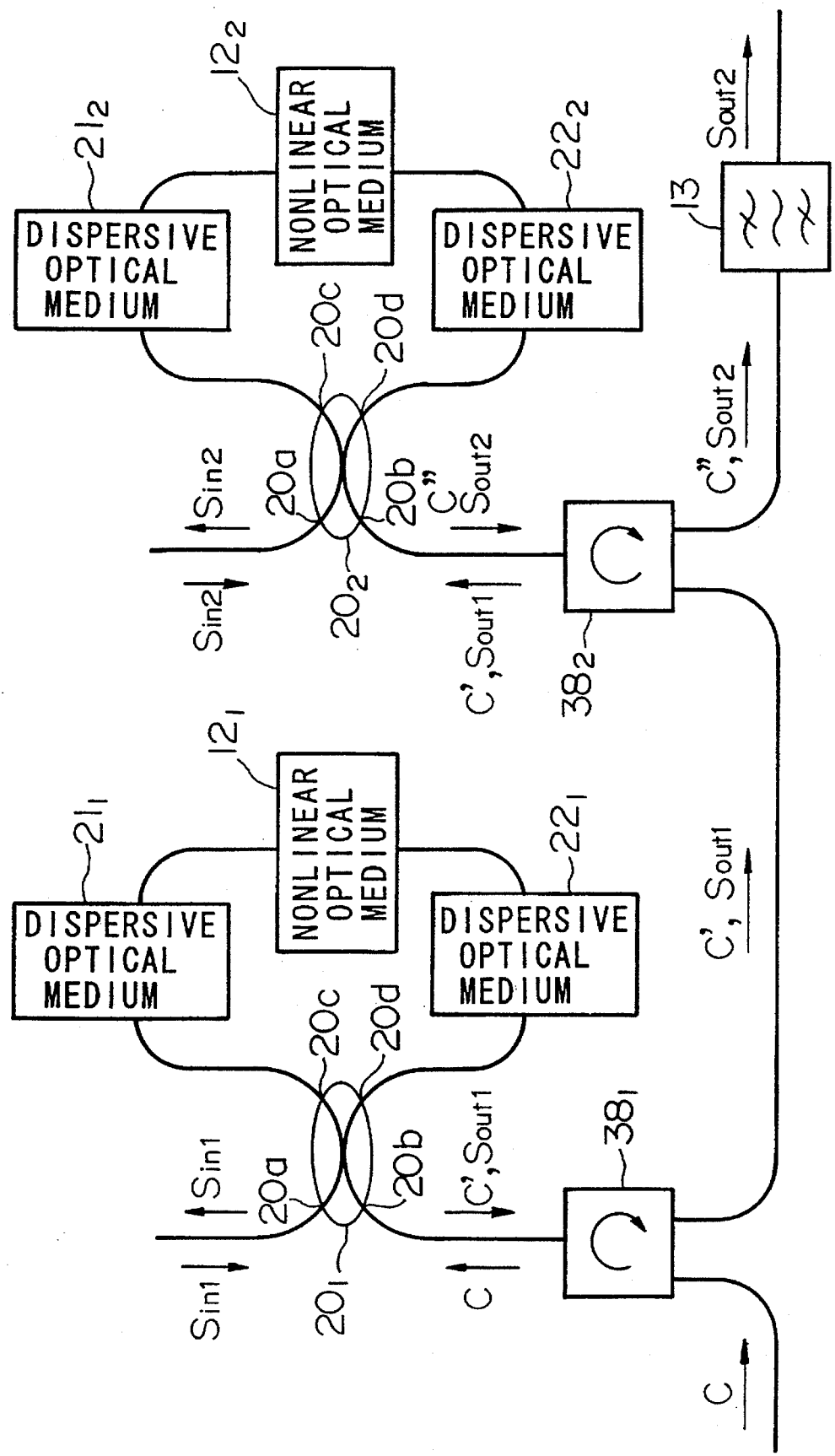
FIG. 48 is a schematic drawing of the configuration of an optical parametric circuit in Embodiment 17 of the present invention.

FIG. 48 shows a circuit configuration of Embodiment 17, in which the parametric circuit of FIG. 35 is connected in a multi-stage configuration to perform time-division multiplexing of input pulse signals $S_{in1}$, $S_{in2}$.

Figure 49A:
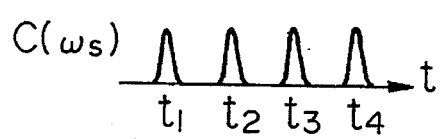
FIGS. 49A–49F show the optical waveforms corresponding to each carrier frequency in Embodiment 17.
Figure 49B:
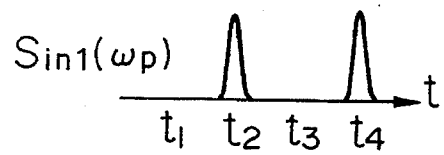
Figure 49C:
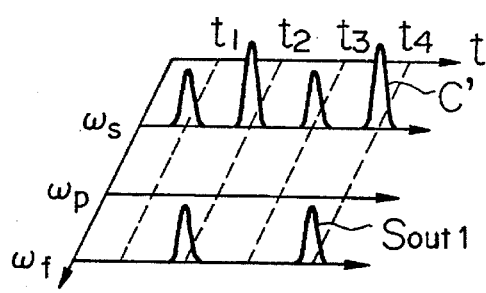

In this case, an optical clock signal C which is a pulsed signal wave of carrier frequency $\omega_S$ (refer to FIG. 49A) is input through an optical circulator $38_1$ into port 20b of the optical directional coupler $20_1$ in the first-stage optical gate circuit. The first optical input signal $S_{in1}$ which is a pulsed pump wave of carrier frequency $\omega_P$ (refer to FIG. 49B) is input into port 20a. At this time, an optical output signal $S_{out1}$ (FWM wave) of carrier frequency $\omega_f(=2\omega_P-\omega_S)$ is generated in the timeslots ($t_2$, $t_4$) of the first input signal $S_{in1}$ in the nonlinear optical medium $12_1$ and is output together with the optical clock signal C' amplified in the active timeslots ($t_2$, $t_4$) (refer to FIG. 49C) from the optical circulator $38_1$.

Figure 49D:
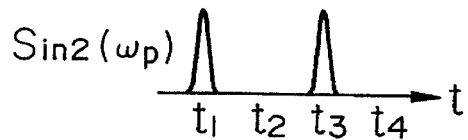
Figure 49E:
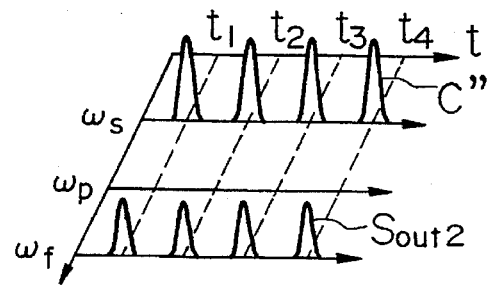

The optical clock signal C' and the optical output signal $S_{out1}$ are input into port 20b of the optical directional coupler $20_2$ through the optical circulator $38_2$ of the second-stage optical gate circuit. In the meantime, the second optical input signal $S_{in2}$ which is a pulsed pump wave of carrier frequency $\omega_P$ (refer to FIG. 49D) is input into port 20a. At this time, an optical output signal (FWM wave) $S_{out2}$ of carrier frequency $\omega_f(=2\omega_P-\omega_S)$ is generated in the active timeslots ($t_1$, $t_3$) of the second optical input signal $S_{in2}$ in the nonlinear optical medium $12_2$ and is output from port 20b together with the optical clock signal C'' amplified in the timeslots ($t_1$, $t_3$) (refer to FIG. 49E).

Similarly, additional optical input signals can be multiplexed by further connecting additional optical gate circuits.

Figure 49F:
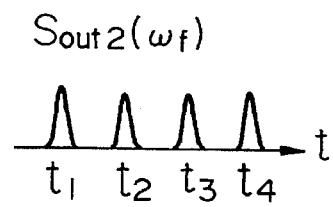

The wavelength filter 13 blocks the optical clock signal C'', and passes only the TDM optical output signal $S_{out2}$ of carrier frequency $\omega_f$ (refer to FIG. 49F). Accordingly, the optical circuit of this embodiment generates TDM optical output signal $S_{out2}$ of carrier frequency $\omega_f$ from the two optical input signals $S_{in2}$ of carrier frequency $\omega_S$.

Embodiment 18

Figure 50:
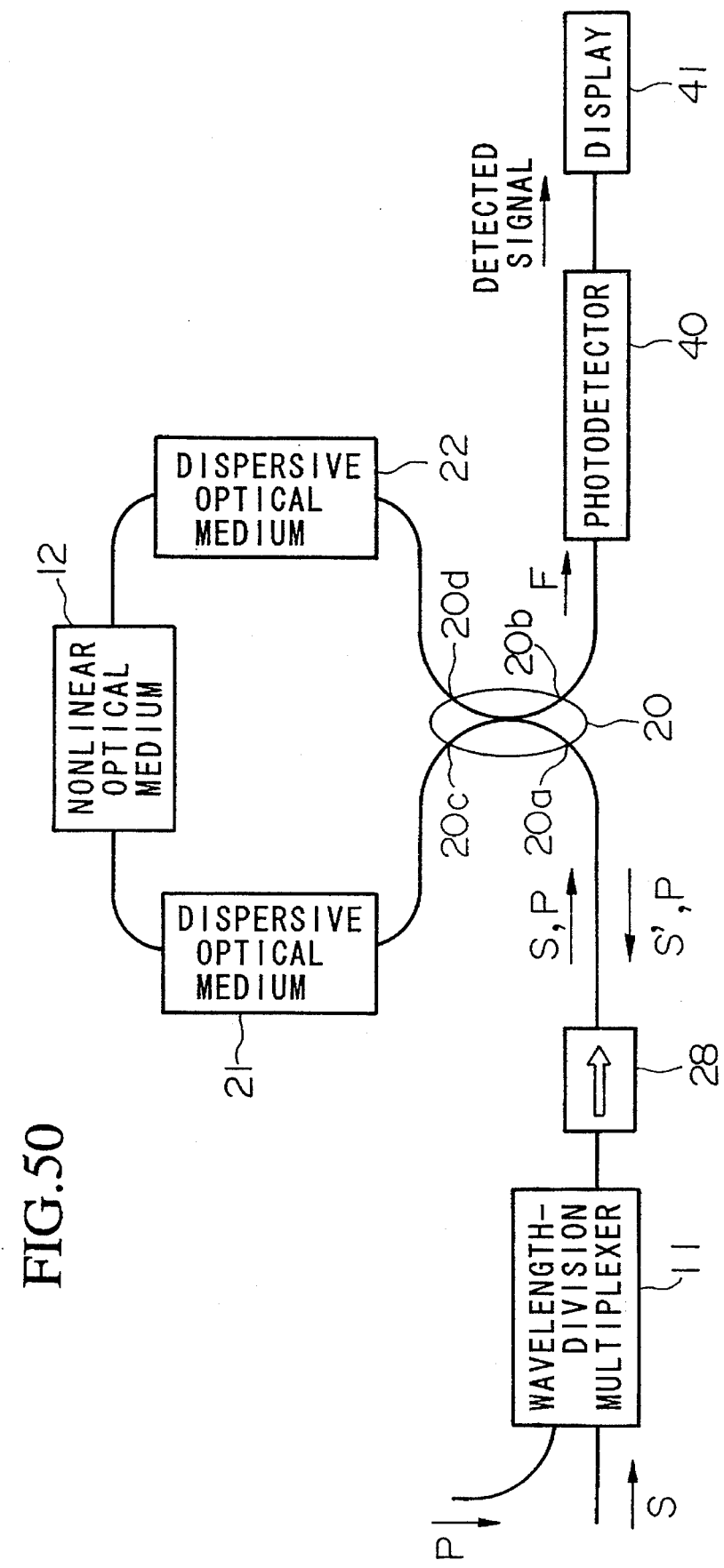
FIG. 50 is a schematic drawing of the configuration of an optical parametric (waveform sampling) circuit in Embodiment 18 of the present invention.
Figure 51:
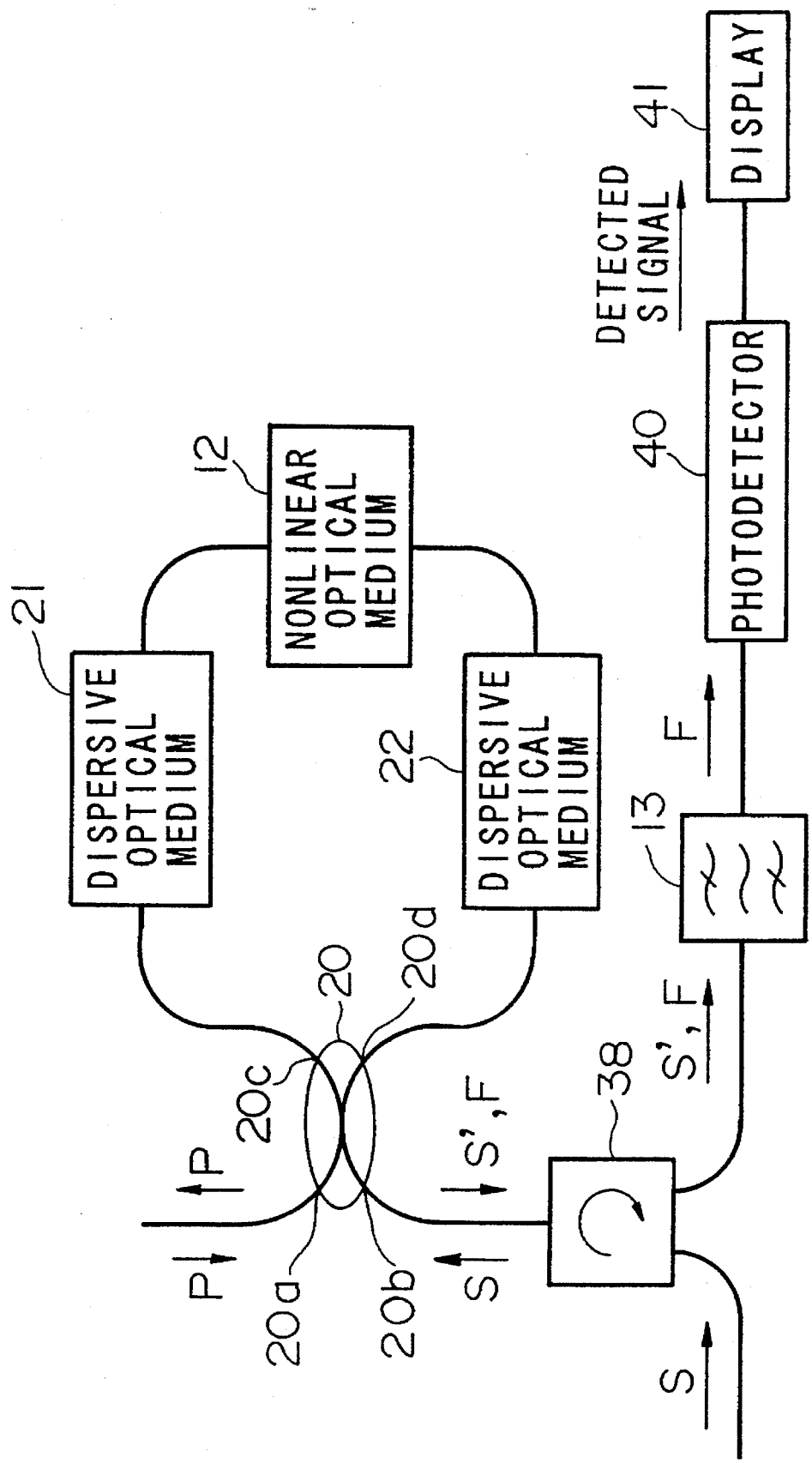
FIG. 51 is similarly a schematic drawing of the configuration of an optical parametric (waveform sampling) circuit in Embodiment 18 of the present invention.

FIGS. 50, 51 show an application of the optical parametric circuit to an optical waveform sampling circuit for observing optical signals.

The feature of the operating mode of the parametric circuit of this embodiment is that a pulsed signal wave of carrier frequency $\omega_S$ is injected together with a pulsed pump wave of carrier frequency up having a comparatively narrower pulse width (than that of the target pulse wave) to generate an FWM wave of carrier frequency $\omega_f(=2\omega_P-\omega_S)$. The parametric circuit is provided with a photodetector 40 to detect the FWM wave of carrier frequency $\omega_f$ and a display 41 as a display means for displaying the detected signal waveform from the photodetector.

Figure 52A:
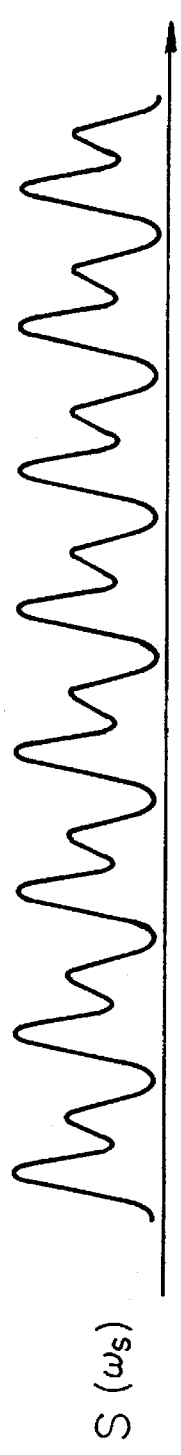
FIGS. 52A–52D show each wave in the optical parametric (waveform sampling) circuit in Embodiment 18.
Figure 52B:
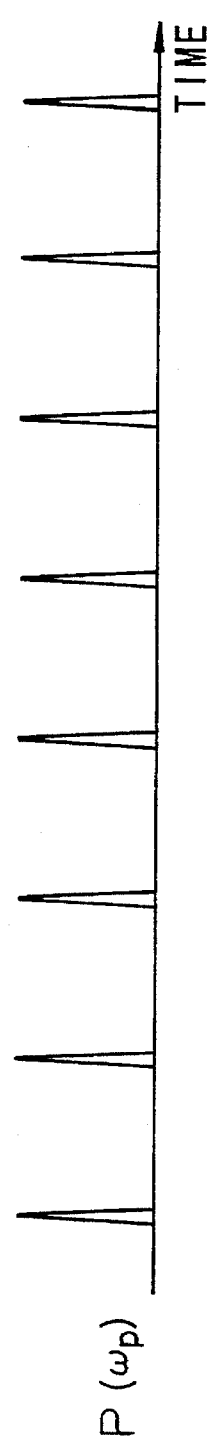
Figure 52C:
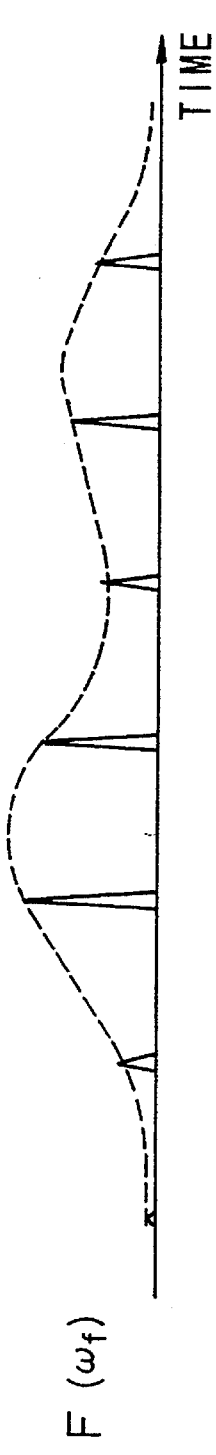
Figure 52D:
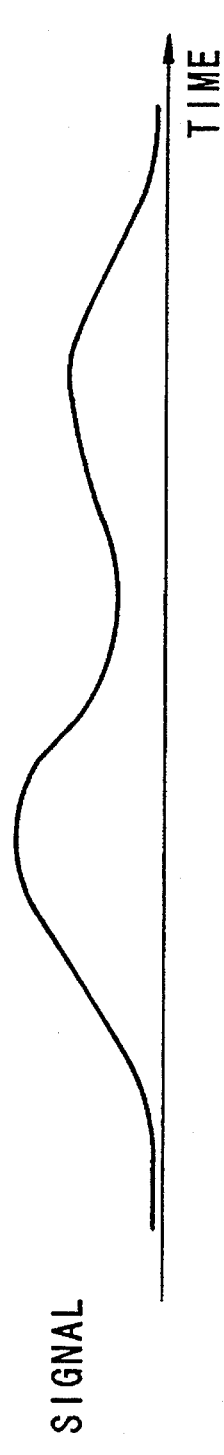
Figure 53:
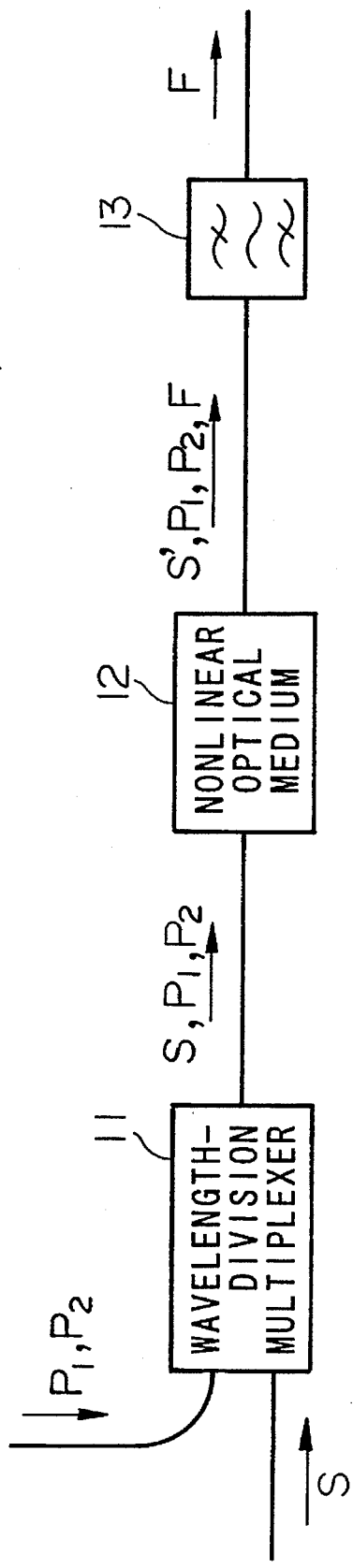
FIG. 53 is a schematic diagram of a conventional optical parametric circuit.
Figure 57:
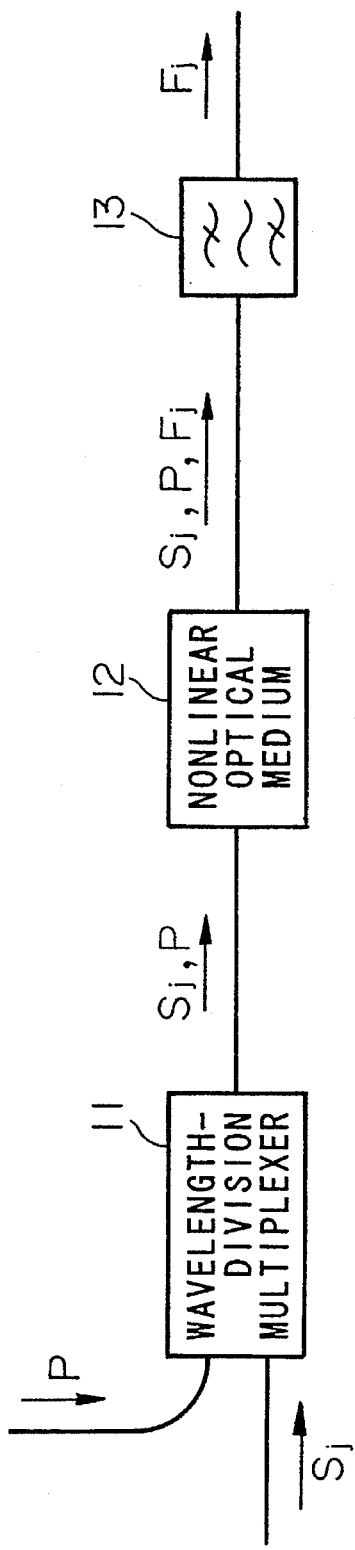
FIG. 57 is a schematic diagram of a conventional simultaneous wavelength conversion circuit for wavelength-division multiplexed signal waves.
Figure 58B:
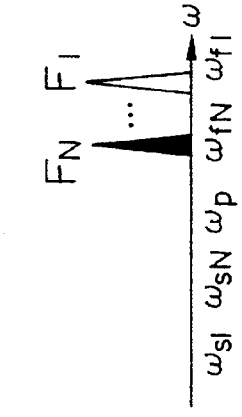
FIGS. 58A–58E show the spectra of each wave in the circuit shown in FIG. 57.
Figure 58A:
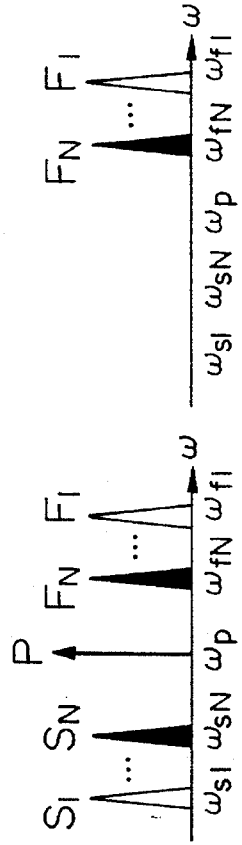
Figure 58C:
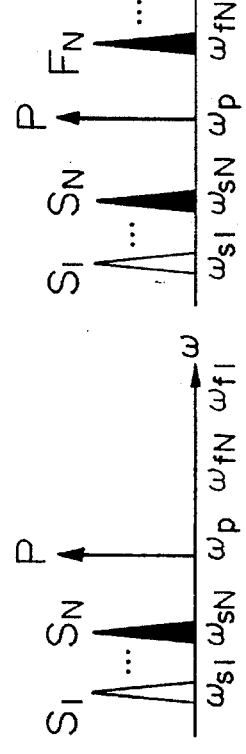
Figure 58D:
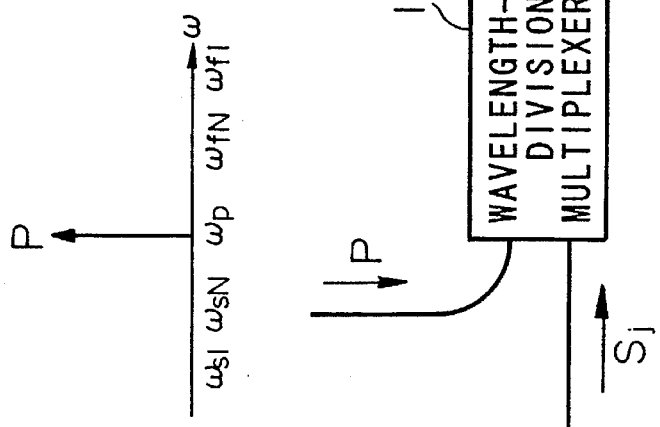
Figure 58E:
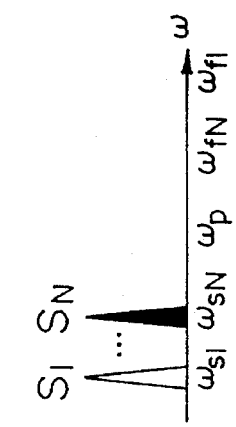
Figure 59:
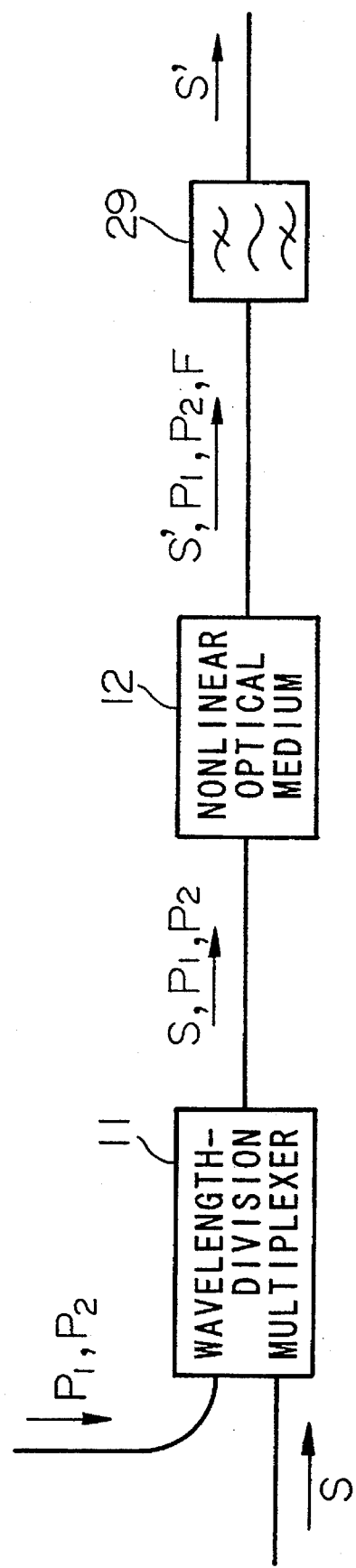
FIG. 59 is a schematic diagram of a conventional optical parametric amplifier circuit.
Figure 60:
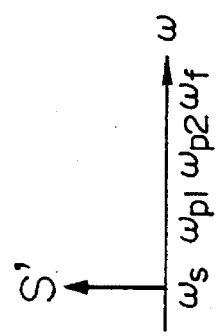
FIG. 60 shows the spectrum of the signal wave in the circuit shown in FIG. 59.

In this embodiment, a pulsed pump wave P having a repetition frequency $f+\Delta f$ is used to sample a pulsed signal wave S having a repetition frequency (bit rate) f, where the pulse width of the pump wave P is narrower than that of the pulsed signal wave S. The pulsed signal wave S of carrier frequency $\omega_S$ (refer to FIG. 52A) and a pulsed pump wave P of carrier frequency $\omega_P$ (refer to FIG. 52B) produce an FWM wave F of carrier frequency $\omega_f(=2\omega_P-\omega_S)$ (refer to FIG. 52C) having a waveform in which the pulsed pump wave P is amplitude-modulated by the pulsed signal wave S. The envelop of the FWM wave F (shown by dashed curve in FIG. 52C) having a repetition frequency $\Delta f$ is obtained by detecting wave F with a photodetector 40 having a suitable bandwidth (refer to FIG. 52D).

FIG. 50 shows an optical waveform sampling circuit which uses the optical parametric circuit shown in FIG. 22. Also, FIG. 51 shows an optical waveform sampling circuit which uses the optical parametric circuit shown in FIG. 40A. In FIGS. 50 and 51, the optical waveform sampling circuits are provided with a display 41 to display the waveform of the defected signal output from the photodetector 40.

What is claimed is:

1. An optical parametric circuit comprising:

a nonlinear optical medium for generating optical waves having carrier angular frequencies $\omega_{f1}$, $\omega_{f2}$, ... $\omega_{fN}$ from optical waves having carrier angular frequencies $\omega_{S1}$, $\omega_{S2}$, ... $\omega_{SN}$, $\omega_{P1}$, and $\omega_{P2}$, where $\omega_{fj}=\omega_{P1}+\omega_{P2}-\omega_{Sj}$ (j=1,2, ... N);

an optical directional coupler having a first input port, second input port, first output port and second output port, for dividing optical waves having carrier angular frequencies $\omega_{Sj}$, $\omega_{P1}$, $\omega_{P2}$ and $\omega_{fj}$ into two optical waves of equal intensities and polarization states, respectively;

a first dispersive optical medium having a length dimension $L_1$ and a propagation constant $K_1(\omega)$, for connecting the first output port of said optical directional coupler with one end of said nonlinear optical medium;

a second dispersive optical medium having a length dimension $L_2$ and a propagation constant $K_2(\omega)$, for connecting the second output port of said optical directional coupler with other end of said nonlinear optical medium;

wherein signal waves having carrier angular frequencies $\omega_{S1}$, $\omega_{S2}$, ... $\omega_{SN}$ and pump waves having carrier angular frequencies $\omega_{P1}$, $\omega_{P2}$ are injected into the first input port of said optical directional coupler so as to output four-wave-mixing waves having carrier angular frequencies $\omega_{f1}$, $\omega_{f2}$, ... $\omega_{fN}$ generated in said nonlinear optical medium from the second input port of said optical directional coupler, and wherein said carrier angular frequencies $\omega_{Sj}$, $\omega_{P1}$, $\omega_{P2}$, and $\omega_{fj}$ are related by an expression:

$$\{K_2(\omega_{fj})+K_2(\omega_{Sj})-K_2(\omega_{P1})-K_2(\omega_{P2})\}L_2=\{K_1(\omega_{fj})+K_1(\omega_{Sj})-K_1(\omega_{P1})-K_1(\omega_{P2})\}L_1+(2n-1\pm\alpha)\pi$$

where n is an integer and an allowable error $\alpha$ is in a range $0\leq\alpha<\frac{1}{2}$.

2. An optical parametric circuit comprising:

a nonlinear optical medium for generating optical waves having carrier angular frequencies $\omega_{f1}$, $\omega_{f2}$, ... $\omega_{fN}$ from optical waves having carrier angular frequencies $\omega_{S1}$, $\omega_{S2}$, ... $\omega_{SN}$, $\omega_{P1}$, and $\omega_{P2}$, where $\omega_{fj}=\omega_{P1}+\omega_{P2}-\omega_{Sj}$ (j=1,2, ... N);

an optical directional coupler having a first input port, second input port, first output port and second output port, for dividing optical waves having carrier angular frequencies $\omega_{Sj}$, $\omega_{P1}$, $\omega_{P2}$ and $\omega_{fj}$ into two optical waves of equal intensities and polarization states, respectively;

a first dispersive optical medium having a length dimension $L_1$ and a propagation constant $K_1(\omega)$, for connecting the first output port of said optical directional coupler with one end of said nonlinear optical medium;

a second dispersive optical medium having a length dimension $L_2$ and a propagation constant $K_2(\omega)$, for connecting the second output port of said optical directional coupler with other end of said nonlinear optical medium;

wherein pump waves having carrier angular frequencies $\omega_{P1}$, $\omega_{P2}$ are injected into the first input port of said optical directional coupler and signal waves having carrier angular frequencies $\omega_{S1}$, $\omega_{S2}$, ... $\omega_{SN}$ are injected into the second input port of said optical directional coupler so as to output said signal waves having carrier angular frequencies $\omega_{S1}$, $\omega_{S2}$, ... $\omega_{SN}$ amplified in said nonlinear optical medium together with four-wave-mixing waves having carrier angular frequencies $\omega_{f1}$, $\omega_{f2}$, ... $\omega_{fN}$ generated in said nonlinear optical medium from the second input port of said optical directional coupler, and wherein said carrier angular frequencies $\omega_{Sj}$, $\omega_{P1}$, $\omega_{P2}$, and $\omega_{fj}$ are related by an expression:

$$\{K_2(\omega_{fj})+K_2(\omega_{Sj})-K_2(\omega_{P1})-K_2(\omega_{P2})\}L_2=\{K_1(\omega_{fj})+K_1(\omega_{Sj})-K_1(\omega_{P1})-K_1(\omega_{P2})\}L_1+(2n\pm\alpha)\pi$$

where n is an integer and an allowable error $\alpha$ is in a range $0 \leq \alpha < \frac{1}{2}$.

3. An optical parametric circuit comprising:

a nonlinear optical medium for generating optical waves having carrier angular frequencies $\omega_{f1}$, $\omega_{f2}$, ... $\omega_{fN}$ from optical waves having carrier angular frequencies $\omega_{S1}$, $\omega_{S2}$, ... $\omega_{SN}$, $\omega_{P1}$, and $\omega_{P2}$, where $\omega_{fj}=\omega_{P1}+\omega_{P2}-\omega_{Sj}$ (j=1,2, ... N);

an optical directional coupler having a first input port, second input port, first output port and second output port, for dividing optical waves having carrier angular frequencies $\omega_{Sj}$, $\omega_{P1}$, $\omega_{P2}$ and $\omega_{fj}$ into two optical waves of equal intensities and polarization states, respectively;

a first dispersive optical medium having a length dimension $L_1$ and a propagation constant $K_1(\omega)$, for connecting the first output port of said optical directional coupler with one end of said nonlinear optical medium;

a second dispersive optical medium having a length dimension $L_2$ and a propagation constant $K_2(\omega)$, for connecting the second output port of said optical directional coupler with other end of said nonlinear optical medium;

wherein pump waves having carrier angular frequencies $\omega_{P1}$, $\omega_{P2}$ are injected into the first input port of said optical directional coupler and signal waves having carrier angular frequencies $\omega_{S1}$, $\omega_{S2}$, ... $\omega_{SN}$ are injected into the second input port of said optical directional coupler so as to output pump waves having carrier angular frequencies $\omega_{P1}$, $\omega_{P2}$ together with four-wave-mixing waves having carrier angular frequencies $\omega_{f1}$, $\omega_{f2}$, ... $\omega_{fN}$ generated in said nonlinear optical medium from the first input port of said optical directional coupler and to output said signal waves having carrier angular frequencies $\omega_{S1}$, $\omega_{S2}$, ... $\omega_{SN}$ amplified in said nonlinear optical medium from the second input port of said optical directional coupler, and wherein said carrier angular frequencies $\omega_{Sj}$, $\omega_{P1}$, $\omega_{P2}$, and $\omega_{fj}$ are related by an expression:

$$\{K_2(\omega_{fj})+K_2(\omega_{Sj})-K_2(\omega_{P1})-K_2(\omega_{P2})\}L_2=\{K_1(\omega_{fj})+K_1(\omega_{Sj})-K_1(\omega_{P1})-K_1(\omega_{P2})\}L_1+(2n-1\pm\alpha)\pi$$

where n is an integer and an allowable error $\alpha$ is in a range $0 \leq \alpha < \frac{1}{2}$.

4. An optical parametric circuit as claimed in one of claims 1 to 3, wherein the carrier angular frequencies $\omega_{Sj}$ (j=1, 2, ... N) of said signal waves and the carrier angular frequencies $\omega_{P1}$ and $\omega_{P2}$ of said pump waves are related by an expression:

$$\omega_{P1} < \omega_{Sj} < \omega_{P2}.$$

5. An optical parametric circuit as claimed in one of claims 1 to 3, wherein said optical directional coupler, said nonlinear optical medium and said first and second dispersive optical media are polarization-maintaining type.

6. An optical parametric circuit as claimed in one of claims 1 to 3, wherein said circuit is provided with a compensating means for compensating polarization dispersions in said optical directional coupler, said nonlinear optical medium and said first and second dispersive optical media.

7. An optical parametric circuit as claimed in claim 5, wherein two components of each electrical field of said signal waves, said pump waves and said four-wave-mixing waves polarized along two optic axes of said circuit are interchanged from one optic axis to another optic axis at points in said circuit which compensate total polarization dispersion in said circuit.

8. An optical parametric circuit as claimed in one of claims 1 and 2, wherein said pump waves are injected so as to equalize conversion gains (expressed as four-wave-mixing wave intensity/signal wave intensity) in two optic axes of said nonlinear optical medium.

9. An optical parametric circuit as claimed in one of claims 2 and 3, wherein said pump waves are injected so as to equalize signal wave amplification gains in two optic axes of said nonlinear optical medium.

10. An optical parametric circuit as claimed in one of claims 1 to 3, wherein said signal waves or said pump waves are angular-modulated.

11. An optical parametric circuit as claimed in claim 10, wherein amounts of angular modulation $\phi_{Sj}(t)$ (j=1,2, ... N) of said signal waves at time t and amounts of angular modulations $\phi_{P1}(t)$ and $\phi_{P2}(t)$ of said pump waves at time t are related by an expression:

$$\phi_{P1}(t)+\phi_{P2}(t)-\phi_{Sj}(t)=0.$$

12. An optical parametric circuit as claimed in one of claims to 3, wherein optical intensities of said pump waves are modulated synchronously with optical intensities of said signal waves.

13. An optical parametric circuit as claimed in claim 1, wherein said circuit is provided with a multiplexing means for multiplexing said signal waves and said pump waves; and output waves from said multiplexing means are input into the first input port of said optical directional coupler.

14. An optical parametric circuit as claimed in claim 1, wherein said circuit is provided with a blocking means for blocking said signal waves or said pump waves output from the first input port of said optical directional coupler.

15. An optical parametric circuit as claimed in one of claims 2 and 3, wherein said circuit is provided with a blocking means for blocking said pump waves or said four-wave-mixing waves output from the first input port of said optical directional coupler.

16. An optical parametric circuit as claimed in one of claims 1 and 2, wherein said circuit is provided with a filtering means for passing only said four-wave-mixing waves output from the second input port of said optical directional coupler.

17. An optical parametric circuit as claimed in one of claims 2 and 3, wherein said circuit is provided with a filtering means for passing only said signal waves output from the second input port of said optical directional coupler.

18. An optical parametric circuit as claimed in claim 2, wherein said circuit is provided with a means for separating said signal waves input into the second input port of said optical directional coupler, from said signal waves and said four-wave-mixing waves output from the second input port of said optical directional coupler.

19. An optical parametric circuit as claimed in claim 2, wherein said circuit is provided with a means for separating said signal waves and said four-wave-mixing waves, both said signal waves and said four-wave-mixing waves being output from the second input port of said optical directional coupler.

20. An optical parametric circuit as claimed in claim 3, wherein said circuit is provided with a means for separating said signal waves input into the second input port of said optical directional coupler from said signal waves output from the second input port of said optical directional coupler.

21. An optical circuit comprising:

a wavelength-division multiplexer for multiplexing an optical input signal having a carrier angular frequency $\omega_S$ and optical gate signals having carrier angular frequencies $\omega_{P1k}$, $\omega_{P2k}$ synchronized to said optical input signal and excited in a kth timeslot (k is an integer) of said optical input signal;

an optical parametric circuit claimed in claim 1 for inputting optical waves output from said wavelength-division multiplexer to the first input port of said optical directional coupler and outputting optical waves having a carrier angular frequency $\omega_{fk}(=\omega_{P1k}+\omega_{P2k}-\omega_S)$ in said kth timeslot from said second input port of said optical directional coupler; and a wavelength-division demultiplexer for separating said optical waves having carrier angular frequency $\omega_{fk}$ output from said optical parametric circuit for each k.

22. An optical circuit comprising a multi-stage serial circuit arrangement of the optical parametric circuit claimed in claim 13, wherein:

a 1-stage optical parametric circuit receives an optical input signal having a carrier angular frequency $\omega_{S\,0}$ and first optical gate signals having carrier angular frequencies $\omega_{P1\,1}$, $\omega_{P2\,1}$ synchronized to said optical input signal, and outputs an optical output signal having carrier angular frequency $\omega_{S1}\,(=\omega_{P1\,1}+\omega_{P2\,1}-\omega_{S\,0})$; and an n-stage optical parametric circuit (n is an integer of two or more) receives an optical output signal having a carrier angular frequency $\omega_{S\,n-1}$ output from a (n−1)-stage optical parametric circuit and nth optical gate signals having carrier angular frequencies $\omega_{P1\,n}$, $\omega_{P2\,n}$ synchronized to said optical output signal having carrier angular frequency $\omega_{S\,n-1}$, and outputs an optical output signal having carrier angular frequency $\omega_{S_n}(=\omega_{P1\,n}+\omega_{P2\,n}-\omega_{S\,n-1})$.

23. An optical circuit comprising a multi-stage serial circuit arrangement of optical parametric circuit claimed in claim 19, wherein:

a 1-stage optical parametric circuit receives an optical input signal having a carrier angular frequency $\omega_{S\,0}$ and first optical gate signals having carrier angular frequencies $\omega_{P1\,1}$, $\omega_{P2\,1}$ synchronized to said optical input signal, and outputs an optical output signal having carrier angular frequency $\omega_{S\,1}\,(=\omega_{P1\,1}+\omega_{P2\,1}-\omega_{S\,0})$; and an n-stage optical parametric circuit (n is an integer of two or more) receives an optical output signal having a carrier angular frequency $\omega_{S\,n-1}$ output from a (n−1)-stage optical parametric circuit and nth optical gate signals having carrier angular frequencies $\omega_{P1\,n}$, $\omega_{P2\,n}$ synchronized to said optical output signal having carrier angular frequency $\omega_{S\,n-1}$, and outputs an optical output signal having carrier angular frequency $\omega_{S_n}(=\omega_{P1\,n}+\omega_{P2\,n}-\omega_{S\,0})$.

24. An optical circuit comprising a multi-stage serial circuit arrangement of optical parametric circuit claimed in claim 19, wherein:

a 1-stage optical parametric circuit receives an optical input signal having a carrier angular frequency $\omega_{S\,0}$ and first optical gate signals having carrier angular frequencies $\omega_{P1\,1}$, $\omega_{P2\,1}$ synchronized to said optical input signal, and outputs an optical output signal having carrier angular frequency $\omega_{S\,0}$ and an optical output signal having carrier angular frequency $\omega_{S\,1}\,(=\omega_{P1\,1}+\omega_{P2\,1}-\omega_{S\,0})$; and an n-stage optical parametric circuit (n is an integer of two or more) receives an optical output signal having a carrier angular frequency $\omega_{S\,0}$ output from a (n−1)-stage optical parametric circuit and nth optical gate signals having carrier angular frequencies $\omega_{P1\,n}$, $\omega_{P2\,n}$ synchronized to said optical output signal having carrier angular frequency $\omega_{S\,0}$, and outputs an optical output signal having carrier angular frequency $\omega_{S\,0}$ and an optical output signal having carrier angular frequency $\omega_{S\,n}(=\omega_{P1\,n}+\omega_{P2\,n}-\omega_{S\,0})$.

25. An optical circuit comprising a multi-stage serial circuit arrangement of optical parametric circuit claimed in claim 18, wherein:

a 1-stage optical parametric circuit receives an optical input signal having a carrier angular frequency $\omega_S$ and first optical gate signals having carrier angular frequencies $\omega_P+\Delta\omega_1$, $\omega_P-\Delta\omega_1$ synchronized to said optical input signal, and outputs optical output signals having carrier angular frequencies $\omega_S$ and $\omega_f(=2\omega_P-\omega_S)$; and an n-stage optical parametric circuit (n is an integer of two or more) receives said optical output signals having carrier angular frequencies $\omega_S$ and $\omega_f$ output from a (n−1)-stage optical parametric circuit and nth optical gate signals having carrier angular frequencies $\omega_P+\Delta\omega_n$, $\omega_P-\Delta\omega_n$ synchronized to said optical output signals output from said (n−1)-stage optical parametric circuit, and outputs optical output signals having carrier angular frequencies $\omega_S$ and $\omega_P$, and said optical circuit further comprising a means for filtering only an optical wave having a carrier angular frequency $\omega_f$ from optical output signals of a final-stage optical parametric circuit.

26. An optical circuit comprising:

an optical parametric circuit claimed in one of claims 1 and 2 for receiving measured optical pulses having a carrier angular frequency $\omega_S$ and sampling optical pulses having a carrier angular frequency $\omega_P$ whose pulse width is not more than a pulse width of said measured optical pulses, and outputting an optical wave of a carrier angular frequency $\omega_f(=2\omega_P-\omega_S)$;

a photodetector for detecting said optical wave having a carrier angular frequency $\omega_f$; and a display means for displaying an output signal from said photodetector.

* * * * *

UNITED STATES PATENT AND TRADEMARK OFFICE
CERTIFICATE OF CORRECTION

PATENT NO. : 5,604,618
DATED : February 18, 1997
INVENTOR(S) : Kunihiko MORI et al.

It is certified that error appears in the above-indentified patent and that said Letters Patent is hereby corrected as shown below:

Claim 12, Column 28, Line 45, after "claims", insert --1--.

Claim 23, column 30, Line 9, after "$W_{p2\ n}$", delete ",".

Signed and Sealed this

Sixteenth Day of September, 1997

Attest:

BRUCE LEHMAN

Attesting Officer

Commissioner of Patents and Trademarks